United States Patent
Suzuki et al.

(10) Patent No.: US 11,333,887 B2
(45) Date of Patent: May 17, 2022

(54) OPTICAL DEVICE AND DISPLAY DEVICE

(71) Applicant: SONY CORPORATION, Tokyo (JP)

(72) Inventors: Nobuhiro Suzuki, Kanagawa (JP); Daisuke Tsukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 201 days.

(21) Appl. No.: 16/476,779

(22) PCT Filed: Dec. 13, 2017

(86) PCT No.: PCT/JP2017/044686
§ 371 (c)(1),
(2) Date: Jul. 9, 2019

(87) PCT Pub. No.: WO2018/135193
PCT Pub. Date: Jul. 26, 2018

(65) Prior Publication Data
US 2019/0331921 A1 Oct. 31, 2019

(30) Foreign Application Priority Data
Jan. 20, 2017 (JP) .............................. JP2017-008099

(51) Int. Cl.
*G02B 27/01* (2006.01)
*G02B 5/32* (2006.01)
(Continued)

(52) U.S. Cl.
CPC ........... *G02B 27/0172* (2013.01); *G02B 5/32* (2013.01); *G02B 6/0033* (2013.01); *G02B 6/34* (2013.01);
(Continued)

(58) Field of Classification Search
CPC .... G02B 27/0172; G02B 6/0033; G02B 6/34; G02B 17/006; G02B 17/4205; G02B 17/4272; G02B 2027/0174
(Continued)

(56) References Cited

U.S. PATENT DOCUMENTS

2006/0228073 A1 10/2006 Mukawa et al.
2011/0039112 A1 2/2011 Tatani et al.
(Continued)

FOREIGN PATENT DOCUMENTS

CA 2758633 A1 10/2010
CN 1774661 A 5/2006
(Continued)

OTHER PUBLICATIONS

International Search Report and Written Opinion of PCT Application No. PCT/JP2017/044686, dated Mar. 13, 2018, 11 pages of ISRWO.
(Continued)

*Primary Examiner* — Collin X Beatty
(74) *Attorney, Agent, or Firm* — Chip Law Group

(57) ABSTRACT

An optical device that includes a light guide plate, a first deflection means, arranged on at least one of a first surface or a second surface of the light guide plate, that deflects light incident on the light guide plate to cause the light incident on the light guide plate to be totally reflected inside the light guide plate, and a second deflection means, arranged on at least one of the first surface or the second surface of the light guide plate, that deflects the light propagated inside the light guide plate by total reflection to cause the light propagated inside the light guide plate by total reflection to be emitted from the light guide plate. The light guide plate further includes a substrate including a first surface and a second surface facing the first surface, a first planarizing film,
(Continued)

formed on the first surface of the substrate, containing an organic material, and a second planarizing film, formed on the second surface of the substrate, containing an organic material. The substrate 500 can contain a resin material.

19 Claims, 23 Drawing Sheets

(51) Int. Cl.
  *F21V 8/00* (2006.01)
  *G02B 6/34* (2006.01)
  *G02B 17/00* (2006.01)
  *G02B 27/42* (2006.01)
(52) U.S. Cl.
  CPC ....... *G02B 17/006* (2013.01); *G02B 27/4205* (2013.01); *G02B 27/4272* (2013.01); *G02B 2027/0174* (2013.01)
(58) Field of Classification Search
  USPC .......................................................... 359/630
  See application file for complete search history.

(56) References Cited

U.S. PATENT DOCUMENTS

2012/0033306 A1  2/2012  Valera et al.
2013/0070344 A1  3/2013  Takeda et al.
2014/0247500 A1  9/2014  Takeda et al.
2020/0192095 A1*  6/2020  Puetz ..................... G02C 7/02

FOREIGN PATENT DOCUMENTS

| CN | 102998798 A | 3/2013 |
|---|---|---|
| EP | 1731943 A1 | 12/2006 |
| EP | 2241926 A1 | 10/2010 |
| JP | 2008-156648 A | 7/2008 |
| JP | 2009-180871 A | 8/2009 |
| JP | 2010-204397 A | 9/2010 |
| JP | 2013-061593 A | 4/2013 |
| JP | 2013-080039 A | 5/2013 |
| JP | 2013-109301 A | 6/2013 |
| JP | 2014-035395 A | 2/2014 |
| JP | 2014-170094 A | 9/2014 |
| JP | 2016-170372 A | 9/2016 |
| KR | 10-2010-0120134 A | 11/2010 |
| WO | 2005/093493 A1 | 10/2005 |
| WO | 2009/096599 A1 | 8/2009 |
| WO | 2010/119240 A1 | 10/2010 |

OTHER PUBLICATIONS

Office Action for JP Patent Application No. 2018-563220, dated Nov. 16, 2021, 04 pages of Office Action and 04 pages of Translation.

* cited by examiner

OPTICAL DEVICE AND DISPLAY DEVICE

CROSS REFERENCE TO RELATED APPLICATIONS

This application is a U.S. National Phase of International Patent Application No. PCT/JP2017/044686 filed on Dec. 13, 2017, which claims priority benefit of Japanese Patent Application No. JP 2017-008099 filed in the Japan Patent Office on Jan. 20, 2017. Each of the above-referenced applications is hereby incorporated herein by reference in its entirety.

TECHNICAL FIELD

The present disclosure relates to an optical device and a display device, and more specifically to a display device used for a head mounted display (HMD) and an optical device used for such a display device.

BACKGROUND ART

In recent years, as a display device, a head mounted display (HMD) has become a hot topic, the HMD causing an optical device arranged in front of an observer's eyes to display an image from an image forming device. As a light guide plate constituting the optical device, for example, from Japanese Patent Application Laid-Open No. 2010-204397, a light guide plate is known in which a reflective or transmissive hologram optical element is arranged on a substrate including a glass substrate. In a light guide plate using a glass substrate, good contrast and resolution can be obtained. Here, as the glass substrate, an optical glass substrate is usually used having a surface roughness of precision quality. Furthermore, for example, from Japanese Patent Application Laid-Open No. 2013-109301, an optical device is known using a resin substrate of an acrylic resin or the like as a substrate constituting the light guide plate for reducing the weight of the optical device. The resin substrate has a problem that the surface is easily scratched; however, for example, from Japanese Patent Application Laid-Open No. 2008-156648, a technology is known for forming a hard coat layer that solves the problem.

CITATION LIST

Patent Document

Patent Document 1: Japanese Patent Application Laid-Open No. 2010-204397
Patent Document 2: Japanese Patent Application Laid-Open No. 2013-109301
Patent Document 3: Japanese Patent Application Laid-Open No. 2008-156648

SUMMARY OF THE INVENTION

Problems to be Solved by the Invention

By the way, in a light guide plate using a resin substrate, there has been a problem that contrast and resolution are low. However, the cause of this problem has not been known until now.

Thus, an object of the present disclosure is to provide an optical device having high contrast and resolution, and a display device including such an optical device. More specifically, the object is to provide an optical device including a light guide plate using a lightweight resin substrate, and having contrast and resolution equivalent to those in a case where the glass substrate is used, and a display device including such an optical device. Furthermore, another object of the present disclosure is to inexpensively provide the optical device having high contrast and resolution, and the display device including such an optical device.

Solutions to Problems

An optical device of the present disclosure for achieving the above object includes:
a light guide plate including a first surface and a second surface facing the first surface, in which light incident from an image forming device is propagated by total reflection inside and then emitted toward an observer;
a first deflection means arranged on at least one of the first surface or the second surface of the light guide plate, the first deflection means deflecting the light incident on the light guide plate to cause the light incident on the light guide plate to be totally reflected inside the light guide plate; and
a second deflection means arranged on at least one of the first surface or the second surface, the second deflection means deflecting the light propagated by total reflection inside the light guide plate to cause the light propagated by total reflection inside the light guide plate to be emitted from the light guide plate, in which
the light guide plate includes
a substrate including a first surface and a second surface facing the first surface,
a first planarizing film formed on the first surface of the substrate, the first planarizing film containing an organic material, and
a second planarizing film formed on the second surface of the substrate, the second planarizing film containing an organic material.

A display device according to a first aspect of the present disclosure for achieving the above object includes:
a frame to be mounted on a head of an observer; and
an image display device attached to the frame, in which
the image display device includes an image forming device and an optical device, and
the optical device includes:
a light guide plate including a first surface and a second surface facing the first surface, in which light incident from the image forming device is propagated by total reflection inside and then emitted toward an observer;
a first deflection means arranged on at least one of the first surface or the second surface of the light guide plate, the first deflection means deflecting the light incident on the light guide plate to cause the light incident on the light guide plate to be totally reflected inside the light guide plate; and
a second deflection means arranged on at least one of the first surface or the second surface, the second deflection means deflecting the light propagated by total reflection inside the light guide plate to cause the light propagated by total reflection inside the light guide plate to be emitted from the light guide plate, in which
the light guide plate includes
a substrate including a first surface and a second surface facing the first surface,
a first planarizing film formed on the first surface of the substrate, the first planarizing film containing an organic material, and
a second planarizing film formed on the second surface of the substrate, the second planarizing film containing an organic material.

Note that, the term "total reflection" means total internal reflection, or total reflection inside the light guide plate. Furthermore, by the second deflection means, a virtual image formation region is constituted in which a virtual image is formed on the basis of the light emitted from the image forming device.

A display device according to a second aspect of the present disclosure for achieving the above object is
 a display device including:
  a frame to be mounted on a head of an observer; and
  an image display device attached to the frame, in which
  the image display device includes an image forming device, and the optical device of the present disclosure described above.

Effects of the Invention

In the optical device of the present disclosure or the optical device in the display according to the first to second aspects of the present disclosure, the first planarizing film containing the organic material is formed on the first surface of the substrate, and the second planarizing film containing the organic material is formed on the second surface of the substrate, so that it is possible to provide the optical device having high contrast and resolution, and the display device including such an optical device. Note that, the advantageous effects described in this specification are merely exemplifications, and the advantageous effects of the present technology are not limited to them and may include additional effects.

MODE FOR CARRYING OUT THE INVENTION

Figure 1:
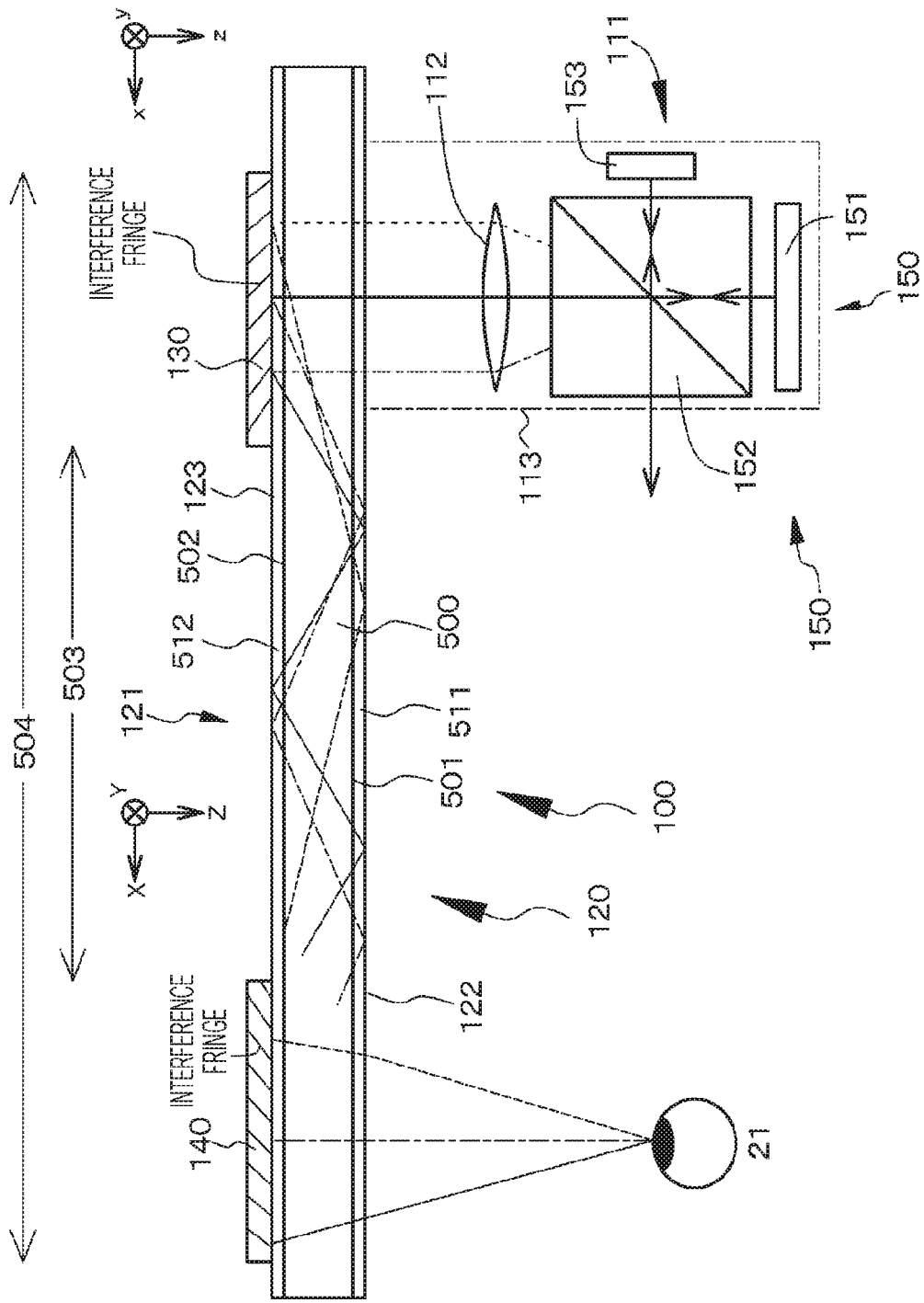
FIG. 1 is a conceptual diagram of an image display device in a display device of Example 1.

Hereinafter, the present disclosure will be described on the basis of Examples with reference to the drawings, but the present disclosure is not limited to Examples, and various numerical values and materials in Examples are exemplifications. Note that, description will be made in the following order.

1. General description of optical device of the present disclosure and display device according to first to second aspects of the present disclosure 2. Example 1 (optical device of the present disclosure, display device according to first to second aspects of the present disclosure, optical device of first structure, and image forming device of first configuration)

3. Example 2 (modification of Example 1. formation of adhesive layer)

4. Example 3 (another modification of Example 1. provision of function as anti-reflection film to planarizing film)

5. Example 4 (another modification of Example 1. formation of anti-reflection film)

6. Example 5 (modification of Examples 1 to 4. optical device of first structure and image forming device of second configuration)

7. Example 6 (modification of Examples 1 to 4. optical device of second structure and image forming device of first configuration)

8. Example 7 (modification of Examples 1 to 6. optical device of second structure and image forming device of second configuration)

9. Example 8 (modification of Examples 1 to 7. display device with light control device)

10. Example 9 (modification of Example 8)

11. Example 10 (modification of Examples 8 to 9)

12. Other

<General Description of Optical Device of the Present Disclosure and Display Device According to First to Second Aspects of the Present Disclosure>

In the optical device of the present disclosure and the optical devices constituting the display device according to the first to second aspects of the present disclosure (hereinafter, these optical devices are collectively referred to simply as "the optical device and the like of the present disclosure"), a mode can be made in which a substrate contains a resin material. Then, in this case, although it is not limited, a mode can be made in which a main component of the substrate is a cycloolefin polymer (COP). COP is a polymer synthesized using cycloolefins as monomers, and is a polymer having an alicyclic structure in its molecular structure. Main COPs currently being industrialized use norbornene derivatives having high reactivity among cycloolefins as monomers, and there are a hydrogenated ring-opening metathesis polymerization type, and an addition polymerization type with ethylene. The addition polymerization type with ethylene may also be referred to as cycloolefin copolymer (COC). Since COP has no polar portion in its structure and is amorphous, COP is a material capable of obtaining a substrate having excellent moisture resistance and excellent surface smoothness. In addition, COP has the total light transmittance of greater than or equal to 90%, has transparency comparable to that of an acrylic resin, and is excellent in transparency. However, the substrate is not limited to such a substrate (material), and a mode can be made in which the optical device includes a substrate manufactured from a resin material exemplified by the acrylic resin, methacrylic resin, polycarbonate resin, polystyrene resin, AS resin, hard vinyl chloride resin, or the like. Furthermore, a mode can also be made in which the substrate contains a cheap glass material whose cost of plane polishing is low.

In the optical device and the like of the present disclosure including the above preferable modes, a mode can be made in which a value of Rq of an outer surface of a portion of the first planarizing film included in a region of the light guide plate sandwiched by orthogonal projection images on the substrate of the first deflection means and the second deflection means is less than or equal to 3 nm, and a value of Rq of an outer surface of a portion of the second planarizing film included in the region of the light guide plate sandwiched by the orthogonal projection images on the substrate of the first deflection means and the second deflection means is less than or equal to 3 nm. Note that, "Rq" is a root mean square roughness defined by JIS B0601: 2013.

Moreover, in the optical device and the like of the present disclosure including the various preferable modes described above, a mode can be made in which a thickness of a portion of the first planarizing film included in a region of the light guide plate sandwiched by orthogonal projection images on the substrate of the first deflection means and the second deflection means is greater than or equal to $5 \times 10^{-8}$ m, preferably greater than or equal to $1.7 \times 10^{-7}$ m, and a thickness of a portion of the second planarizing film included in the region of the light guide plate sandwiched by the orthogonal projection images on the substrate of the first deflection means and the second deflection means is greater than or equal to $5 \times 10^{-8}$ m, preferably greater than or equal to $1.7 \times 10^{-7}$ m. Then, in this case, a mode can be made in which the thickness of the portion of the first planarizing film included in the region of the light guide plate sandwiched by the orthogonal projection images on the substrate of the first deflection means and the second deflection means is less than or equal to $3 \times 10^{-6}$ m, and the thickness of the portion of the second planarizing film included in the region of the light guide plate sandwiched by the orthogonal projection images on the substrate of the first deflection means and the second deflection means is less than or equal to $3 \times 10^{-6}$ m.

Moreover, in the optical device and the like of the present disclosure including the various preferable modes described above, a mode can be made in which a parallelism of an outer surface of a portion of the second planarizing film included in a region of the light guide plate sandwiched by orthogonal projection images on the substrate of the first deflection means and the second deflection means with respect to an outer surface of a portion of the first planarizing film included in the region of the light guide plate sandwiched by the orthogonal projection images on the substrate of the first deflection means and the second deflection means is less than or equal to 2/60 degrees, preferably less than or equal to 1/60 degrees. Then, in this case, it is more preferable that a parallelism of an outer surface of a portion of the second planarizing film included in a region of the substrate including the orthogonal projection images on the substrate of the first deflection means and the second deflection means with respect to an outer surface of a portion of the first planarizing film included in the region of the substrate including the orthogonal projection images on the substrate of the first deflection means and the second deflection means is less than or equal to 2/60 degrees, preferably less than or equal to 1/60 degrees.

Here, for convenience, a direction in which light travels so that the light incident on the light guide plate is totally reflected internally is referred to as an "x direction", and in a virtual plane including the first surface and the second surface of the light guide plate, a direction orthogonal to the x direction is referred to as a "y direction". Furthermore, a point on the light guide plate where light incident from the center point of the image forming device is incident on the light guide plate is referred to as an "incident point", and a point on the light guide plate where the light incident from the center point of the image forming device propagated inside the light guide plate by total reflection and then emitted toward an observer is referred to as an "emission point". A line segment connecting the incident point and the emission point (may include one line segment, or may include two or more line segments depending on the number of deflection means and arrangement positions) is referred to as a "line segment $L_0$". Moreover, the "region of the light guide plate sandwiched by the orthogonal projection images on the substrate of the first deflection means and the second deflection means" is referred to as a "light guide region" for convenience, and the region of the substrate including the orthogonal projection images on the substrate of the first deflection means and the second deflection means, in other words, a region of the substrate including from a portion corresponding to the orthogonal image of the outer end of the first deflection means to a portion corresponding to the orthogonal projection image of the outer end of the second deflection means is referred to as an "entire light guide region" for convenience.

In the optical device and the like of the present disclosure described above, various definitions are provided for the portion of the first planarizing film and the portion of the second planarizing film included in the light guide region, and the light guide region more specifically refers to a region of the substrate in which the light incident on the light guide plate is totally reflected internally. Then, it is preferable that the portion of the first planarizing film and the portion of the second planarizing film included in the light guide region or the entire light guide region of the substrate satisfy the various definitions described above, but in some cases, the portion (region) of the first planarizing film and the portion (region) of the second planarizing film along (corresponding to) the line segment $L_0$ may satisfy the various definitions described above.

Moreover, in the optical device and the like of the present disclosure including the various preferable modes described above, a mode can be made in which the first planarizing film and the second planarizing film each contain an identical material and have an identical thickness. Then, as a result, it can be reliably prevented that warpage occurs on the substrate.

Moreover, in the optical device and the like of the present disclosure including the various preferable modes described above, the first planarizing film and the second planarizing film can contain a material whose main component is an organic material containing an acrylic material. The planarizing films contain a material whose main component is an organic material as described above, whereby it can be prevented that fractures or cracks occur on the first planarizing film and the second planarizing film even in a case where, for example, the substrate containing a resin material warps, unlike the case of inorganic material. Furthermore, transparency can be increased by using an acrylic material. Note that, even with an acrylic material, by devising additives and the like, high adhesion can be maintained to a substrate containing COP, for example. Specifically, for example, a UV-curable coating agent can be used containing a material (a hybrid material whose main component is an organic material) containing the acrylic resin (organic material) as a main component and silica (inorganic material) added as an additive.

Moreover, in the optical device and the like of the present disclosure including the various preferable modes described above, although it is not limited, a mode can be made in which the first deflection means and the second deflection means each include a hologram diffraction grating. Then, in this case, a mode can be made in which the hologram diffraction grating contains an acrylic material and a urethane-based material. Note that, the hologram diffraction grating can further improve the transparency by containing the organic material containing an acrylic material, and can further improve the adhesion to the first planarizing film and the second planarizing film by containing a urethane-based material. Alternatively, the hologram diffraction grating, the first planarizing film, and the second planarizing film each can contain a material whose main component is an organic material containing an acrylic material. Then, as a result, further improvement can be achieved of the adhesion between the planarizing film and the deflection means.

Moreover, in the optical device and the like of the present disclosure including the various preferable modes described above, a mode can be made in which a thickness of the substrate is 0.4 mm to 10 mm. When the thickness of the substrate is less than 0.4 mm, the number of total reflections increases between the first surface and the second surface of the light guide plate, and the contrast and MTF may be reduced. Furthermore, when the thickness of the substrate exceeds 10 mm, mass of the substrate increases, and a burden increases on the observer using the display device.

Moreover, in the optical device and the like of the present disclosure including the various preferable modes described above, to increase the contrast and MTF, it is ideal to set $n_0=n_1=n_2$, but according to studies of the present inventors, it has been found that it is sufficient if it is satisfied that $$|n_1-n_0|/n_0 \leq 0.03$$

$$|n_2-n_0|/n_0 \leq 0.03$$

where $n_1$ is a refractive index of a material constituting the first planarizing film, $n_2$ is a refractive index of a material constituting the second planarizing film, and $n_0$ is a refractive index of a material constituting the substrate. Alternatively, a mode can be preferably made in which it is satisfied that $n_1 \geq 1.48$, $n_2 \geq 1.48$, and $n_0 \geq 1.48$, where $n_1$ is a substrate refractive index of a material constituting the first planarizing film substrate, $n_2$ is a substrate refractive index of a material constituting the second planarizing film substrate, and $n_0$ is a refractive index of a material constituting the substrate. As described above, the higher the value of the refractive index, the wider the optical design margin, and there is a wide selection range of materials having a refractive index of greater than or equal to 1.48.

Moreover, in the optical device and the like of the present disclosure including the various preferable modes described above, a mode can be made in which a light transmittance of a material constituting the substrate with respect to the light incident on the light guide plate is greater than or equal to 14% when a thickness of the material constituting the substrate is 60 mm, a light transmittance of a material constituting the first planarizing film with respect to the light incident on the light guide plate is greater than or equal to 14% when a thickness of the material constituting the first planarizing film is 60 mm, and a light transmittance of a material constituting the second planarizing film with respect to the light incident on the light guide plate is greater than or equal to 14% when a thickness of the material constituting the second planarizing film is 60 mm.

Moreover, in the optical device and the like of the present disclosure including the various preferable modes described above, a mode can be made in which a first adhesive layer is formed between the first deflection means and the first planarizing film, and a second adhesive layer is formed between the second deflection means and the second planarizing film. By forming the adhesive layer, it is possible to further improve the adhesion between the first deflection means and the first planarizing film, and the adhesion between the second deflection means and the second planarizing film. Examples of a material constituting the adhesive layer can include, specifically, an adhesive material whose main component is an acrylic resin (acrylic acid ester copolymer, methacrylic acid ester copolymer) or an epoxy compound.

Moreover, in the optical device and the like of the present disclosure including the various preferable modes described above, a mode can be made in which a thickness of the first planarizing film is $n_1 \cdot \lambda_0/4$, or a thickness of the second planarizing film is $n_2 \cdot \lambda_0/4$, or the thickness of the first planarizing film is $n_1 \cdot \lambda_0/4$, and the thickness of the second planarizing film is $n_2 \cdot \lambda_0/4$, where $\lambda_0$ is a wavelength of the light incident on the light guide plate, $n_0$ is a refractive index of the substrate, $n_1$ is a refractive index of the first planarizing film, where $n_1 < n_0$, and $n_2$ is a refractive index of the second planarizing film, where $n_2 < n_0$. By defining the thicknesses of the first planarizing film and the second planarizing film as described above, the first planarizing film and the second planarizing film can be provided with a function as the anti-reflection film, and utilization efficiency can be increased of the light from the image forming device. Here, a design error of the thickness is preferably within 3%. In other words, it is preferable to satisfy $$(n_1 \cdot \lambda_0/4) \times 0.97 \leq (\text{thickness of first planarizing film}) \leq (n_1 \cdot \lambda_0/4) \times 1.03$$

$$(n_2 \cdot \lambda_0/4) \times 0.97 \leq (\text{thickness of second planarizing film}) \leq (n_2 \cdot \lambda_0/4) \times 1.03$$

Moreover, in the optical device and the like of the present disclosure including the various preferable modes described above, a mode can be made in which the first deflection means and the second deflection means are arranged on a second surface side of the substrate, and an anti-reflection layer having a refractive index $n_3$, where $n_3 < n_1$, and a thickness of $n_3 \cdot \lambda_0/4$ is formed on an outer surface of the first planarizing film, where $n_1$ is a refractive index of a material constituting the first planarizing film, and $\lambda_0$ is a wavelength of the light incident on the light guide plate. In this case, it is desirable that a sum of the film thickness of the first planarizing film and the film thickness of the anti-reflection layer is equal to the film thickness of the second planarizing film, from a viewpoint of suppressing occurrence of warpage of the light guide plate. Alternatively, a mode can be made in which the first deflection means and the second deflection means are arranged on a first surface side of the substrate, and the anti-reflection layer having the refractive index $n_3$, where $n_3 < n_2$, and the thickness of $n_3 \cdot \lambda_0/4$ is formed on an outer surface of the second planarizing film, where $n_2$ is a refractive index of a material constituting the second planarizing film, and $\lambda_0$ is the wavelength of the light incident on the light guide plate. In this case, it is desirable that a sum of the film thickness of the second planarizing film and the film thickness of the anti-reflection layer is equal to the film thickness of the first planarizing film, from the viewpoint of suppressing the occurrence of the warpage of the light guide plate. Here, examples of a material constituting the anti-reflection layer can include, specifically, a UV-curable coating agent whose main component is a polymethyl methacrylate (PMMA) resin having a refractive index $n_3 = 1.49$. Here, a design error of the thickness is preferably within 3%. In other words, it is preferable to satisfy $$(n_3 \cdot \lambda_0/4) \times 0.97 \leq (\text{thickness of first planarizing film}) \leq (n_3 \cdot \lambda_0/4) \times 1.03$$

The optical device and the like of the present disclosure are each a semi-transmissive type (see-through type). Specifically, at least a portion of the optical device facing the observer's eyeball (pupil) can be made semi-transmissive (see through), and an outside scene can be viewed through this portion of the optical device. Note that, in the present specification, the term "semi-transmissive" may be used, but it does not mean to transmit or reflect 1/2 (50%) of the incident light, but it is used in the meaning of transmitting a part of the incident light and reflecting the rest part.

As mentioned above, a configuration can be made in which the first deflection means diffracts the light incident on the light guide plate, and the second deflection means diffracts the light propagated by total reflection inside the light guide plate. Then, in this case, a mode can be made in which the first deflection means and the second deflection means each include the hologram diffraction grating as mentioned above, and moreover, a configuration can be made in which the hologram diffraction grating includes a reflective hologram diffraction grating, or alternatively, includes a transmissive hologram diffraction grating, or alternatively, one deflection means includes the reflective hologram diffraction grating, and the other deflection means includes the transmissive hologram diffraction grating. Examples of the reflective hologram diffraction grating can include a reflective volume hologram diffraction grating. The first deflection means including the hologram diffraction grating may be referred to as a "first diffraction grating member" for convenience, and the second deflection means including the hologram diffraction grating may be referred to as a "second diffraction grating member" for convenience. Furthermore, the optical device of such a structure is referred to as an "optical device of a first structure" for convenience.

With the image display device in the display device and the like of the present disclosure, it is possible to perform single color (for example, green) image display. Then, in this case, a configuration can be made in which, for example, an angle of view is divided into, for example, two (more specifically, for example, into two equal parts), and the first deflection means includes two diffraction grating members layered corresponding to respective divided angles of view. Alternatively, in a case where color image display is performed, to cause the first diffraction grating member or the second diffraction grating member to cope with diffraction of P types of light respectively having different P types (for example, P=3, and three types of red, green, and blue) of wavelength bands (or wavelengths), a configuration can be made in which the diffraction grating member includes P diffraction grating layers layered each including the hologram diffraction grating. In each diffraction grating layer, interference fringes are formed corresponding to one type of wavelength band (or wavelength). Alternatively, to cope with the diffraction of P types of light respectively having different P types of wavelength bands (or wavelengths), a configuration can also be made in which P types of the interference fringes are formed on the first diffraction grating member or the second diffraction grating member including one diffraction grating layer. Alternatively, a structure may be adopted in which, for example, in a first light guide plate, a diffraction grating member is arranged including a diffraction grating layer including a hologram diffraction grating that diffracts light having a red wavelength band (or wavelength), and in a second light guide plate, a diffraction grating member is arranged including a diffraction grating layer including a hologram diffraction grating that diffracts light having a green wavelength band (or wavelength), and in a third light guide plate, a diffraction grating member is arranged including a diffraction grating layer including a hologram diffraction grating that diffracts light having a blue wavelength band (or wavelength), and the first light guide plate, the second light guide plate, and the third light guide plate are layered with a gap between them. Alternatively, a configuration can be made in which the angle of view is divided into, for example, three equal parts, and the first diffraction grating member or the second diffraction grating member includes diffraction grating layers layered respectively corresponding to the angles of view. Then, by adopting these configurations, it is possible to achieve an increase in diffraction efficiency, an increase in diffraction acceptance angle, and optimization of a diffraction angle when light having each wavelength band (or wavelength) is diffracted in the first diffraction grating member or the second diffraction grating member. It is preferable to arrange a protective member so that the hologram diffraction grating does not come in direct contact with the atmosphere. The first substrate or the second substrate constituting the light control device as described later may also serve as the protective member.

Examples of a material constituting the first diffraction grating member and the second diffraction grating member including the hologram diffraction grating can include, as mentioned above, a material containing an acrylic material and a urethane-based material, or alternatively, a material containing the organic material containing an acrylic material, specifically, a photopolymer material. It is sufficient that a constituent material and a basic structure of the first diffraction grating member and the second diffraction grating member including the hologram diffraction grating are the same as a constituent material and a structure of a conventional hologram diffraction grating. The hologram diffraction grating means a hologram diffraction grating that diffracts only+first order diffracted light. Although the interference fringes are formed on the diffraction grating member from the inside to the surface, it is sufficient that a method of forming such interference fringes is the same as a conventional forming method. Specifically, it is sufficient that, for example, object light is emitted from a first predetermined direction on one side to a member (for example, the photopolymer material) constituting the diffraction grating member, and at the same time, reference light is emitted from a second predetermined direction on the other side to the member constituting the diffraction grating member, and the interference fringes formed by the object light and the reference light are recorded inside the member constituting the diffraction grating member. By appropriately selecting the first predetermined direction, the second predetermined direction, and the wavelengths of the object light and the reference light, it is possible to obtain a desired pitch of the interference fringes, and a desired inclination angle (slant angle) of the interference fringes on the surface of the diffraction grating member. The inclination angle of the interference fringes means an angle between the surface of the diffraction grating member (or the diffraction grating layer) and the interference fringes. In a case where the first diffraction grating member and the second diffraction grating member include a layered structure of the P diffraction grating layers each including the hologram diffraction grating, for layering of such diffraction grating layers, it is sufficient that the P diffraction grating layers are separately manufactured, and then the P diffraction grating layers are layered (bonded) by using, for example, a UV-curable adhesive. Furthermore, the P diffraction grating layers may be manufactured by manufacturing one diffraction grating layer by using a photopolymer material having adhesiveness, and then sequentially pasting the photopolymer material having adhesiveness on the layer to manufacture diffraction layers.

Alternatively, in the optical device and the like of the present disclosure, the first deflection means deflects light incident on the light guide plate, and the second deflection means deflects light propagated by total reflection inside the light guide plate, and specifically, a configuration can be made in which the first deflection means functions as a reflecting mirror, and the second deflection means functions as a semitransparent mirror. The optical device of such a structure is referred to as an "optical device of a second structure" for convenience.

In the optical device of the second structure, the first deflection means includes, for example, a metal containing an alloy, and can include a light reflection film (a kind of mirror) that reflects light incident on the light guide plate, and a diffraction grating (for example, a hologram diffraction grating film) that diffracts light incident on the light guide plate. Alternatively, the first deflection means can include, for example, a multilayer layered structure in which a large number of dielectric layered films are layered, a semi-transparent mirror, and a polarization beam splitter. Furthermore, the second deflection means can include a multilayer layered structure in which a large number of dielectric layered films are layered, a semi-transparent mirror, a polarization beam splitter, and a hologram diffraction grating film. Then, the first deflection means and the second deflection means are arranged inside the substrate (incorporated into the substrate), and in the first deflection means, parallel light incident on the light guide plate is reflected or diffracted so that the parallel light incident on the light guide plate is totally reflected inside the light guide plate. On the other hand, in the second deflection means, the parallel light propagated by total reflection inside the light guide plate is reflected or diffracted a plurality of times, and emitted in a state of parallel light from the light guide plate.

In the image display device in the display device according to the first to second aspects of the present disclosure (hereinafter, may be referred to as "the display device and the like of the present disclosure") including the various preferable modes and configurations described above, a mode can be made in which the image forming device includes a plurality of pixels arrayed in a two-dimensional matrix. A configuration of such an image forming device is referred to as an "image forming device of a first configuration" for convenience.

Examples of the image forming device of the first configuration can include: an image forming device including a reflective spatial light modulation device and a light source; an image forming device including a transmissive spatial light modulation device and a light source; and an image forming device including a light emitting element such as an organic electro luminescence (EL) element, an inorganic EL element, a light emitting diode (LED), or a semiconductor laser element, and among them, the image forming device of the first configuration is preferably the image forming device including the reflective spatial light modulation device and the light source, or the image forming device including the organic EL element. Examples of the spatial light modulation device can include a light valve, for example, a transmissive or reflective liquid crystal display device such as liquid crystal on silicon (LCOS), and a digital micromirror device (DMD), and examples of the light source can include a light emitting element. Moreover, a configuration can be made in which the reflective spatial light modulation device includes a liquid crystal display device and a polarization beam splitter that reflects a part of light from the light source to guide the light to the liquid crystal display device, and causes a part of light reflected by the liquid crystal display device to pass to guide the light to an optical system. Examples of the light emitting element constituting the light source can include a red light emitting element, a green light emitting element, a blue light emitting element, a white light emitting element, or alternatively, white light may be obtained by mixing red light, green light, and blue light respectively emitted from a red light emitting element, a green light emitting element, and a blue light emitting element, and performing brightness equalization, by using a light pipe. As the light emitting element, a semiconductor laser element, a solid state laser, and an LED can be exemplified, for example. The number of pixels only needs to be determined on the basis of specifications required for the image display device, and as specific values of the number of pixels, 320×240, 432×240, 640×480, 1024×768, 1920×1080, and the like can be exemplified.

Alternatively, in the image display device in the display device and the like of the present disclosure including the preferable modes and configurations described above, a mode can be made in which the image forming device includes a light source and a scanning means that scans parallel light emitted from the light source. A configuration of such an image forming device is referred to as an "image forming device of a second configuration" for convenience.

Examples of the light source in the image forming device of the second configuration can include a light emitting element, and specifically, can include a red light emitting element, a green light emitting element, a blue light emitting element, a white light emitting element, or alternatively, white light may be obtained by mixing red light, green light, and blue light respectively emitted from a red light emitting element, a green light emitting element, and a blue light emitting element, and performing brightness equalization, by using a light pipe. As the light emitting element, a semiconductor laser element, a solid state laser, and an LED can be exemplified, for example. The number of pixels (virtual pixels) in the image forming device of the second configuration also only needs to be determined on the basis of the specifications required for the image display device, and as specific values of the number of pixels (virtual pixels), 320×240, 432×240, 640×480, 1024×768, 1920×1080, and the like can be exemplified. Furthermore, in a case where color image display is performed and the light source includes a red light emitting element, a green light emitting element, and a blue light emitting element, it is preferable to perform color synthesis by using, for example, a cross prism. Examples of the scanning means can include a galvanometer mirror, and micro electro mechanical systems (MEMS) including a micromirror rotatable in two dimensions, which horizontally and vertically scans light emitted from a light source.

In the image forming device of the first configuration or the image forming device of the second configuration in the image display device including the optical device of the first structure or the second structure, light made into a plurality of parallel light beams in the optical system (the optical system that makes emitted light into parallel light, and may be referred to as a "parallel light emission optical system", and specifically, for example, a collimating optical system or a relay optical system) is caused to be incident on the light guide plate, and such a requirement for parallel light is based on that light wavefront information when these light beams are incident on the light guide plate needs to be preserved even after the light beams are emitted from the light guide plate via the first deflection means and the second deflection means. Note that, to generate the plurality of parallel light beams, specifically, it is sufficient that, for example, a light emitting portion of the image forming device is positioned at a place (position) of a focal length in the parallel light emission optical system. The parallel light emission optical system has a function of converting position information of the pixel into angle information in the optical system of the optical device. As the parallel light emission optical system, a convex lens, a concave lens, a free-form surface prism, and a hologram lens can be exemplified alone or in combination, which is an optical system having positive optical power as a whole. A light shielding portion including an opening may be arranged between the parallel light emission optical system and the light guide plate so that undesirable light is not emitted from the parallel light emission optical system and is not incident on the light guide plate.

The light guide plate includes two parallel surfaces (the first surface and the second surface) extending parallel to an axis line (longitudinal direction, horizontal direction, corresponding to the X-axis) of the light guide plate. Note that, a width direction (height direction, vertical direction) of the light guide plate corresponds to the Y-axis, and a thickness direction of the light guide plate corresponds to the Z-axis. The X-axis and the x direction may be parallel to each other, or there may be an x direction not parallel to the X-axis. Similarly, the Y-axis and the y direction may be parallel to each other, or there may be a y direction not parallel to the Y-axis. When a surface of the light guide plate on which light is incident is a light guide plate incident surface, and a surface of the light guide plate from which light is emitted is a light guide plate emission surface, the light guide plate incident surface and the light guide plate emission surface may be constituted by the first surface, or the light guide plate incident surface and the light guide plate emission surface may be constituted by the second surface, or the light guide plate incident surface may be constituted by the first surface and the light guide plate emission surface may be constituted by the second surface, or the light guide plate incident surface may be constituted by the second surface and the light guide plate emission surface may be constituted by the first surface. The interference fringes of the diffraction grating member extend generally parallel to the Y-axis, but depending on an arrangement state of the diffraction grating member, there may be a case where the interference fringes do not extend generally parallel to the Y-axis.

In the display device and the like of the present disclosure, a configuration can be made in which a light shielding member that shields incidence of external light to the optical device is arranged in a region of the optical device where the light emitted from the image forming device is incident. The light shielding member that shields incidence of external light to the optical device is arranged in the region of the optical device where the light emitted from the image forming device is incident, whereby the external light is not incident on the region of the optical device where the light emitted from the image forming device is incident, so that undesirable stray light or the like is not generated, and the image display quality in the display device is not degraded. Note that, a mode is preferably made in which the region of the optical device where the light emitted from the image forming device is incident is included in a projection image of the light shielding member on the optical device.

A configuration can be made in which the light shielding member is arranged to be separated from the optical device, on a side opposite to a side of the optical device on which the image forming device is arranged. In the display device having such a configuration, the light shielding member only needs to be manufactured from, for example, an opaque plastic material, and a mode can be made in which such a light shielding member integrally extends from a housing of the image display device, or alternatively, is attached to the housing of the display device, or alternatively, integrally extends from a frame, or alternatively, is attached to the frame. Alternatively, a configuration can be made in which the light shielding member is arranged in a portion of the optical device on the side opposite to the side on which the image forming device is arranged, and a mode can also be made in which the light shielding member is arranged in the light control device as described later. A light shielding member containing an opaque material may be formed on the surface of the optical device, for example, on the basis of a physical vapor deposition method (PVD method) or chemical vapor deposition method (CVD method), may be formed by a printing method or the like, or a film, sheet, or foil containing an opaque material (a plastic material, a metal material, an alloy material, or the like) may be bonded. A configuration is preferably made in which a projection image of an end of the light control device as described later on the optical device is included in the projection image of the light shielding member on the optical device.

In the display device and the like of the present disclosure, a configuration can be made in which the frame includes a front portion arranged in front of the observer, and two temple portions respectively attached rotatably to both ends of the front portion via hinges. Note that, an end cover portion is attached to the tip of each temple portion. The image display device is attached to the frame, and specifically, for example, the image forming device only needs to be attached to the temple portion, and the light guide plate only needs to be attached to the front portion. Furthermore, a configuration can also be made in which the front portion and the two temple portions are integrated together. In other words, when the whole of display device and the like of the present disclosure is viewed, the frame has substantially the same structure as ordinary glasses. A material constituting the frame including a pad portion can contain the same material as a material constituting the ordinary glasses, such as a metal, an alloy, a plastic, and a combination thereof. Moreover, a configuration can be made in which a nose pad is attached to the front portion. In other words, when the whole of the display device and the like of the present disclosure is viewed, an assembly of the frame (including a rim) and the nose pad has substantially the same structure as that of the ordinary glasses. The nose pad can also have known configuration and structure.

Furthermore, in the display device and the like of the present disclosure, from a viewpoint of design or ease of mounting, a mode is desirably made in which wiring lines (signal line, power supply line, and the like) from one or two image forming devices extend from the tip of the end cover portion to the outside via the temple portion and the inside of the end cover portion, and are connected to a control device (control circuit or control means). Moreover, a mode can also be made in which each image forming device includes a headphone portion, and a headphone portion wiring line from each image forming device extends from the tip of the end cover portion to the headphone portion via the temple portion and the inside of the end cover portion. Examples of the headphone portion can include an inner ear type headphone portion, and a canal type headphone portion. A mode is preferably made in which the headphone portion wiring line more specifically extends from the tip of the end cover portion to the headphone portion to wrap around the back side of a pinna (auricle). Furthermore, a mode can be made in which an imaging device is attached to a central portion of the front portion. Specifically, the imaging device includes, for example, a solid-state imaging element including a CCD or a CMOS sensor, and a lens. The wiring line from the imaging device only needs to be connected to one image display device (or the image forming device) via the front portion, for example, and moreover, only needs to be included in the wiring line extending from the image display device (or the image forming device).

A head mounted display (HMD) can be constituted by the display device and the like of the present disclosure, for example. Then, as a result, weight reduction and size reduction of the display device can be achieved, and it becomes possible to significantly reduce discomfort at the time of mounting the display device, and moreover, it becomes possible to achieve manufacturing cost reduction. Alternatively, the display device and the like of the present disclosure can be applied to a head-up display (HUD) provided in a cockpit or the like of a vehicle or an aircraft.

The optical device and the like of the present disclosure may further include a light control device that adjusts the amount of external light incident from the outside. Here, the optical device overlaps with at least a portion of the light control device.

A mode can be made in which
the light control device includes:
a first substrate;
a second substrate facing the first substrate;
a first transparent electrode provided on a facing surface of the first substrate facing the second substrate;
a second transparent electrode provided on a facing surface of the second substrate facing the first substrate; and
a light control layer sandwiched between the first transparent electrode and the second transparent electrode. Note that, the light control device may further include a first electrode formed on a part of the first transparent electrode, and in this case, the first electrode may be directly connected to a control circuit (light control device/control circuit) for controlling a light shielding ratio of the light control device, and in some cases, a first connection portion connected to a first electrode may be provided, and the first connection portion may be connected to the light control device/control circuit. Alternatively, the first connection portion and the first transparent electrode may be directly connected together without provision of the first electrode. Furthermore, a second connection portion that comes in contact with a part of the second transparent electrode may be provided, and the second connection portion may be connected to the light control device/control circuit. Alternatively, a second electrode may be further included formed on a part of the second transparent electrode. Then, the second electrode may be directly connected to the light control device/control circuit, and in some cases, the second connection portion connected to the second electrode may be provided, and the second connection portion may be connected to the light control device/control circuit. The first connection portion only needs to be provided on a facing surface of the first substrate facing the second substrate so as not to come in contact with the first transparent electrode except for the connection portion. The second connection portion only needs to be provided on a facing surface of the second substrate facing the first substrate so as not to come in contact with the second transparent electrode except for the connection portion.

From the light control device/control circuit, a voltage is applied to the first transparent electrode via the first electrode (in some cases, the first connection portion and the first electrode), and a voltage is applied to the second transparent electrode via the second connection portion (in some cases, the second connection portion and the second electrode). Depending on a potential difference between a certain part (referred to as "part-A" for convenience) of the first transparent electrode and a part (referred to as "part-B" for convenience) of the second transparent electrode facing the part-A, the light shielding ratio is controlled of a region of a light control layer sandwiched by the part-A and the part-B. A potential of the part-A is defined by an electrical resistance value dependent on a distance between the first electrode and the part-A of the first transparent electrode, and a potential of the part-B is defined by an electrical resistance value dependent on a distance between the second connection portion (or the second electrode) and the part-B of the second transparent electrode. Thus, it is sufficient that a position and length of the first electrode, and a connection position of the second connection portion to the second transparent electrode (or a position and length of the second electrode) are determined as appropriate.

In the display device of the present disclosure including the various preferable modes described above, a mode can be made in which the optical device is attached to the light control device. Note that, the optical device may be attached to the light control device in close contact with the light control device, or may be attached to the light control device with a gap.

Moreover, in the display device of the present disclosure including the various preferable modes described above, as mentioned above, a mode can be made in which the frame includes: a front portion arranged in front of the observer; two temple portions respectively attached rotatably to both ends of the front portion via hinges; and a nose pad, and the light control device is arranged at the front portion. Then, in this case, a mode can be made in which the front portion includes a rim, and the light control device is fitted to the rim. Furthermore, in the display device of the present disclosure including the various preferable modes described above, the optical device and the light control device may be arranged in this order from the observer side, or may be arranged in the order of the light control device and the optical device. Then, a mode can be made in which the second deflection means (virtual image formation region) is positioned in the projection image of the light control device. Moreover, a mode can be made in which the second deflection means, or the first deflection means and the second deflection means are covered by one of the substrates constituting the light control device. Furthermore, during operation of the light control device, for example, a voltage higher than that of the second transparent electrode is applied to the first transparent electrode.

In the display device and the like of the present disclosure, the light shielding ratio of the light control device may be changed from a first desired region toward a second desired region, and in this case, the light shielding ratio may gradually change (in other words, may continuously change), and depending on an arrangement state and shapes of the electrodes and connection portions, a configuration can be made in which the light shielding ratio changes in a stepwise, or a configuration can be made in which the light shielding ratio changes continuously or stepwise from a certain value. In other words, the light control device may be made to be in a state having a color gradation, may be made to be in a state in which color changes stepwise, or may be made to be in a state in which color changes continuously or stepwise from a state having a certain color. The light shielding ratio can be controlled by the voltage applied to the first electrode and the second connection portion. The potential difference between the first transparent electrode and the second transparent electrode may be controlled, or the voltage applied to the first electrode and the voltage applied to the second connection portion may be controlled independently. In a case where the light shielding ratio is adjusted, a test pattern may be displayed on the optical device.

In the display device and the like of the present disclosure, a mode can be made in which: an illuminance sensor (environmental illuminance measurement sensor) is further included that measures an illuminance of an environment in which the display device is placed; and the light shielding ratio of the light control device is controlled on the basis of a measurement result of the illuminance sensor (environmental illuminance measurement sensor). Alternatively, a mode can be made in which: an illuminance sensor (environmental illuminance measurement sensor) is further included that measures an illuminance of an environment in which the display device is placed; and brightness of an image formed by the image forming device is controlled on the basis of a measurement result of the illuminance sensor (environmental illuminance measurement sensor). These modes may be combined.

Alternatively, a mode can be made in which: a second illuminance sensor (may be referred to as a "transmitted light illuminance measurement sensor" for convenience) is further included that measures an illuminance based on light transmitted through the light control device from an external environment; and the light shielding ratio of the light control device is controlled on the basis of a measurement result of the second illuminance sensor (transmitted light illuminance measurement sensor). Alternatively, a mode can be made in which: a second illuminance sensor (transmitted light illuminance measurement sensor) is further included that measures an illuminance based on light transmitted through the light control device from the external environment; and brightness of an image formed by the image forming device is controlled on the basis of a measurement result of the second illuminance sensor (transmitted light illuminance measurement sensor). Note that, a mode is desirably made in which the second illuminance sensor (transmitted light illuminance measurement sensor) is arranged closer to the observer than the optical device. At least two second illuminance sensors (transmitted light illuminance measurement sensors) may be arranged, and measurement of illuminance based on light passing through a portion having a high light shielding ratio, and measurement of illuminance based on light passing through a low light shielding ratio may be performed. These modes may be combined. Moreover, these modes may be combined with the modes in which control is performed on the basis of the measurement result of the illuminance sensor (environmental illuminance measurement sensor).

The illuminance sensor (environmental illuminance measurement sensor, transmitted light illuminance measurement sensor) only needs to include a known illuminance sensor, and control of the illuminance sensor only needs to be performed on the basis of a known control circuit.

A configuration can be made in which the maximum light transmittance of the light control device is greater than or equal to 50%, and the minimum light transmittance of the light control device is less than or equal to 30%. Note that, examples of an upper limit value of the maximum light transmittance of the light control device can include 99%, and examples of a lower limit value of the minimum light transmittance of the light control device can include 1%. Here, there is a relationship of (light transmittance)=1−(light shielding ratio)

It is sufficient that, a connector is attached to the light control device (specifically, the connector is attached to the first electrode, the second electrode, the first connection portion, or the second connection portion), and the light control device is electrically connected via the connector and a wiring line to a control circuit (which is the light control device/control circuit, and, for example, included in a control device for controlling the image forming device) for controlling the light shielding ratio of the light control device.

In some cases, a configuration can be made in which light passing through the light control device is colored to a desired color by the light control device. Then, in this case, a configuration can be made in which the color of the light to be colored by the light control device is variable, or alternatively, a configuration can be made in which the color of the light to be colored by the light control device is fixed. Note that, in the former case, it is sufficient that a mode is made in which, for example, a light control device that colors the light red, a light control device that colors the light green, and a light control device that colors the light blue are layered. Furthermore, in the latter case, as the color of the light to be colored by the light control device, although it is not limited, brown can be exemplified.

If a configuration is made in which one of the substrates constituting the light control device also serves as a constituent member of the optical device, the weight of the entire display device can be reduced, and there is no possibility to cause a user of the display device to feel uncomfortable. Note that, a configuration can be made in which the other of the substrates is thinner than the one of the substrates.

Example 1

Figure 2:
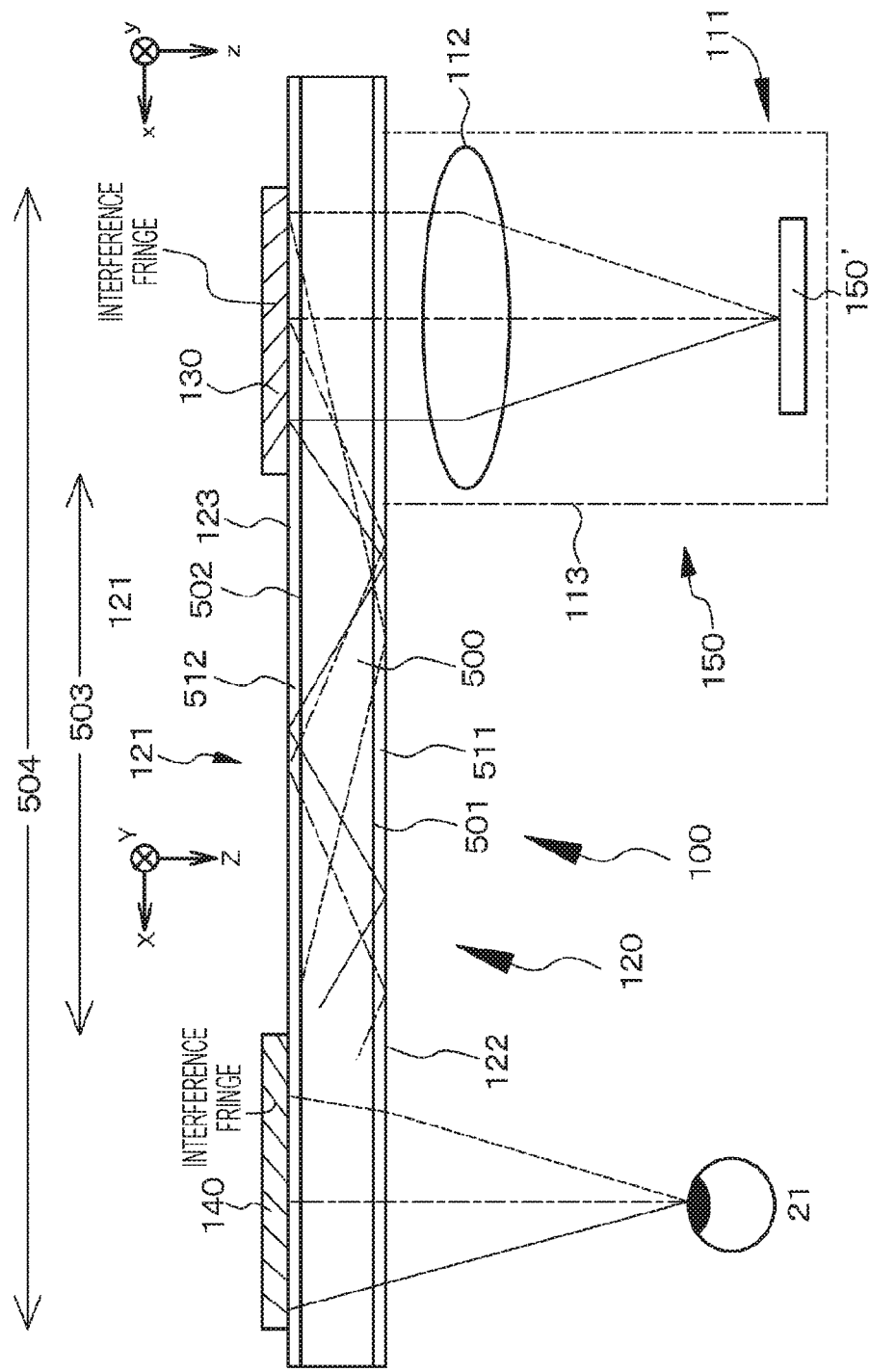
FIG. 2 is another conceptual diagram of the image display device in the display device of Example 1.
Figure 3:
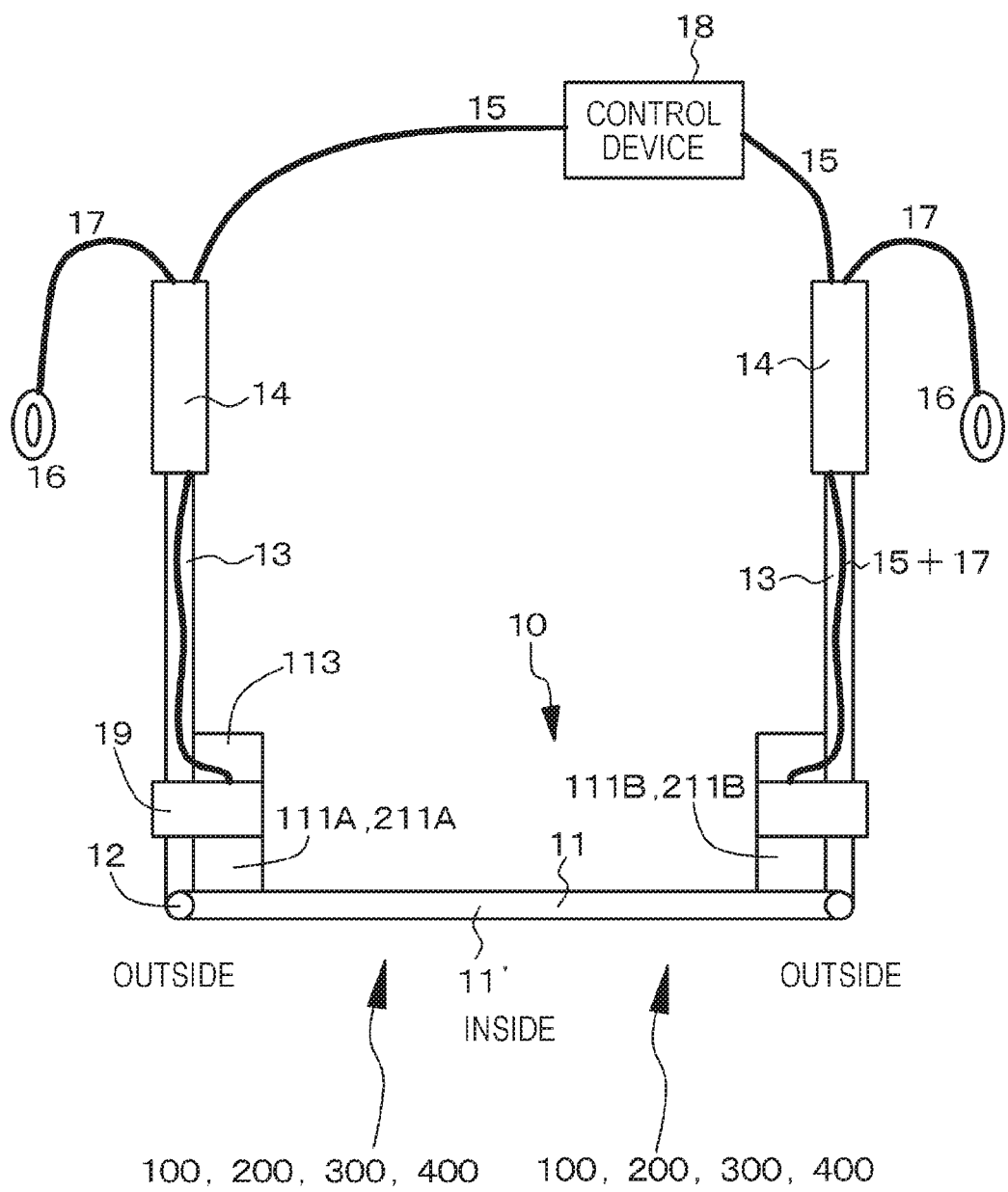
FIG. 3 is a schematic diagram of the display device of Example 1 as viewed from above.
Figure 4A:
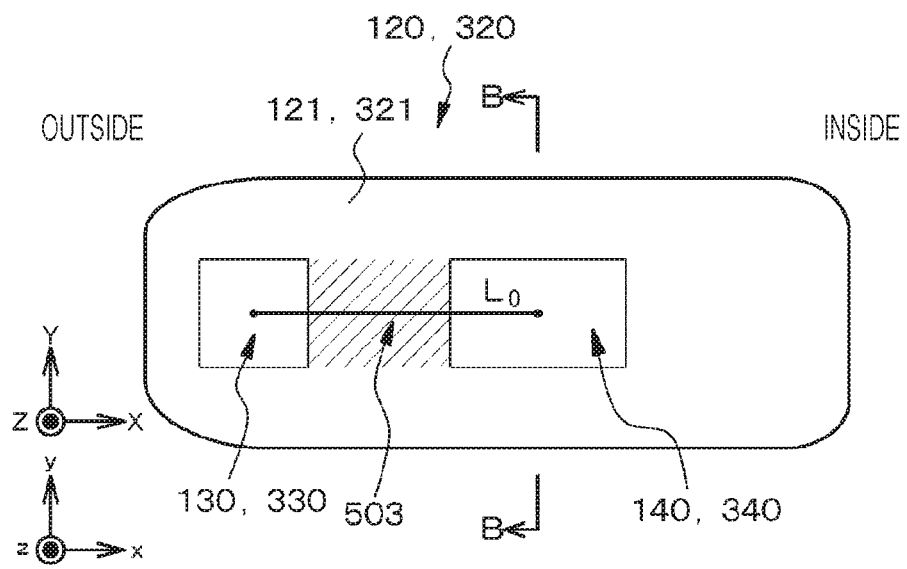
FIGS. 4A and 4B respectively are a schematic front view of an optical device (however, for a right eye) in the display device of Example 1, and a schematic cross-sectional view along an arrow B-B of FIG. 4A.
Figure 4B:
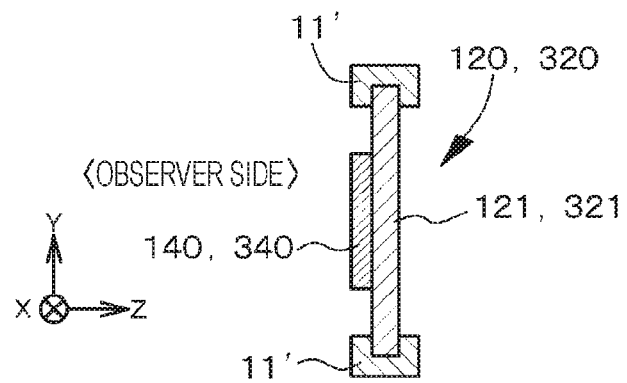
Figure 4C:
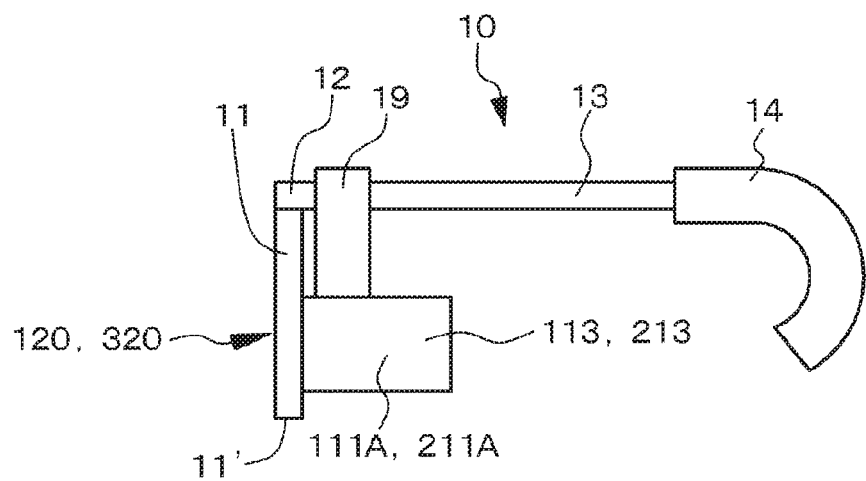
FIG. 4C is a schematic side view of the display device (mainly for the right eye) when the display device of Example 1 is viewed from a left eye side.
Figure 5:
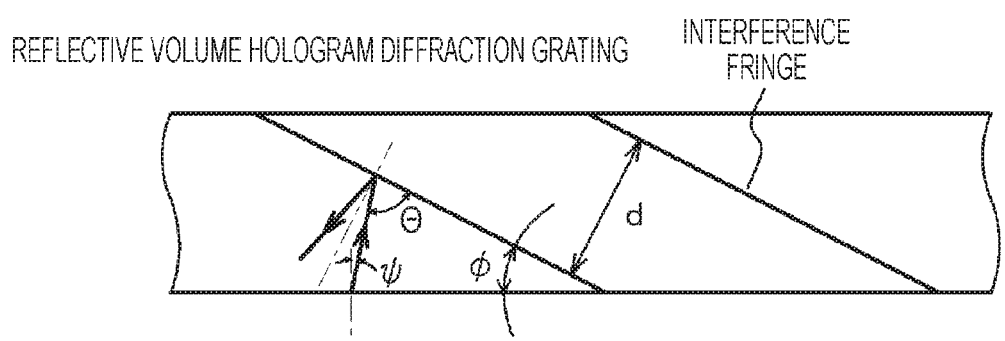
FIG. 5 is a schematic cross-sectional view illustrating a part of a reflective volume hologram diffraction grating in the display device of Example 1 in an enlarged manner.

Example 1 relates to a display device (specifically, a head mounted display, HMD) of the present disclosure, and specifically, relates to a display device according to the first to second aspects of the present disclosure, the display device including an optical device of the first structure and an image forming device of the first configuration. FIGS. 1 and 2 each illustrate a conceptual diagram of an image display device in a display device of Example 1, and FIG. 3 illustrates a schematic diagram of the display device of Example 1 as viewed from above. Furthermore, FIG. 4A illustrates a schematic front view of an optical device and a light control device (however, for a right eye) in the display device of Example 1, and FIG. 4B illustrates a schematic cross-sectional view along an arrow B-B in FIG. 4A, and FIG. 4C illustrates a schematic side view of the display device (mainly for the right eye) when the display device is viewed from a left eye side. Moreover, FIG. 5 is a schematic cross-sectional view illustrating a part of the reflective volume hologram diffraction grating in the display device of Example 1 in an enlarged manner.

The display device of Example 1 or Examples 2 to 10 as described later includes (A) a frame 10 to be mounted on the observer's head, and
(B) an image display device 100, 200, 300, or 400 attached to the frame 10. Note that, although the display device of Examples is specifically a binocular type including two image display devices, the display device may be a single eye type including one. Furthermore, an image forming device 111 or 211 displays, for example, a single color image. The wavelength $\lambda_0$ of light emitted from the image forming device 111 or 211 is 523 nm (green).

Then, the image display device 100, 200, 300, or 400 in Example 1 or Examples 2 to 10 as described later includes (a) an image forming device 111 or 211, and
(b) an optical device 120 or 320. Moreover, the image display device 100, 200, 300, or 400 in Example 1 or Examples 2 to 9 as described later includes (c) an optical system (parallel light emission optical system) 112 or 254 that makes light emitted from the image forming device 111 or 211 into parallel light, and light flux made into the parallel light by the optical system 112 or 254 is incident on the optical device 120 or 320, guided, and emitted. The optical device includes a virtual image formation region in which a virtual image is formed on the basis of the light emitted from the image forming device 111 or 211.

The optical device 120 or 320 in Example 1 or Examples 2 to 10 as described later includes (b-1) a light guide plate 121 or 321 including a first surface 122 or 322, and a second surface 123 or 323 facing the first surface 122 or 322, in which light incident from the image forming device 111 or 211 is propagated by total reflection inside and then emitted toward the observer (b-2) a first deflection means 130 or 330 arranged on at least one of the first surface 122 or 322, or the second surface 123 or 323 of the light guide plate 121 or 321, the first deflection means 130 or 330 deflecting the light incident on the light guide plate 121 or 321 to cause the light incident on the light guide plate 121 or 321 to be totally reflected inside the light guide plate 121 or 321, and (b-3) a second deflection means 140 or 340 arranged on at least one of the first surface 122 or 322, or the second surface 123 or 323 of the light guide plate 121 or 321, the second deflection means 140 or 340 deflecting the light propagated by total reflection inside the light guide plate 121 or 321 to cause the light propagated by total reflection inside the light guide plate 121 or 321 to be emitted from the light guide plate 121 or 321. Here, the virtual image formation region of the optical device is constituted by the second deflection means 140 or 340. The optical device 120 or 320 is the see-through type (semi-transmissive type).

Then, the light guide plate 121 or 321 includes a substrate 500 including a first surface 501 and a second surface 502 facing the first surface 501, a first planarizing film 511 formed on the first surface 501 of the substrate 500, the first planarizing film 511 containing an organic material, and a second planarizing film 512 formed on the second surface 502 of the substrate 500, the second planarizing film 512 containing an organic material.

In Example 1 or Examples 2 to 10 as described later, the light guide plate 121 or 321 includes two parallel surfaces (the first surface 122 or 322, and the second surface 123 or 323) extending parallel to a light propagation direction (X-axis) by total internal reflection of the light guide plate 121 or 321. The first surface 122 or 322, and the second surface 123 or 323 face each other. Then, parallel light is incident from the first surface 122 or 322 corresponding to a light incident surface, propagated by total reflection inside, and then emitted from the first surface 122 or 322 corresponding to a light emission surface. However, this is not a limitation, and the light incident surface may be constituted by the second surface 123 or 323, and the light emission surface may be constituted by the first surface 122 or 322. Furthermore, the first deflection means 130 or 330 is arranged on the second surface 123 or 323 of the light guide plate 121 or 321, and the second deflection means 140 or 340 is also arranged on the second surface 123 or 323 of the light guide plate 121 or 321.

In Example 1, the image forming device 111 is an image forming device of the first configuration, and includes a plurality of pixels arrayed in a two-dimensional matrix. Specifically, as illustrated in FIG. 1, the image forming device 111 includes a reflective spatial light modulation device 150 and a light source 153 including a light emitting diode that emits white light. The whole of each image forming device 111 is housed in a housing 113 (illustrated by a one-dot chain line in FIG. 1), the housing 113 is provided with an opening (not illustrated), and light is emitted from the optical system (parallel light emission optical system, collimating optical system) 112 via the opening. The reflective spatial light modulation device 150 includes a liquid crystal display device (LCD) 151 including LCOS as a light valve, and a polarization beam splitter 152 that reflects a part of light from the light source 153 to guide the light to the liquid crystal display device 151, and causes a part of light reflected by the liquid crystal display device 151 to pass to guide the light to the optical system 112. The liquid crystal display device 151 includes a plurality of (for example, 640×480) pixels (liquid crystal cells) arrayed in a two-dimensional matrix. The polarization beam splitter 152 has a known configuration and structure. Unpolarized light emitted from the light source 153 collides with the polarization beam splitter 152. In the polarization beam splitter 152, a p-polarized light component passes and is emitted out of the system. On the other hand, an s-polarized light component is reflected by the polarization beam splitter 152, is incident on the liquid crystal display device 151, is reflected inside the liquid crystal display device 151, and is emitted from the liquid crystal display device 151. Here, among the light emitted from the liquid crystal display device 151, the light emitted from the pixel displaying "white" includes many p-polarized light components, and the light emitted from the pixel displaying "black" includes many s-polarized light components. Thus, among the light emitted from the liquid crystal display device 151 and colliding with the polarization beam splitter 152, the p-polarized light component passes through the polarization beam splitter 152 and is guided to the optical system 112. On the other hand, the s-polarized light component is reflected by the polarization beam splitter 152 and returned to the light source 153. The optical system 112 includes, for example, a convex lens, and the image forming device 111 (more specifically, the liquid crystal display device 151) is arranged at a place (position) of a focal length in the optical system 112 to generate parallel light.

Alternatively, as illustrated in FIG. 2, the image forming device 111 includes an organic EL display device 150'. An image emitted from the organic EL display device 150' passes through the convex lens 112, becomes parallel light, and travels to the light guide plate 121. The organic EL display device 150' includes a plurality of (for example, 640×480) pixels (organic EL elements) arrayed in a two-dimensional matrix.

The frame 10 includes a front portion 11 arranged in front of the observer, two temple portions 13 respectively attached rotatably to both ends of the front portion 11 via hinges 12, and an end cover portion (also referred to as a tip cell, an earpiece, or an ear pad) 14 attached to a tip of each temple portion 13. Furthermore, a nose pad (not illustrated) is attached. In other words, an assembly of the frame 10 and the nose pad basically has substantially the same structure as that of ordinary glasses. Moreover, each housing 113 is detachably attached to the temple portion 13 by an attachment member 19. The frame 10 is manufactured from metal or plastic. Note that, each housing 113 may be attached by the attachment member 19 to the temple portion 13 not to be detachable. Furthermore, although a state is illustrated in which each housing 113 is attached to the inner side of the temple portion 13, the housing 113 may be attached to the outer side of the temple portion 13.

Moreover, a wiring line (signal line, power supply line, or the like) 15 extending from one image forming device 111A extends from the tip of the end cover portion 14 to the outside via the temple portion 13 and the inside of the end cover portion 14, and is connected to a control device (control circuit, control means) 18. Moreover, each of image forming devices 111A and 111B includes a headphone portion 16, and a headphone portion wiring line 17 extending from each of the image forming devices 111A and 111B extends from the tip of the end cover portion 14 to the headphone portion 16 via the temple portion 13 and the inside of the end cover portion 14. The headphone portion wiring line 17 more specifically extends from the tip of the end cover portion 14 to the headphone portion 16 to wrap around the back side of a pinna (auricle). With such a configuration, it is possible to provide a neat display device without giving an impression that the headphone portion 16 and the headphone portion wiring line 17 are arranged messily.

In the optical device of Example 1, the substrate 500 contains a resin material. Specifically, the main component of the substrate 500 is a cycloolefin polymer (COP). The refractive index $n_0$ of the cycloolefin polymer is 1.53. The thickness of the substrate 500 is 1 mm. The first planarizing film 511 and the second planarizing film 512 each contain a material whose main component is an organic material containing an acrylic material (specifically, UV-curable coating agent whose main component is an acrylic resin and to which silica is added as an additive). The refractive index $n_1$ of the material constituting the first planarizing film 511 and the refractive index $n_2$ of the material constituting the second planarizing film 512 are each 1.51. The thickness of each of the first planarizing film 511 and the second planarizing film 512 is 1 μm. As described above, the first planarizing film 511 and the second planarizing film 512 include the same material and have the same thickness, and satisfy $n_1 \geq 1.48$, $n_2 \geq 1.48$, and $n_0 \geq 1.48$.

In Example 1, the first deflection means (first diffraction grating member) 130 and the second deflection means (second diffraction grating member) 140 are arranged on the second surface 502 of the substrate 500 (on a surface of the opposite side from the observer). Then, the first deflection means 130 diffracts the light incident on the light guide plate 121, and the second deflection means 140 diffracts the light propagated by total reflection inside the light guide plate 121. The first deflection means 130 and the second deflection means 140 each include a hologram diffraction grating, more specifically, a reflective volume hologram diffraction grating. Here, the hologram diffraction grating contains an acrylic material and a urethane-based material. Alternatively, the hologram diffraction grating, the first planarizing film 511, and the second planarizing film 512 each contain an organic material whose main component is an acrylic material. Then, in Example 1 or Example 2 as described later, the first diffraction grating member 130 and the second diffraction grating member 140 are each made to have a configuration in which one diffraction grating layer is layered. In each diffraction grating layer containing a photopolymer material, interference fringes corresponding to one type of wavelength band (or wavelength) are formed, and the interference fringes are manufactured by a conventional method. The pitch of the interference fringes formed in the diffraction grating layer (diffractive optical element) is constant, and the interference fringes are linear and parallel to the Y-axis. The axis lines of the first diffraction grating member 130 and the second diffraction grating member 140 are parallel to the X-axis, and the normal lines are parallel to the Z-axis.

Then, the first diffraction grating member 130 is arranged (bonded) on the second planarizing film 512 formed on the second surface 502 of the substrate 500 as described above, and diffracts (specifically, diffracts and reflects) the parallel light incident from the first surface 122 of the light guide plate 121 on the light guide plate 121 so that the parallel light incident on the light guide plate 121 is totally reflected inside the light guide plate 121. Moreover, the second diffraction grating member 140 is also arranged (bonded) on the second planarizing film 512 formed on the second surface 502 of the substrate 500 as described above, and diffracts (specifically, diffracts and reflects a plurality of times) the parallel light propagated by total reflection inside the light guide plate 121, and emits the parallel light from the first surface 122 as the parallel light from the light guide plate 121.

FIG. 5 illustrates an enlarged schematic partial sectional view of a reflective volume hologram diffraction grating. In the reflective volume hologram diffraction grating, interference fringes having an inclination angle (slant angle) $\phi$ are formed. Here, the inclination angle $\phi$ refers to an angle formed by the surface of the reflective volume hologram diffraction grating and the interference fringes. The interference fringes are formed from the inside to the surface of the reflective volume hologram diffraction grating. The interference fringes satisfy the Bragg condition. Here, the Bragg condition means a condition that satisfies the following equation (A). In the equation (A), m is a positive integer, $\lambda$ is a wavelength, d is a pitch of a lattice plane (an interval in the normal direction of a virtual plane including the interference fringes), and $\Theta$ is a complementary angle of an incident angle to the interference fringes. Furthermore, a relationship between $\Theta$, the inclination angle $\phi$, and an incident angle $\psi$ in a case where light is incident on the diffraction grating member at the incident angle $\psi$ is as indicated in the equation (B).

$$m \cdot \lambda = 2 \cdot d \cdot \sin(\Theta) \tag{A}$$

$$\Theta = 90° - (\phi + \psi) \tag{B}$$

Then, in the light guide plate 121, the parallel light is propagated by total reflection inside, and then emitted. At this time, since the light guide plate 121 is thin and a light path traveling inside the light guide plate 121 is long, the number of total reflections up to the second diffraction grating member 140 varies depending on angles of view. More specifically, among the parallel light incident on the light guide plate 121, the number of reflections of the parallel light incident at an angle in a direction approaching the second diffraction grating member 140 is less than the number of reflections of the parallel light incident on the light guide plate 121 at an angle in a direction away from the second diffraction grating member 140. This is because an angle formed between light propagating inside the light guide plate 121 and the normal line of the light guide plate 121 when the light collides with the inner surface of the light guide plate 121 is smaller of the parallel light that is diffracted by the first diffraction grating member 130 and incident on the light guide plate 121 at the angle in the direction approaching the second diffraction grating member 140 than of the parallel light incident on the light guide plate 121 at an angle in the opposite direction. Furthermore, a shape of the interference fringes formed inside the second diffraction grating member 140 and a shape of the interference fringes formed inside the first diffraction grating member 130 are in a symmetrical relationship with respect to a virtual plane perpendicular to the axis line of the light guide plate 121.

The thickness of the hologram diffraction grating constituting the first deflection means 130 is 3 µm, and the thickness of the hologram diffraction grating constituting the second deflection means 140 is 1 µm. Furthermore, planar shapes of the first deflection means 130 and the second deflection means 140 are rectangular. The length of the first deflection means 130 along the X-axis is 5.0 mm, the length of the second deflection means 140 along the X-axis is 20.0 mm, and the length along the X-axis of a light guide region 503 that is a region of the light guide plate 121 sandwiched by orthogonal projection images on the substrate 500 of the first deflection means 130 and the second deflection means 140 is 25.0 mm. The length along the X-axis of an entire light guide region 504 is (5.0+25.0+20.0)=50.0 mm. The x direction is parallel to the X-axis, and the y direction is parallel to the Y-axis. Note that, in FIG. 4A, to clearly illustrate the light guide region 503, the light guide region 503 is hatched. The line segment $L_0$ (see FIG. 4A) connecting the incident point and the emission point of the light guide plate 121 or 321 include one line segment. It is preferable that a portion of the first planarizing film 511 and a portion of the second planarizing film 512 included in the light guide region 503 or the entire light guide region 504 satisfy the various definitions described above, but in some cases, a portion (region) of the first planarizing film 511 and a portion (region) of the second planarizing film 512 along (corresponding to) the line segment $L_0$ may satisfy the various definitions described above.

Such a light guide plate 121 can be manufactured by a method described below. In other words, after the substrate 500 is washed, the substrate 500 is immersed in an organic solution in which the materials constituting the first planarizing film 511 and the second planarizing film 512 are dissolved, and subsequently, the substrate 500 is taken out of the organic solution and an organic solvent is removed, and then UV irradiation is performed to form the first planarizing film 511 and the second planarizing film 512 on the first surface 501 and the second surface 502 of the substrate 500. In this way, the light guide plate 121 can be obtained. Then, the optical device 120 can be obtained by pasting the first deflection means 130 and the second deflection means 140 each including the reflective volume hologram diffraction grating to a predetermined portion of the second planarizing film 512.

One of features of Example 1 is that the first planarizing film 511 and the second planarizing film 512 each having high surface flatness are provided on the substrate 500 containing a resin material. The root mean square roughness (Rq or RMS) of each of the first surface 122 of the light guide plate 121 corresponding to the outer surface of the first planarizing film 511, and the second surface 123 of the light guide plate 121 corresponding to the outer surface of the second planarizing film 512 is less than or equal to 3 nm. Generally, it is difficult to improve the surface flatness of the substrate 500 containing a resin material compared to a glass substrate, and in the light guide plate 121 using the substrate 500 containing a resin material, it is difficult to obtain the contrast equivalent to that of a light guide plate using a glass substrate. However, in Example 1, by forming the first planarizing film 511 and the second planarizing film 512 on the substrate 500 containing a resin material, values of the contrast and MTF can be made equivalent to those of a light guide plate using a glass substrate. The experimental data will be described below.

Figure 20:
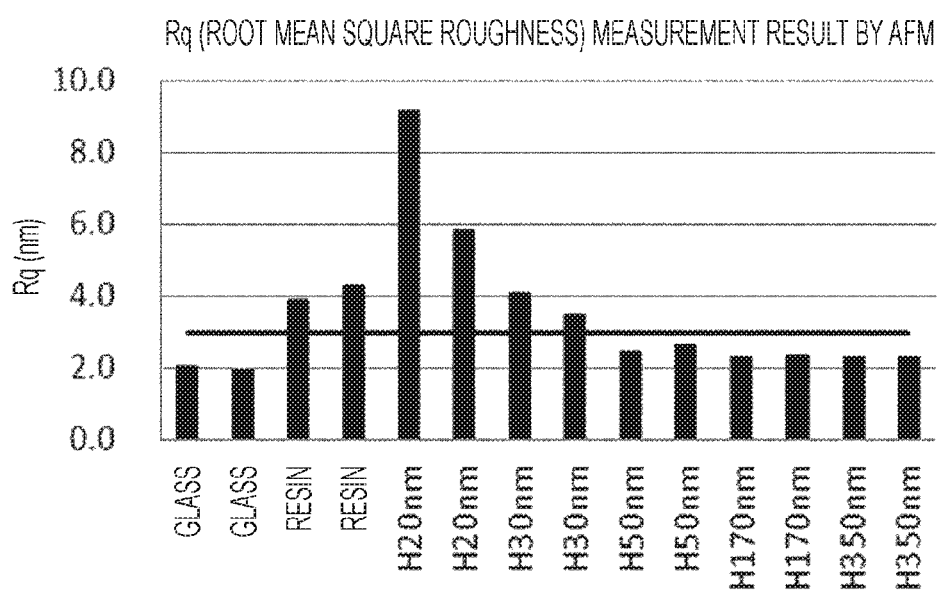
FIG. 20 is a diagram illustrating measurement results (measurement device: AFM) of a root mean square roughness Rq of a glass substrate, a resin substrate, and a light guide plate of Example 1.

FIG. 20 illustrates a measurement result of the root mean square roughness Rq of each of the glass substrate, the resin substrate (using the resin substrate of Example 1), and the light guide plate of Example 1. Here, as the glass substrate, an optical glass substrate was used having a surface roughness of precision quality. Note that, in FIG. 20, the measurement result of the glass substrate is indicated by "glass", and the measurement result of the resin substrate is indicated by "resin". Furthermore, although the measurement result of the light guide plate of Example 1 is illustrated by "H", the number attached after "H" indicates the thickness of the planarizing film. For example, "H20nm" indicates a light guide plate of Example 1 provided with a planarizing film having a thickness of 20 nm.

An atomic force microscope (AFM) was used to measure Rq. As a cantilever, Micro cantilever (model number: OMCL-AC160BN-A2) was used. Furthermore, in consideration of balance between variation reduction and measurement time, the scanning range was 10 μm and the scanning speed was 1 Hz.

As illustrated in FIG. 20, the value of Rq of the outer surface of the glass substrate is 2.0 nm to 2.1 nm, the value of Rq of the outer surface of the resin substrate is 3.9 nm to 4.3 nm, and the resin substrate was lower in surface flatness than the glass substrate. The measurement results of Rq of the light guide plate of Example 1 was 5.9 nm to 9.2 nm when the thickness of the planarizing film was 20 nm, which was larger than that of the resin substrate. Furthermore, when the thickness of the planarizing film was 30 nm, the value of Rq was 3.5 nm to 4.2 nm, which was the same level as that of the resin substrate. Moreover, when the thickness of the planarizing film was 50 nm, the value of Rq was 2.5 nm to 2.7 nm, which was smaller than the value of Rq of the resin substrate. When the thickness of the planarizing film was 170 nm and 350 nm, the value of Rq was 2.3 nm to 2.4 nm, which was almost equivalent to that of the glass substrate. As described above, as the thickness of the planarizing film increased, the value of Rq decreased and the surface flatness increased. The reason is considered to be that the thickness of the planarizing film needs to be greater than or equal to a certain value to planarize surface unevenness of the resin substrate.

Figure 21A:
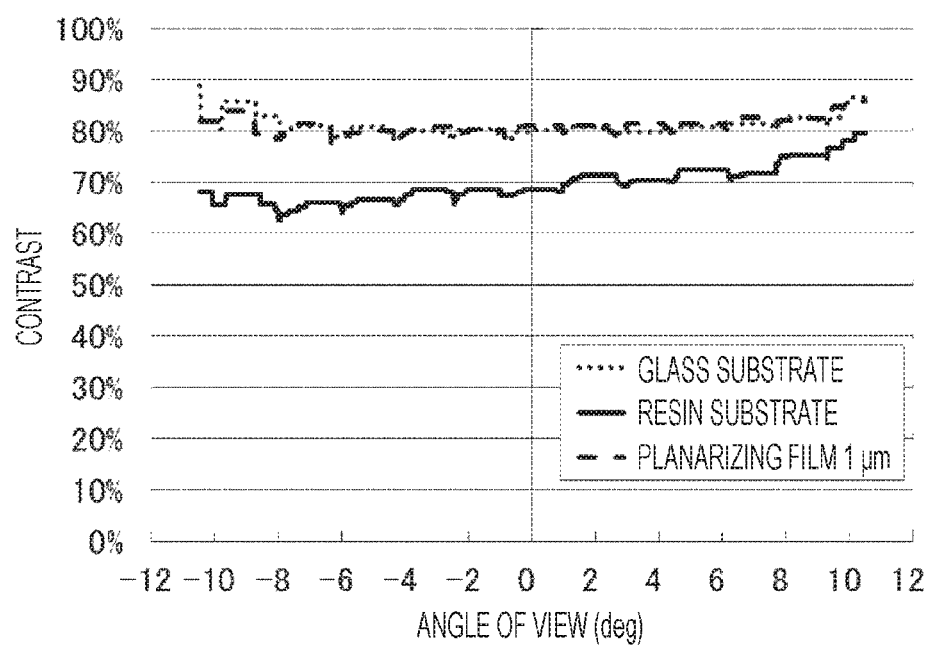
FIG. 21A is a chart indicating measurement results of contrast of a light guide plate including a glass substrate (Comparative Example 1A), a light guide plate including a resin substrate not provided with a planarizing film (Comparative Example 1B), and a light guide plate of Example 1A (where, a thickness of each of the first planarizing film and the second planarizing film is 1 μm)
Figure 21B:
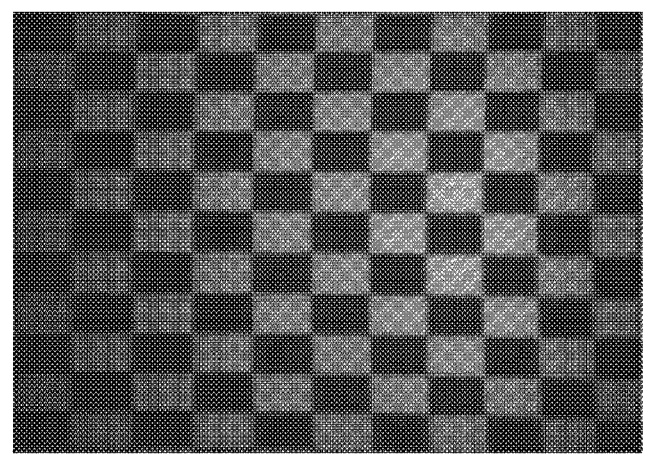
FIG. 21B is a diagram illustrating a black and white checkered pattern of 0.3 lp/(1 degree of angle of view) used in the measurement of the contrast.

In FIG. 21A, measurement results of the contrast are indicated of each of a light guide plate including a glass substrate (Comparative Example 1A, represented by "glass substrate" in FIG. 21A), a light guide plate including a resin substrate (resin substrate of Example 1) not provided with a planarizing film (Comparative Example 1B, represented by "resin substrate" in FIG. 21A), and a light guide plate of Example 1A (thicknesses of the first planarizing film 511 and the second planarizing film 512 are each 1 μm, represented by "planarizing film 1 μm" in FIG. 21A). In FIG. 21A, the horizontal axis indicates an angle of view. Here, the angle of view corresponds to a rotation angle in the left and right direction within a plane of the drawing from the front direction of a pupil 21 of the observer in FIG. 1, and in FIG. 1, the right direction (first deflection means side) is set as plus, and the left direction is set as minus. In the measurement of the contrast, in the black and white checkered pattern of 0.3 lp/(1 degree of angle of view) as illustrated in FIG. 21B, the contrast is obtained from {(brightness of white checkered pattern)−(brightness of black checkered pattern)}/{(brightness of white checkered pattern)+(brightness of black checkered pattern)}.

As can be seen from FIG. 21A, the value of the contrast in the light guide plate of Example 1A is equivalent to the value of the contrast in the light guide plate of Comparative Example 1A, and is higher than the value of the contrast in the light guide plate of Comparative Example 1B. This is considered to be because, in the light guide plate of Comparative Example 1B, the surface flatness of the light guide region is low, so that light scattering occurs at the interface between the atmosphere and the resin substrate during total reflection of the light in the light guide region.

Here, as a reference of the contrast of the head mounted display, a newspaper can serve as a reference as an index of whether it is easy to read characters. The contrast ratio of the newspaper is, for example, 1.0:7.8 according to Ricoh Technical Report No. 39, pp. 62 (2014). If this is converted to the contrast by the above equation, $(7.8-1.0)/(7.8+1.0)=0.77$ is obtained. As can be seen from FIG. 21A, in the light guide plate of Comparative Example 1B, the contrast ratio is lower than the contrast ratio of the newspaper, but in the light guide plate of Example 1A, the contrast ratio is higher than that of the newspaper, and it becomes easier to read characters.

Figure 22A:
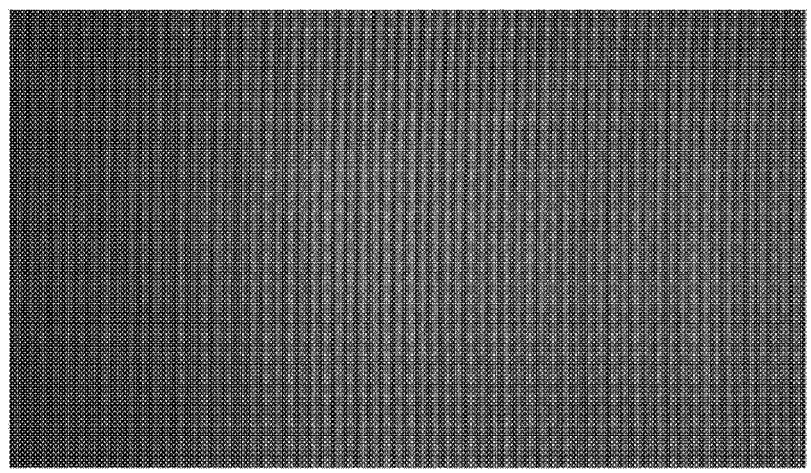
FIGS. 22A and 22B respectively are a diagram illustrating a black and white stripe pattern in which vertical lines are arranged horizontally for measuring a horizontal direction MTF, and a diagram illustrating a black and white stripe pattern in which horizontal lines are arranged vertically for measuring a vertical direction MTF.

Furthermore, Table 1 indicates horizontal direction MTF measurement results of each of the light guide plate of Comparative Example 1A, the light guide plate of Comparative Example 1B, and the light guide plate of Example 1A. Here, MTF is a performance evaluation method by a contrast reproduction ratio, and MTF at a specific spatial frequency corresponds to resolution, and the larger the value, the higher the resolution. Table 1 illustrates the horizontal direction MTF measurement results at three points in the front direction (angle of view 0 degrees), the angle of view +8 degrees, and the angle of view −8 degrees of the observer's pupil 21 in FIG. 1. The horizontal direction MTF is measured with a black and white stripe pattern in which vertical lines are arranged in the horizontal direction as illustrated in FIG. 22A. The spatial frequency was 4.6 lp/(1 degree of angle of view). As can be seen from Table 1, the values of the horizontal direction MTF of the light guide plates of Example 1A and Comparative Example 1A are almost equivalent to each other, but the values of the horizontal direction MTF of the light guide plate of Comparative Example 1B are lower than those of the light guide plates of Example 1A and Comparative Example 1A.

Table 1 illustrates, as Example 1B, a case where the adhesion is poor between the second planarizing film 512 and the second deflection means 140. In this case, the value of MTF is lower at the angle of view −8 degrees, that is, an outside direction of the second deflection means 140. To prevent that the adhesion thus becomes poor, measures below are effective.

(A) The surface flatness is improved of the portion of the planarizing film where the deflection means is formed, to make the value of Rq less than or equal to 3 nm.

(B) The adhesion is improved between the planarizing film and the deflection means by making both the planarizing film and the deflection means contain an acrylic material.

Figure 22B:
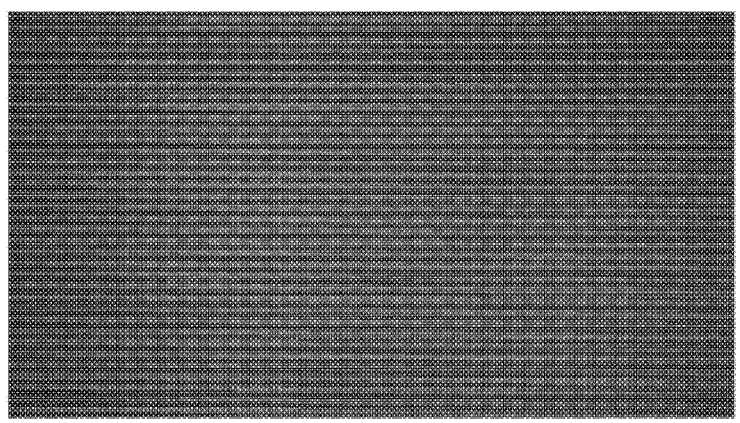

Moreover, Table 1 indicates vertical direction MTF measurement results of each of the light guide plate of Comparative Example 1A, the light guide plate of Comparative Example 1B, and the light guide plate of Example 1A. Table 1 illustrates the vertical direction MTF measurement results at three points in the front direction (elevation angle 0 degrees), the elevation angle +3 degrees, and the elevation angle −3 degrees of the observer's pupil 21 in FIG. 1. The vertical direction MTF is measured with a black and white stripe pattern in which horizontal lines are vertically arranged as illustrated in FIG. 22B. The spatial frequency was 4.6 lp/(1 degree of elevation angle). As can be seen from Table 1, the values of the vertical direction MTF of the light guide plates of Example 1A and Comparative Example 1A are almost equivalent to each other, but the values of the vertical direction MTF of the light guide plate of Comparative Example 1B are lower than those of the light guide plates of Example 1A and Comparative Example 1A.

TABLE 1

| Angle of view | Horizontal direction MTF | | |
|---|---|---|---|
| | −8 degrees | 0 degrees | +8 degrees |
| Example 1A | 51 | 56 | 44 |
| Example 1B | 41 | 56 | 44 |
| Comparative example 1A | 52 | 57 | 44 |
| Comparative example 1B | 30 | 41 | 26 |
| Elevation angle | Vertical direction MTF | | |
| | −3 degrees | 0 degrees | +3 degrees |
| Example 1A | 61 | 54 | 50 |
| Comparative example 1A | 65 | 58 | 51 |
| Comparative example 1B | 52 | 30 | 42 |

As described above, by forming the planarizing films 511 and 512 each having a thickness of 1 μm, the values of the contrast and MTF can be made equivalent to those of a light guide plate using a glass substrate even with a light guide plate using a resin substrate.

According to the experiments of the present inventors, as a result of measurement of the values of the contrast and MTF with the thickness of the planarizing film as a parameter, it has been found that the values of the contrast and MTF can be made equivalent to those of a light guide plate using a glass substrate if the thickness of the planarizing film is greater than or equal to 170 nm. This is considered to be because the value of the root mean square roughness Rq becomes almost equivalent to that of the glass substrate by setting the thickness of the planarizing film to greater than or equal to 170 nm, as can be seen from FIG. 20. Furthermore, by setting the thickness of the planarizing film to greater than or equal to 50 nm, the values of the contrast and MTF can be made higher than those of a light guide plate using a resin substrate not provided with the planarizing film. This is considered to be because the value of the root mean square roughness Rq becomes smaller than that of the resin substrate by setting the thickness of the planarizing film to greater than or equal to 50 nm, as can be seen from FIG. 20. From these, it is desirable that the thickness of the planarizing film is greater than or equal to 50 nm ($5 \times 10^{-8}$ m), preferably greater than or equal to 170 nm ($1.7 \times 10^{-7}$ m).

Furthermore, in the optical device 120 according to Example 1, it is desirable that the parallelism of the outer surface of the portion of the second planarizing film 512 included in the region (light guide region) 503 of the light guide plate 121 sandwiched by the orthogonal projection images on the substrate 500 of the first deflection means 130 and the second deflection means 140 with respect to the outer surface of the portion of the first planarizing film 511 included in the region (light guide region) 503 of the light guide plate 121 sandwiched by the orthogonal projection images on the substrate 500 of the first deflection means 130 and the second deflection means 140 is less than or equal to 2/60 degrees, preferably less than or equal to 1/60 degrees. Moreover, it is desirable that the parallelism of the outer surface of the portion of the second planarizing film 512 included in the region (entire light guide region 504) of the substrate 500 including the orthogonal projection images on the substrate 500 of the first deflection means 130 and the second deflection means 140 with respect to the outer surface of the portion of the first planarizing film 511 included in the region (the entire light guide region 504) of the substrate 500 including the orthogonal projection images on the substrate 500 of the first deflection means 130 and the second deflection means 140 is less than or equal to 2/60 degrees, preferably less than or equal to 1/60 degrees. Here, the parallelism is an angular deviation from the parallel of an average surface position of the first surface 122 of the light guide plate 121 and an average surface position of the second surface 123. When the angular deviation in the light guide region 503 or the entire light guide region 504 becomes large, the light to be guided deviates from a design value angle, and the contrast and MTF decrease. To avoid occurrence of such a problem, as described above, the parallelism is desirably less than or equal to 2/60 degrees, preferably less than or equal to 1/60 degrees.

Furthermore, in a case where the light guide plate 121 is manufactured by the method described above (a method of immersing the substrate 500 in an organic solution in which the materials constituting the first planarizing film 511 and the second planarizing film 512 are dissolved), if the final thicknesses of the first planarizing film 511 and the second planarizing film 512 each exceed 3 μm, it becomes difficult to set the parallelism to less than or equal to 2/60 degrees. Therefore, the thicknesses of the first planarizing film 511 and the second planarizing film 512 are each preferably less than or equal to 3 μm ($3 \times 10^{-6}$ m).

In other words, it is desirable that the thickness of the portion of the first planarizing film 511 included in the region (light guide region) 503 of the light guide plate 121 sandwiched by the orthogonal projection images on the substrate 500 of the first deflection means 130 and the second deflection means 140 is greater than or equal to $5 \times 10^{-8}$ m, preferably greater than or equal to $1.7 \times 10^{-7}$ m, and the thickness of the portion of the second planarizing film 512 included in the region (light guide region) 503 of the light guide plate 121 sandwiched by the orthogonal projection image on the substrate 500 of the first deflection means 130 and the second deflection means 140 is greater than or equal to $5 \times 10^{-8}$ m, preferably greater than or equal to $1.7 \times 10^{-7}$ m.

In addition, it is preferable that the thickness of the portion of the first planarizing film 511 included in the region (light guide region) 503 of the light guide plate 121 sandwiched by the orthogonal projection images on the substrate 500 of the first deflection means 130 and the second deflection means 140 is less than or equal to $3\times10^{-6}$ m, and the thickness of the portion of the second planarizing film 512 included in the region (light guide region) 503 of the light guide plate 121 sandwiched by the orthogonal projection images on the substrate 500 of the first deflection means 130 and the second deflection means 140 is preferably less than or equal to $3\times10^{-6}$ m.

Furthermore, it is preferable that the value of Rq of the outer surface of the portion of the first planarizing film 511 included in the region (light guide region) 503 of the light guide plate 121 sandwiched by the orthogonal projection images on the substrate 500 of the first deflection means 130 and the second deflection means 140 is less than or equal to 3 nm, and the value of Rq of the outer surface of the portion of the second planarizing film 512 included in the region (light guide region) 503 of the light guide plate 121 sandwiched by the orthogonal projection images on the substrate 500 of the first deflection means 130 and the second deflection means 140 is less than or equal to 3 nm.

Moreover, to be used as the light guide plate, naturally, the light transmittance of the substrate with respect to the light incident from the image forming device to the light guide plate 121 or 321 must be high. As a standard in a case where the display device is used as a head mounted display, from the fact that an average of the human eye width is about 60 mm and that $(1/e^2)=0.14$ is often used as a standard of attenuation in optics, it is preferable that: the light transmittance of the material constituting the substrate 500 with respect to the light incident on the light guide plate 121 is greater than or equal to 14% when the thickness of the material constituting the substrate 500 is 60 mm; the light transmittance of the material constituting the first planarizing film 511 with respect to the light incident on the light guide plate 121 or 321 is greater than or equal to 14% when the thickness of the material constituting the first planarizing film 511 is 60 mm; and the light transmittance of the material constituting the second planarizing film 512 with respect to the light incident on the light guide plate 121 or 321 is greater than or equal to 14% when the thickness of the material constituting the second planarizing film 512 is 60 mm. Note that, if the value can be maintained of greater than or equal to 14% at a thickness of 60 mm as the light transmittance to the light from the image forming device, materials other than COP can also be used for the substrate as necessary. For example, in a case where strength is considered to be important, a substrate containing polycarbonate resin can be used. Furthermore, in a case where transparency, or adhesion to the first planarizing film 511 and the second planarizing film 512 is considered to be important, a substrate containing an acrylic-based resin can also be used.

In Example 1, the material constituting the first planarizing film 511 and the second planarizing film 512 was a material whose main component was an organic material containing an acrylic material. The planarizing films contain the material whose main component is an organic material as described above, whereby it can be prevented that fractures or cracks occur on the first planarizing film 511 and the second planarizing film 512 even in a case where the substrate 500 containing a resin material warps, unlike the case of inorganic material. Furthermore, by using an acrylic material, the transparency can be increased. Note that, even with an acrylic material, by devising additives and the like, high adhesion can be maintained to the substrate 500 containing COP. As a standard of the light transmittance of the material constituting the first planarizing film 511 and the second planarizing film 512, as described above, similarly to the substrate 500, the light transmittance with respect to the light from the image forming device is greater than or equal to 14% when the thickness is 60 mm. If the light transmittance can be maintained, a hybrid material of an organic material and an inorganic material or the like can also be used as necessary.

Furthermore, the wavelength of the light incident on the light guide plate 121 was $\lambda_0$ (=523 nm), the refractive index of the substrate 500 was $n_0$ (=1.53), the refractive index of the first planarizing film 511 was $n_1$ (=1.51, where $n_1<n_0$), and the refractive index of the second planarizing film 512 was $n_2$ (=1.51, where $n_2<n_0$). To increase the contrast and MTF, it is preferable that a refractive index difference is as small as possible, and it is ideal to set $n_0=n_1=n_2$, but according to studies of the present inventors, it has been found that it is sufficient if it is satisfied that $|n_1-n_0|/n_0\leq 0.03$ $|n_2-n_0|/n_0\leq 0.03$ Alternatively, a mode can be preferably made in which it is satisfied that $n_1\geq 1.48$, $n_2\geq 1.48$, and $n_0\geq 1.48$, where $n_1$ is the refractive index of the material constituting the first planarizing film 511, $n_2$ is the refractive index of the material constituting the second planarizing film 512, and $n_0$ is the refractive index of the material constituting the substrate 500. As described above, the higher the value of the refractive index, the wider the optical design margin. Furthermore, when the value of the refractive index is greater than or equal to 1.48, the selection range of the material becomes wide.

Furthermore, in Example 1, AFM was used as a method of measuring Rq of the first planarizing film 511 and the second planarizing film 512, and a scanning range was 10 μm. In the case of AFM measurement, the scanning range is preferably about 10 μm in terms of balance between variation reduction and measurement time. As described later, a stylus profiler can also be used for the method of measuring Rq. In the stylus profiler, scan is preferably of about 100 μm in terms of balance between variation reduction and measurement time. Note that, in observation in Example 1, since the surface unevenness has a minute size of nanometer order, with an optical measurement instrument such as a laser microscope, VertScan, or Zygo, accurate measurement is difficult unless lateral resolution of a CCD of a measurement device is extremely high.

In general, it is difficult to improve the surface flatness of a resin substrate compared to an optical glass substrate, and it has been supposed that it is difficult to obtain the contrast equivalent to a light guide plate using an optical glass substrate with a light guide plate using a resin substrate. However, as a result of repeated experiments, the present inventors have uniquely found that the contrast and resolution of the light guide plate become high by formation of a planarizing film having high surface flatness on a resin substrate. Then, as a result of repeated analyses, it has been discovered that: the resin substrate has minute unevenness on the outer surface; the surface flatness is lower than that of the glass substrate; and the contrast and resolution of a light guide plate using a resin substrate can be made as high as those of a light guide plate using a glass substrate by providing a planarizing film on the resin substrate to make the surface flatness comparable to the glass substrate. Furthermore, from the above, the reason why the contrast and resolution of a light guide plate using a resin substrate are lower than those of a light guide plate using a glass substrate is considered to be because light scattering occurs between the surface of the substrate and the atmosphere in the light guide region of the light due to the minute unevenness of the outer surface of the resin substrate.

Indeed, the surface flatness of a substrate containing a resin material is about 4 nm in the value of the root mean square roughness Rq, which is an extremely small value compared to several hundred nm of the wavelength of visible light to be guided, so that It has been thought that there is $n_0$ significant influence on optical characteristics. However, according to experiments, the present inventors have found that reflection of light repeatedly occurs in the light guide region in the light guide plate, so that even the unevenness that generally seems to be minute affects the contrast and the resolution. Then, from these findings uniquely obtained, the present inventors have succeeded to obtain the contrast and resolution equivalent to those of the light guide plate using the glass substrate by forming a predetermined planarizing film on a substrate containing a resin material.

In other words, as described above, in the optical device of Example 1 or the display device of Example 1, the first planarizing film containing a material whose main component is an organic material is formed on the first surface of the substrate, and the second planarizing film containing a material whose main component is an organic material is formed on the second surface of the substrate. Thus, it becomes possible to provide high surface smoothness entirely to the light guide plate including the first planarizing film and the second planarizing film formed on the resin substrate. Then, as a result, a light guide plate can be provided having good optical characteristics.

More specifically, an optical device can be provided including a light guide plate using a lightweight substrate containing a resin material, and having contrast and resolution equivalent to those of an optical device including a light guide plate using a glass substrate, and a display device can be provided including such an optical device. Furthermore, a surface polishing process of the substrate can be simplified, and the optical device and the display device including such an optical device can be provided at low cost.

Example 2

Figure 6:
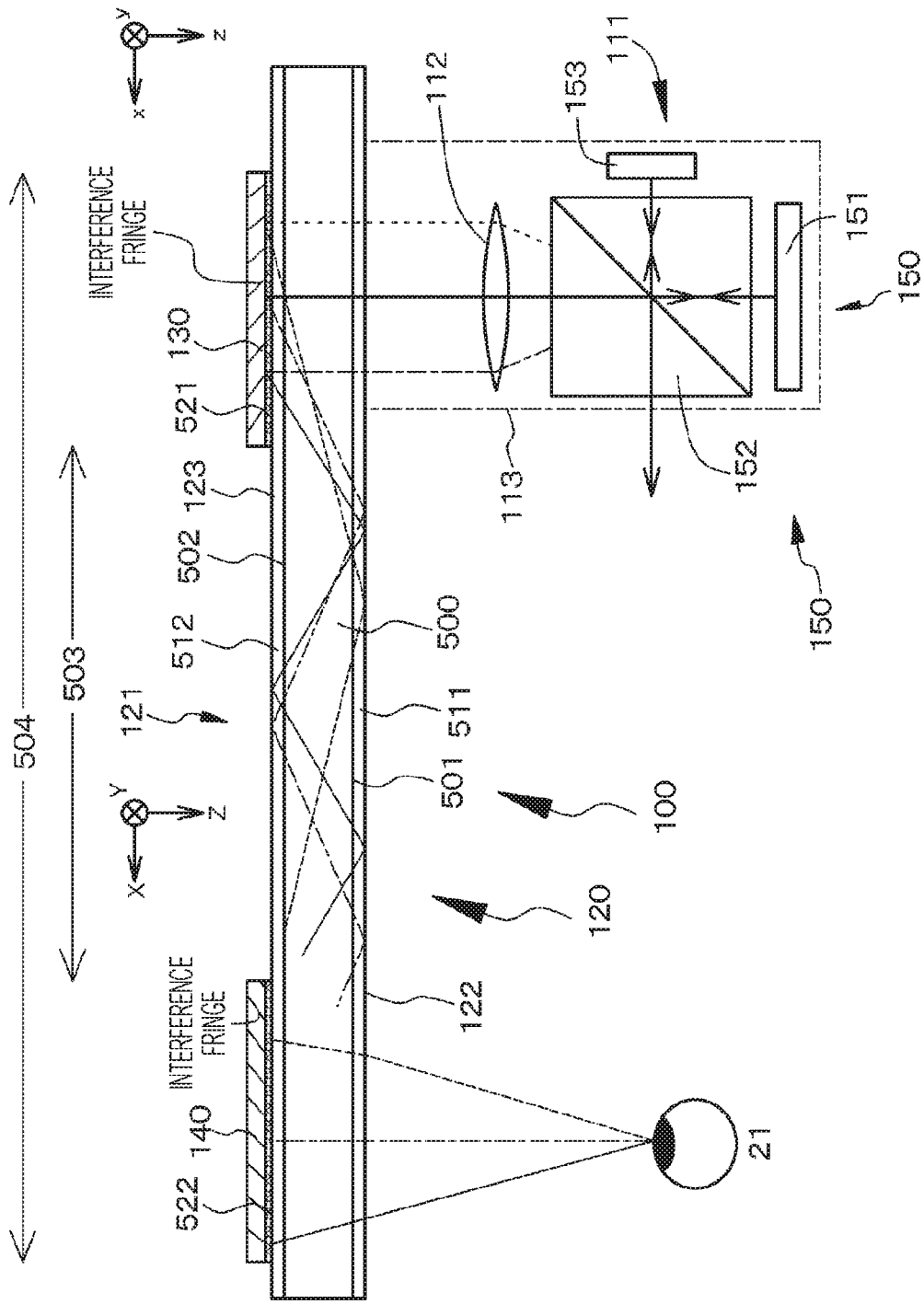
FIG. 6 is a conceptual diagram of an image display device in a display device of Example 2.

Example 2 is a modification of Example 1. FIG. 6 illustrates a conceptual diagram of an image display device in a display device (head mounted display) of Example 2. In the optical device according to Example 2, a first adhesive layer 521 is formed between the first deflection means 130 and the second planarizing film 512, and a second adhesive layer 522 is formed between the second deflection means 140 and the second planarizing film 512. As a material constituting the adhesive layers 521 and 522, specifically, an adhesive material was used whose main component was an acrylic resin (acrylic acid ester copolymer, methacrylic acid ester copolymer) or an epoxy compound.

Also in Example 2, the film thicknesses of the first planarizing film 511 and the second planarizing film 512 provided on the substrate 500 containing a resin material were each 1 µm. Furthermore, in Example 2, the refractive index of the substrate 500 was $n_0=1.53$, the refractive index of the first planarizing film 511 was $n_1=1.53$, and the refractive index of the second planarizing film 512 was $n_2=1.53$. Note that, the type of acrylic resin constituting the planarizing film was different from that of Example 1. To increase the contrast and MTF, it is preferable that the refractive index difference is as small as possible, and it is ideal to set $n_0=n_1=n_2$ as described above. In other respects, Example 2 has substantially the same configuration and structure as those of the display device of Example 1.

Also in the light guide plate 121 of Example 2, by using the lightweight substrate 500 containing a resin material, it is possible to obtain the contrast and MTF equivalent to those of a light guide plate using a glass substrate. Moreover, in the light guide plate 121 of Example 2, by forming the adhesive layers 521 and 522, the adhesion can be further improved between the planarizing film 512 and the deflection means 130 and 140.

Figure 23A:
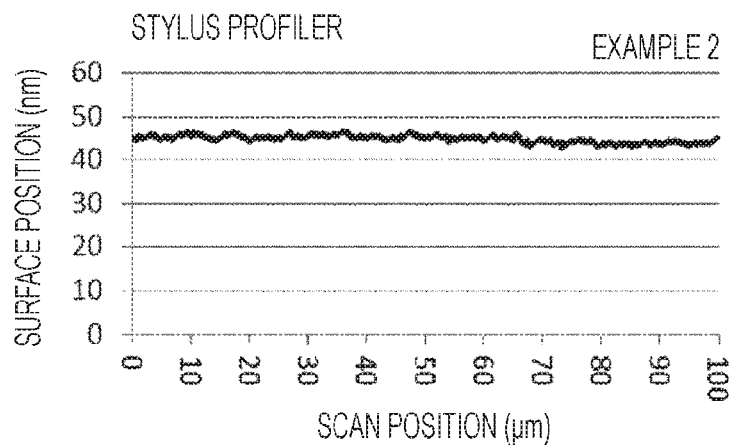
FIGS. 23A, 23B, and 23C are diagrams illustrating measurement results (measurement device: stylus profiler) of the root mean square roughness Rq of a light guide plate, a glass substrate, and the resin substrate of Example 2, respectively.
Figure 23B:
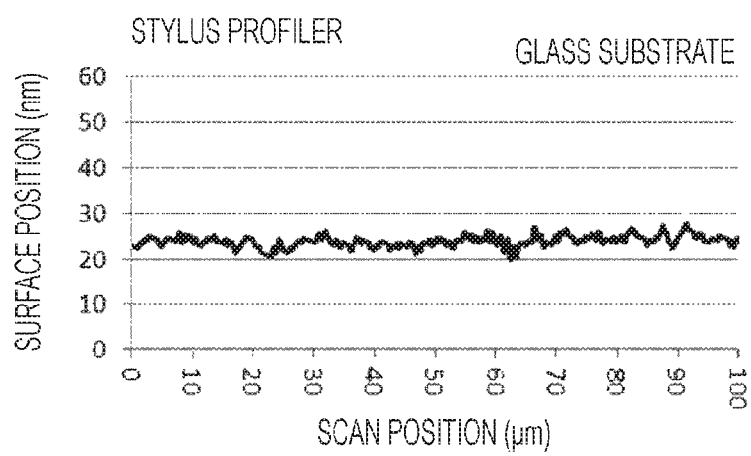
Figure 23C:
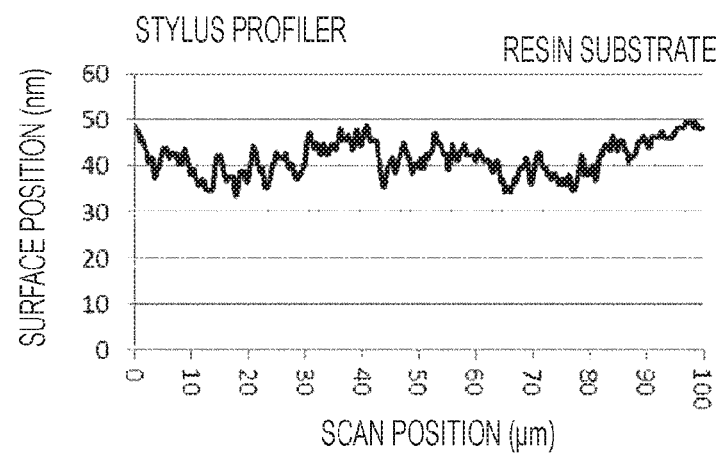

In Example 2, measurement of Rq was performed using a stylus profiler. The measurement results are illustrated in FIGS. 23A, 23B, and 23C. Specifically, by using a stylus profiler DEKTAK8 made by ULVAC, Inc. measurement was performed on conditions of scan width 100 µm, scan speed 5 µm/sec, and resolution 0.05 µm/sample. The measurement was performed on the light guide plate of Example 2, the glass substrate, and the resin substrate (substrate 500 of Example 2). The value of Rq obtained from the measurement result of the surface position of the glass substrate illustrated in FIG. 23B was 1.2 nm, the value of Rq obtained from the measurement result of the surface position of the resin substrate illustrated in FIG. 23C was 4.1 nm, and the value of Rq of the resin substrate was higher than the value of Rq of the glass substrate. On the other hand, the value of Rq of the light guide plate of Example 2 illustrated in FIG. 23A was 0.8 nm, and the surface flatness was somewhat excellent compared to the glass substrate.

As described above, in Example 2, since the first planarizing film 511 and the second planarizing film 512 each having a film thickness of 1 µm are provided, the values of the contrast and MTF can be made equivalent to those of a light guide plate using a glass substrate. This is considered to be because the value of the root mean square roughness Rq becomes less than or equal to that of the glass substrate by forming the planarizing film having a film thickness of 1 µm, as can be seen from FIGS. 23A, 23B, and 23C. Furthermore, in Example 2, by forming the adhesive layers 521 and 522, it is possible to prevent a decrease in MTF due to the poor adhesion between the planarizing film 511 and the deflection means 130 and 140, and increase a manufacturing yield.

Example 3

Example 3 is also a modification of Example 1. In an optical device of Example 3, the first planarizing film 511 and the second planarizing film 512 are each provided with a function as an anti-reflection film. In other words, in Example 3, when the wavelength of light incident on the light guide plate 121 is $\lambda_0$ (=523 nm), the refractive index of the substrate 500 is $n_0$ (=1.53), the refractive index of the first planarizing film 511 is $n_1$ (=1.51, where $n_1<n_0$), and the refractive index of the second planarizing film 512 is $n_2$ (=1.51, where $n_2<no$), the thickness of the first planarizing film 511 is ($n_1 \cdot \lambda_0/4 = 0.20$ µm), and the thickness of the second planarizing film 512 is ($n_2 \cdot \lambda_0/4 = 0.20$ µm). As a result, the first planarizing film 511 and the second planarizing film 512 each can be provided with the function as the anti-reflection film, and utilization efficiency can be increased of light from the image forming device 111 or 211. Here, to obtain an effect of the increase in the utilization efficiency, the design error of the thickness is preferably within 3%.

Example 4

Figure 7:
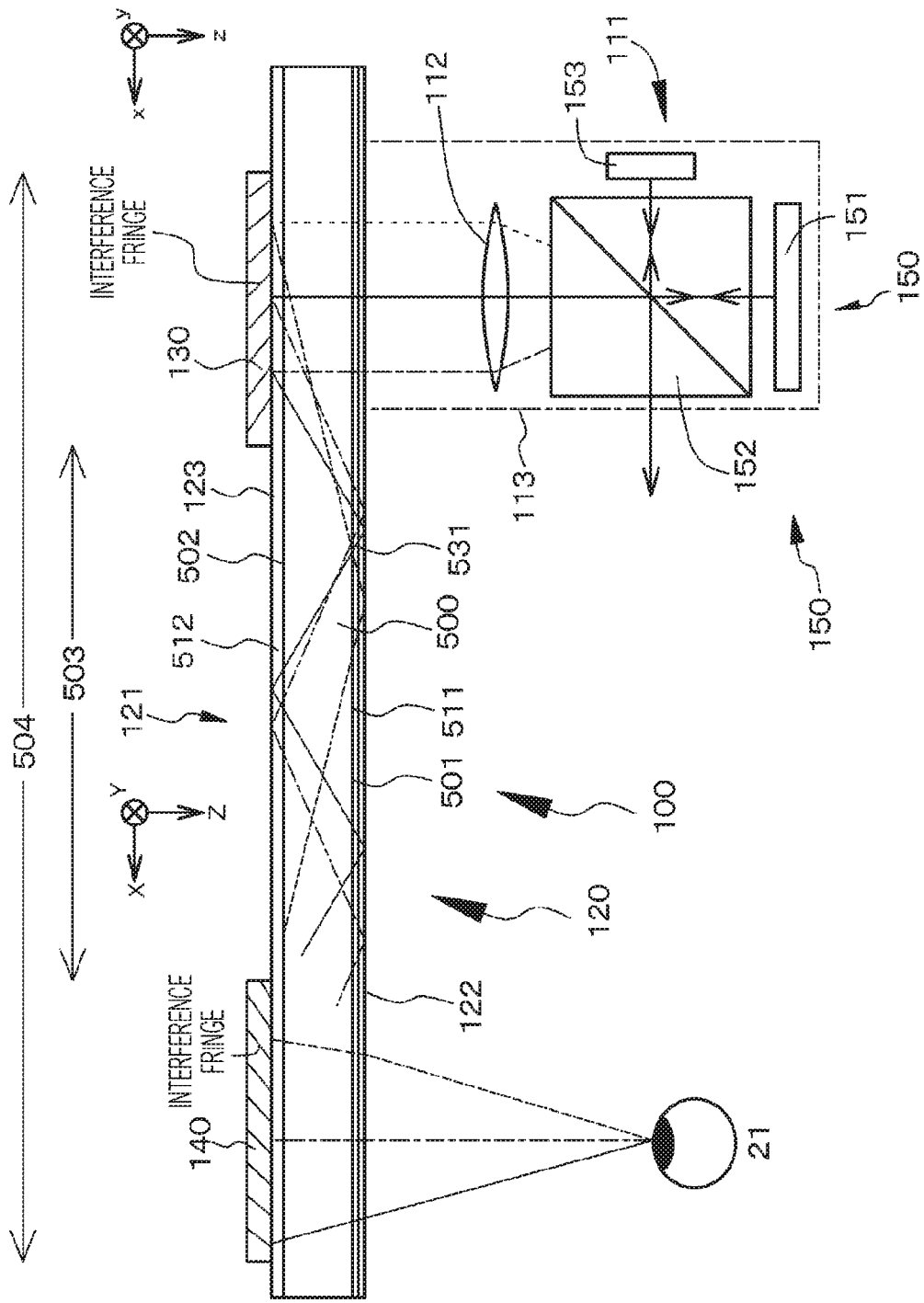
FIG. 7 is a conceptual diagram of an image display device in a display device of Example 4.

Example 4 is also a modification of Example 1, and is provided with an additional anti-reflection layer. FIG. 7 illustrates a conceptual diagram of an image display device in a display device (head mounted display) of Example 4. In an optical device of Example 4, the first deflection means 130 and the second deflection means 140 are arranged on the second surface 123 side of the light guide plate 121, and when the refractive index of the material constituting the first planarizing film 511 is $n_1$ (=1.53) and the wavelength of light incident on the light guide plate 121 is $\lambda_0$ (=523 nm), on the outer surface of the first planarizing film 511, an anti-reflection layer 531 is formed having a refractive index $n_3$ (=1.49, where $n_3<n_1$) and a thickness of ($n_3 \cdot \lambda_0/4$=195 nm).

Here, examples of a material constituting the anti-reflection layer 531 can include, specifically, a UV-curable coating agent containing a material whose main component is a polymethyl methacrylate (PMMA) resin having a refractive index $n_3$=1.49, and examples of a material constituting the first planarizing film 511 and the second planarizing film 512 can include, specifically, a UV-curable coating agent whose main component is an acrylic resin and to which silica is added as an additive. Note that, the type of acrylic resin constituting the planarizing film was different from that of Example 1. It is desirable to make a sum of the film thicknesses of the first planarizing film 511 and the film thickness of the anti-reflection layer 531 equal to the film thickness of the second planarizing film 512, from a viewpoint of suppressing the occurrence of the warpage of the light guide plate.

Example 5

Figure 8:
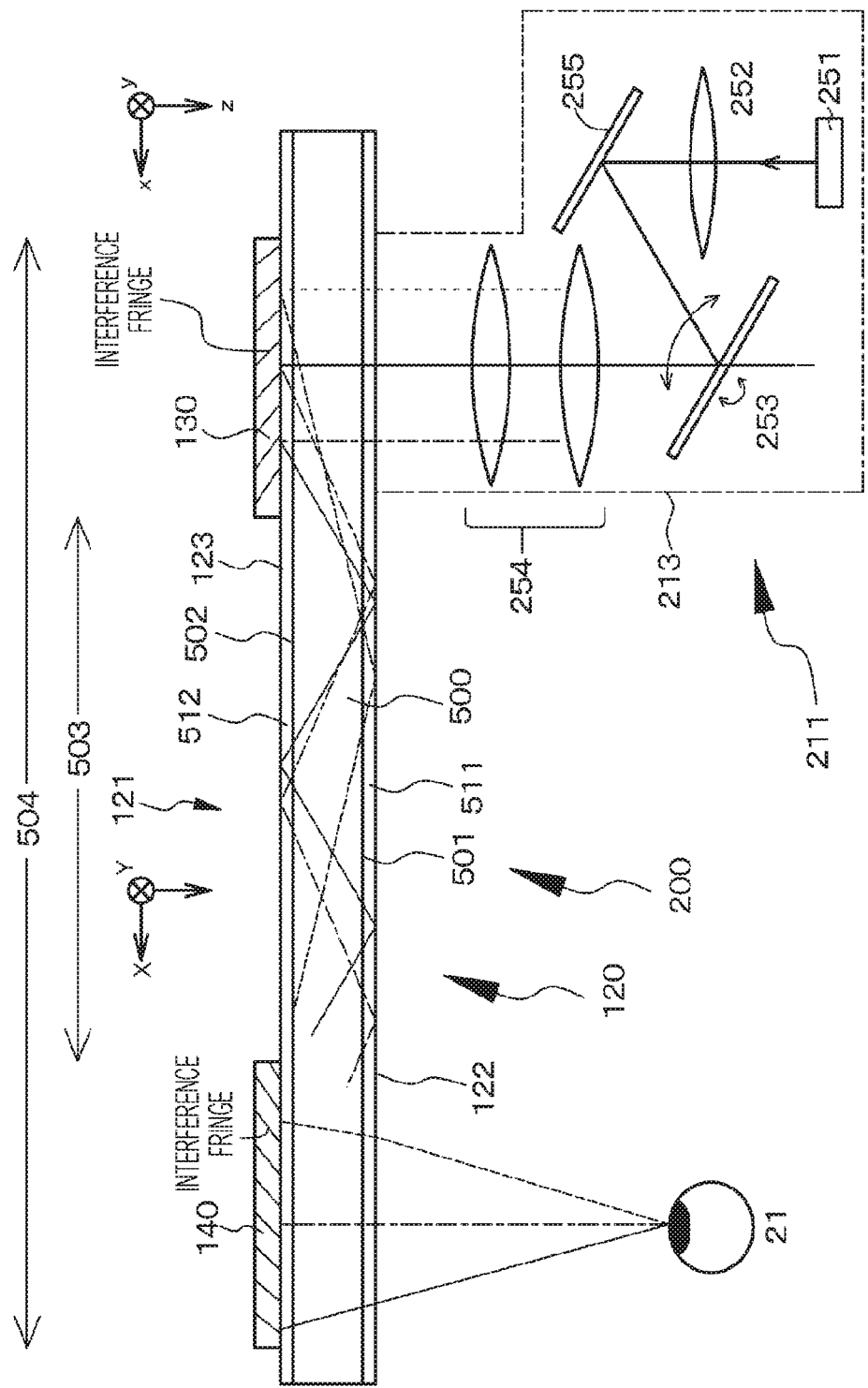
FIG. 8 is a conceptual diagram of an image display device in a display device of Example 5.

Example 5 is a modification of Examples 1 to 4, and relates to an optical device of the first structure and an image forming device of the second configuration. As illustrated in a conceptual diagram of the image display device 200 in a display device (head mounted display) of Example 5 in FIG. 8, in Example 5, the image forming device 211 includes the image forming device of the second configuration. In other words, a light source 251 and a scanning means 253 that scans parallel light emitted from the light source 251 are included. More specifically, the image forming device 211 includes the light source 251, a collimating optical system 252 that makes light emitted from the light source 251 into parallel light, the scanning means 253 that scans the parallel light emitted from the collimating optical system 252, and the relay optical system 254 that relays and emits the parallel light scanned by the scanning means 253. The whole of the image forming device 211 is housed in a housing 213 (illustrated by a one-dot chain line in FIG. 8), and the housing 213 is provided with an opening (not illustrated), and light is emitted from the relay optical system 254 via the opening. Then, each housing 213 is detachably attached to the temple portion 13 by the attachment member 19.

The light source 251 includes a light emitting element that emits white light. Then, the light emitted from the light source 251 is incident on the collimating optical system 252 having a positive optical power as a whole, and is emitted as the parallel light. Then, the parallel light is reflected by a total reflection mirror 255, horizontal scan and vertical scan are performed by the scanning means 253 including MEMS that makes a micromirror rotatable in two-dimensions and can two-dimensionally scan the incident parallel light, a kind of two-dimensional imaging is made, and virtual pixels (the number of pixels can be, for example, the same as that of Example 1) are generated. Then, light from the virtual pixels passes through the relay optical system (parallel light emission optical system) 254 including a known relay optical system, and light flux converted into the parallel light is incident on the optical device 120.

The optical device 120 which the light flux made into the parallel light by the relay optical system 254 is incident on, guided, and emitted from, has the same configuration and structure as those of the optical device described in Example 1, so that the detailed description will be omitted. Furthermore, as described above, since the display device of Example 5 also has substantially the same configuration and structure as those of the display device of Example 1 except that the image forming device 211 is different, the detailed description will be omitted.

Example 6

Figure 9:
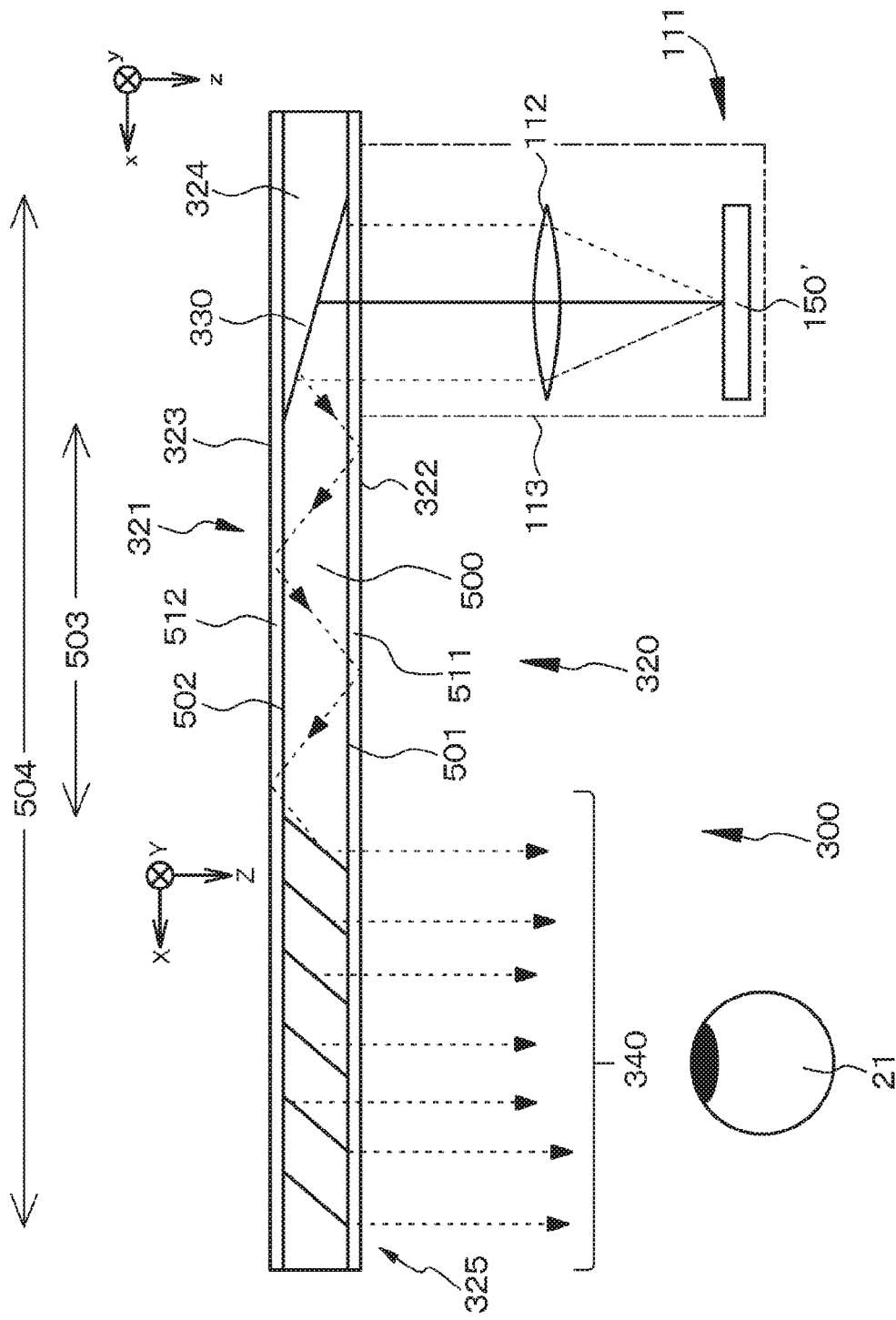
FIG. 9 is a conceptual diagram of an image display device in a display device of Example 6.

Example 6 is also a modification of Examples 1 to 4, but relates to an optical device of the second structure and an image forming device of the first configuration. FIG. 9 illustrates a conceptual diagram of the image display device 300 in a display device (head mounted display) of Example 6. In Example 6, similarly to Example 1, the image forming device 111 includes the organic EL display device 150'. Furthermore, the optical device 320 basically has the same configuration and structure as those of the optical device 120 of Example 1 except that the configurations and structures of the first deflection means and the second deflection means are different.

In Example 6, the first deflection means 330 and the second deflection means 340 are arranged inside the light guide plate 321. Then, the first deflection means 330 reflects the light incident on the light guide plate 321, and the second deflection means 340 transmits and reflects a plurality of times the light propagated by total reflection inside the light guide plate 321. In other words, the first deflection means 330 functions as a reflecting mirror, and the second deflection means 340 functions as a semitransparent mirror. More specifically, the first deflection means 330 provided inside the light guide plate 321 includes a light reflection film (a kind of mirror) that contains aluminum (Al) and reflects the light incident on the light guide plate 321. On the other hand, the second deflection means 340 provided inside the light guide plate 321 includes a multilayer layered structure in which a large number of dielectric layered films are layered. The dielectric layered film includes, for example, a $TiO_2$ film as a high dielectric constant material and a $SiO_2$ film as a low dielectric constant material. Japanese Patent Application National Publication (Laid-Open) No. 2005-521099 discloses a multilayer layered structure in which a large number of dielectric layered films are layered. Although a six-layer dielectric layered film is illustrated in the drawings, this is not a limitation. Between a dielectric layered film and a dielectric layered film, a thin piece containing the same material as a material constituting the light guide plate 321 is sandwiched. Note that, in the first deflection means 330, the parallel light incident on the light guide plate 321 is reflected (or diffracted) so that the parallel light incident on the light guide plate 321 is totally reflected inside the light guide plate 321. On the other hand, in the second deflection means 340, the parallel light propagated by total reflection inside the light guide plate 321 is reflected (or diffracted) a plurality of times, and emitted in a state of the parallel light from the light guide plate 321, toward the pupil 21 of the observer.

For the first deflection means 330, it is sufficient that an inclined surface on which the first deflection means 330 is to be formed is provided to the light guide plate 321 by cutting out a portion 324 where the first deflection means 330 of the light guide plate 321 is to be provided, and vacuum deposition of a light reflection film is performed on the inclined surface, and then the cut out portion 324 of the light guide plate 321 is bonded to the first deflection means 330. Furthermore, for the second deflection means 340, it is sufficient that a multilayer layered structure is manufactured in which a large number of the same material as the material constituting the light guide plate 321 and a dielectric layered film (that can be formed by vacuum evaporation method, for example) are layered, an inclined surface is formed by cutting out a portion 325 where the second deflection means 340 of the light guide plate 321 is to be provided, the multilayer layered structure is formed on the inclined surface, and polishing or the like is performed to adjust the outer shape. In this way, the optical device 120 can be obtained in which the first deflection means 330 and the second deflection means 340 are provided inside the light guide plate 321.

The light guide plate 321 in Example 7 as described later also has basically the same configuration and structure as the configuration and structure of the light guide plate 321 described above.

The display device of Example 6 has substantially the same configuration and structure as those of the display device of Example 1 except that the optical device 320 is different, as described above, so that the detailed description will be omitted.

Example 7

Figure 10:
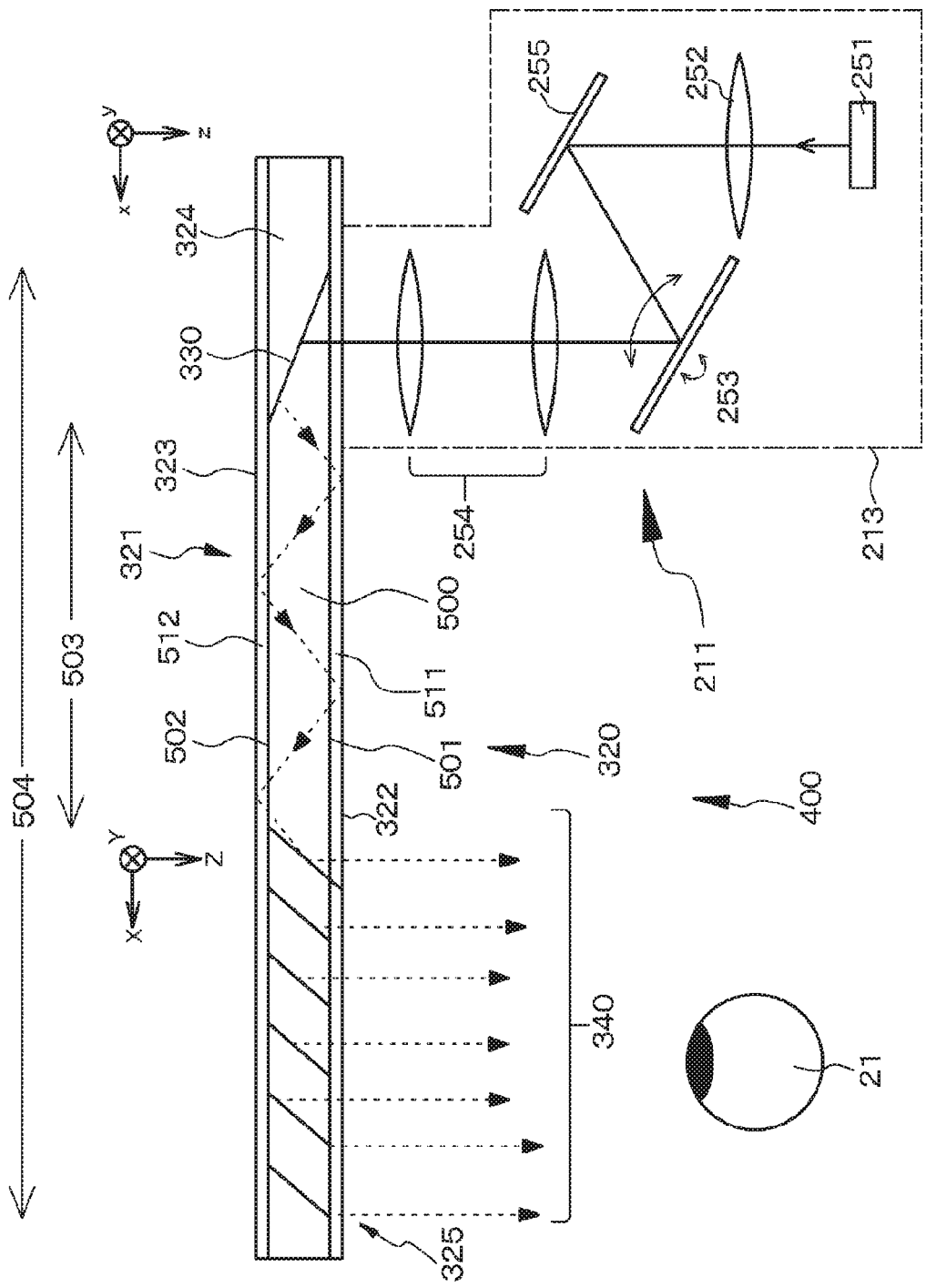
FIG. 10 is a conceptual diagram of an image display device in a display device of Example 7.

Example 7 is also a modification of Examples 1 to 6, but relates to an optical device of the second structure and an image forming device of the second configuration. FIG. 10 illustrates a conceptual diagram of an image display device in a display device (head mounted display) of Example 7. The light source 251, the collimating optical system 252, the scanning means 253, the parallel light emission optical system (relay optical system 254), and the like in the image display device 400 of Example 7 each have the same configuration and structure (image forming device of the second configuration) as those of Example 2. Furthermore, the optical device 320 in Example 7 has the same configuration and structure as those of the optical device 320 in Example 6. The display device of Example 7 has substantially the same configuration and structure as those of the display device of Example 6 except for the above differences, so that the detailed description will be omitted.

Example 8

Figure 11A:
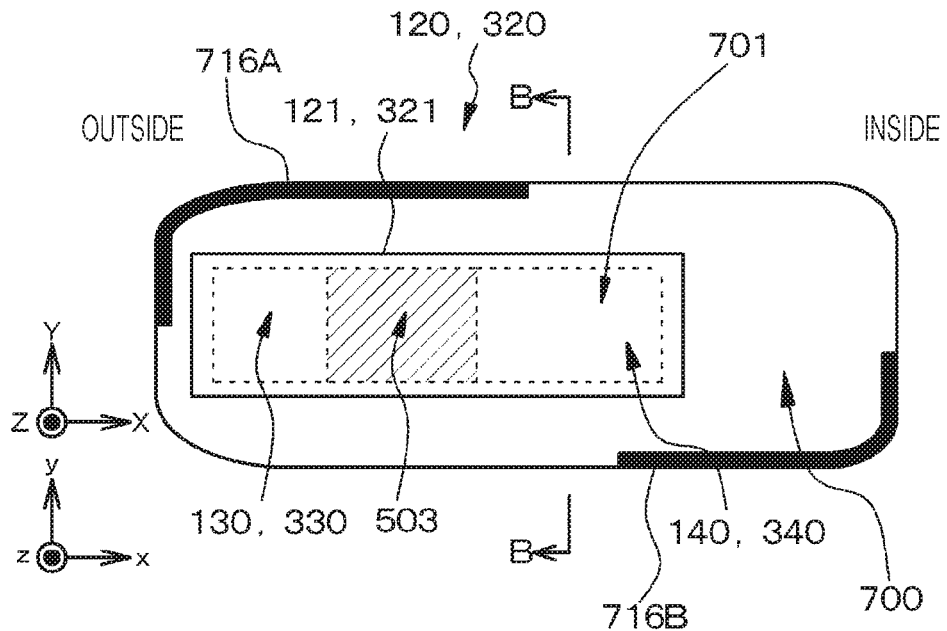
FIG. 11A is a schematic front view of an optical device and a light control device in a display device of Example 8.
Figure 11B:
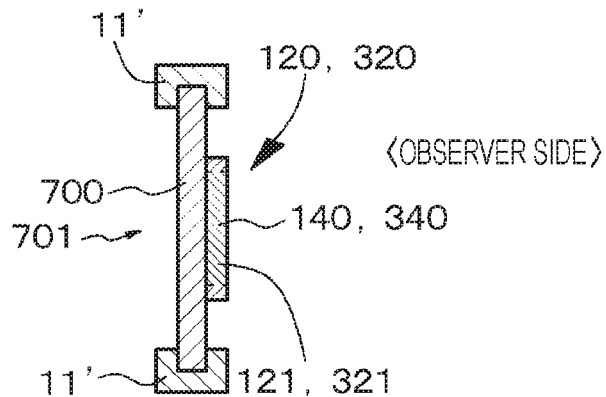
FIG. 11B is a schematic cross-sectional view of the optical device and the light control device along an arrow B-B in FIG. 11A.
Figure 12:
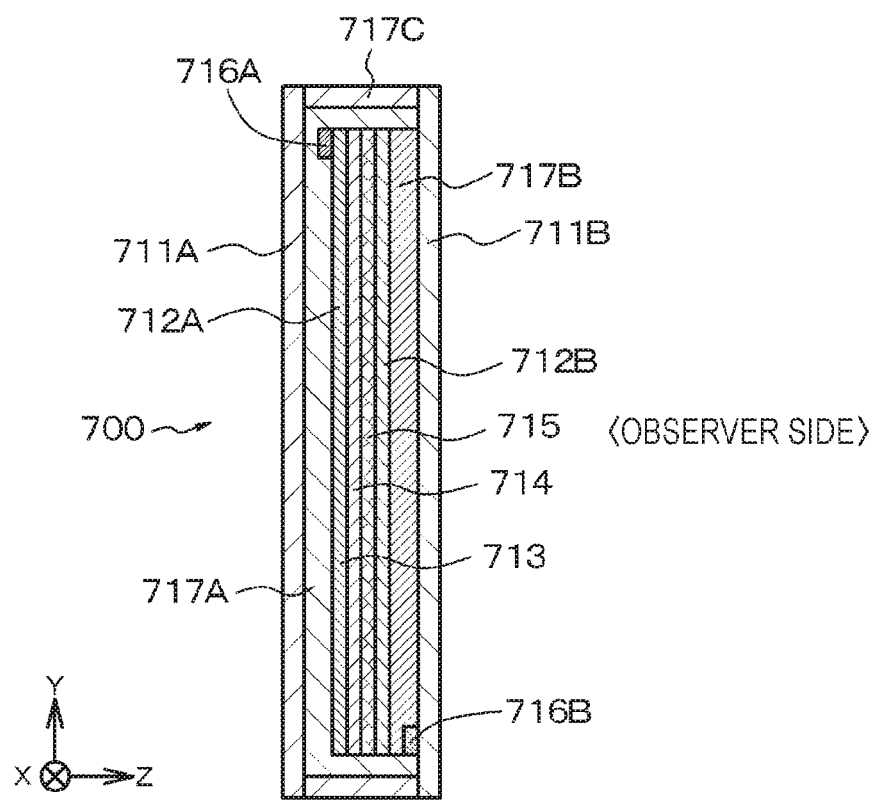
FIG. 12 is a schematic cross-sectional view of a light control device in the display device of Example 8 similar to that along the arrow B-B in FIG. 11A.
Figure 13A:
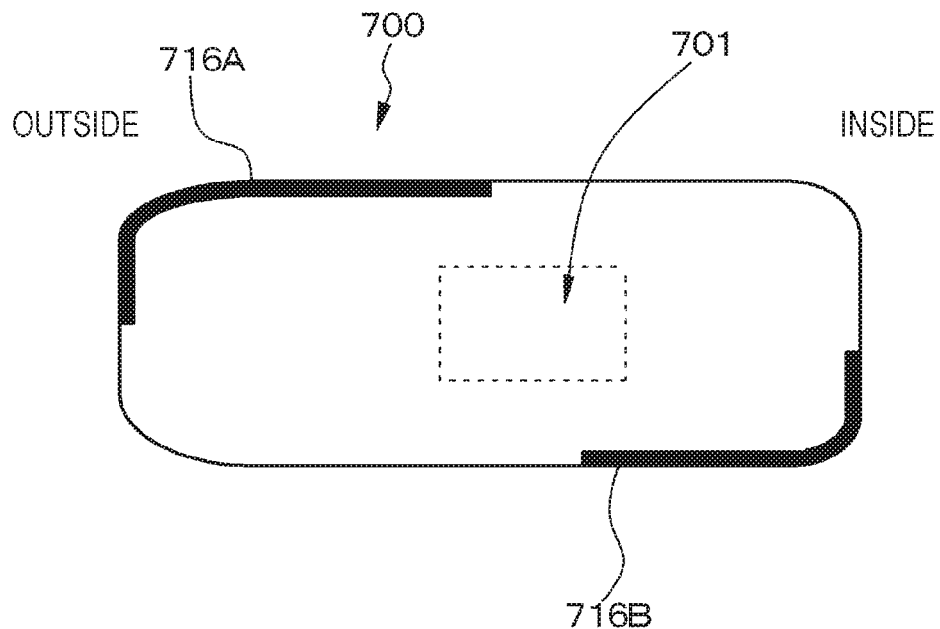
FIG. 13A is a schematic front view of the light control device before operation in the display device of Example 8.
Figure 13B:
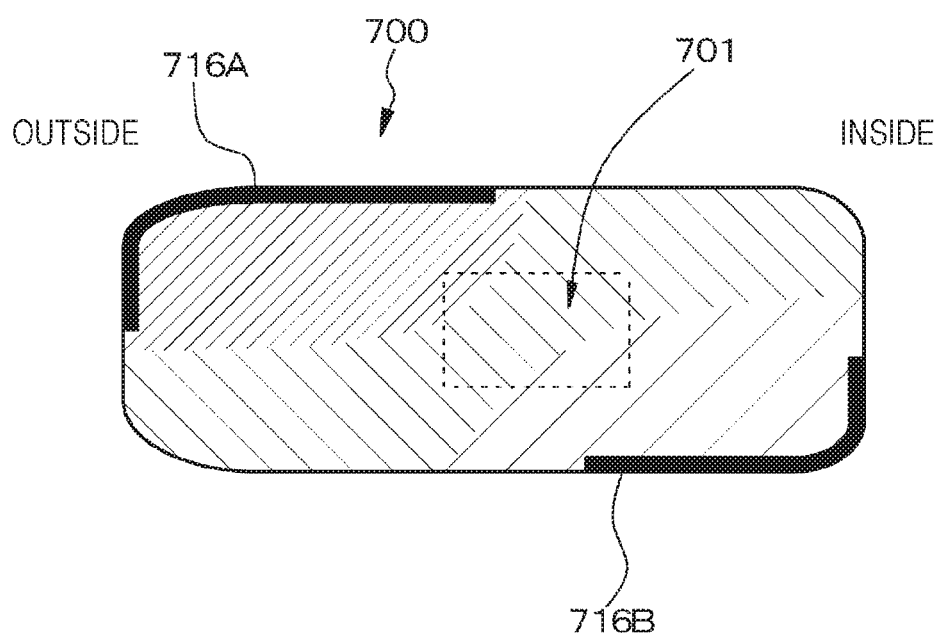
FIG. 13B is a schematic front view of the light control device in operation.

Example 8 is a modification of Examples 1 to 7. A display device of Example 8 includes a light control device. FIG. 11A illustrates a schematic front view of an optical device and a light control device (however, for the right eye) in the display device of Example 8, FIG. 11B illustrates a schematic cross-sectional view along an arrow B-B in FIG. 11A, and FIG. 12 illustrates a schematic cross-sectional view of the light control device similar to that along the arrow B-B of FIG. 11A. Furthermore, FIG. 13A illustrates a schematic front view of the light control device before operation in the display device of Example 8, and FIG. 13B illustrates a schematic front view of the light control device in operation. In FIG. 13B, a region having higher light shielding ratio of the light control device is schematically illustrated with finer oblique lines. Actually, the light shielding ratio does not change stepwise as schematically illustrated in FIG. 13B, but gradually changes. In other words, the light control device is in a state of having a color gradation. However, depending on the arrangement state and the shapes of the electrodes and the connection portions, a configuration can be made in which the light shielding ratio changes stepwise. In other words, the light control device can also be in a state in which the color changes stepwise.

The display device of Example 8 includes a light control device 700 that adjusts the amount of external light incident from the outside. Then, furthermore, the second deflection means (virtual image formation region) 140 or 340 is positioned in a projection image of the light control device 700. Moreover, the second deflection means 140 or 340 is covered by one of the substrates constituting the light control device 700.

Here, in the display device of Example 8, the light control device 700 is arranged in the front portion 11. Then, the optical device 120 or 320 is attached to the light control device 700. The front portion 11 includes a rim 11', and the light control device 700 is fitted to the rim 11'. Projection images of a first electrode 716A and a second electrode 716B as described later are included in a projection image of the rim 11'. The optical device 120 or 320, and the light control device 700 are arranged in this order from the observer side, but may be arranged in the order of the light control device 700, and the optical device 120 or 320.

Figure 11C:
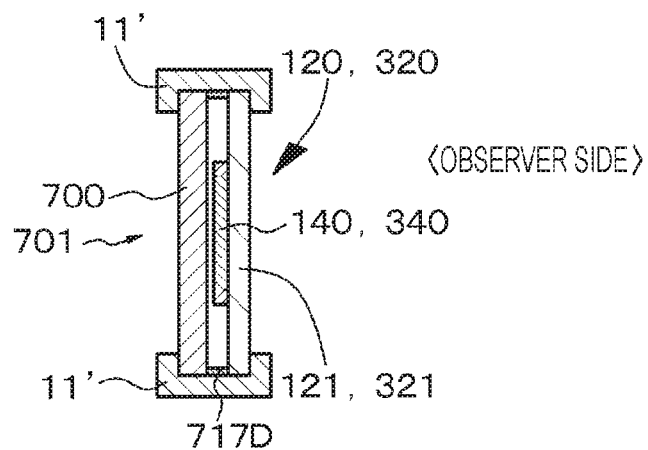
FIG. 11C is a schematic cross-sectional view of a modification of the optical device and the light control device along the arrow B-B of FIG. 11A.

In Example 8, the optical devices 120 or 320 overlaps with at least a portion of the light control device 700 that is a kind of optical shutter. Specifically, in the example illustrated in FIGS. 11A and 11B, the optical device 120 or 320 overlaps with a portion of the light control device 700. However, this is not a limitation, and the optical device 120 or 320 may overlap with the light control device 700. In other words, the outer shape of the optical device 120 or 320 (more specifically, the light guide plate 121 or 321 constituting the optical device) may be the same shape as the outer shape of the light control device 700. FIG. 11C illustrates a schematic cross-sectional view similar to that along the arrow B-B in FIG. 11A of the optical device and the light control device in such a mode (in other words, a modification of the display device of Example 8). In this modification, a gap is provided between the light control device 700 and the light guide plate 121 or 321, and the light control device 700 and the light guide plate 121 or 321 are bonded together at the outer peripheral portion by an adhesive 717D. The same applies to Examples described below. Then, as a result, the outer edge of the light guide plate 121 or 321 is hidden by the rim 11' as described later, and the outer edge of the light guide plate 121 or 321 becomes invisible.

Here, a nose side of the observer is referred to as an inner side, an ear side is referred to as an outer side, and a region of the light control device 700 facing the virtual image formation region (second deflection means 140 or 340) of the optical device is referred to as a virtual image formation region facing region 701. Then, in Example 8, the light shielding ratio of the light control device decreases from the upper region and the outer region of the virtual image formation region facing region 701 toward the central part of the virtual image formation region facing region 701.

In the display device of Example 8, the light control device 700 includes
  a first substrate 711A,
  a second substrate 711B facing the first substrate 711A,
  a first transparent electrode 712A provided on a facing surface of the first substrate 711A facing the second substrate 711B,
  a second transparent electrode 712B provided on a facing surface of the second substrate 711B facing the first substrate 711A, and
  a light control layer sandwiched between the first transparent electrode 712A and the second transparent electrode 712B. In Example 8, the light control device 700 further includes the first electrode 716A formed on a part of the first transparent electrode 712A. Then, the first electrode 716A is directly connected to a control circuit (light control device/control circuit) for controlling the light shielding ratio of the light control device 700 via a connector (not illustrated). Furthermore, the second electrode 716B formed on a part of the second transparent electrode 712B, and the second connection portion (not illustrated) connected to the second electrode 716B and provided so as not to come in contact with the second electrode 716B except for the connection portion, are further included, and the second connection portion is connected to the light control device/control circuit via a connector (not illustrated). In some cases, the first connection portion connected to the first electrode 716A may be provided, and the first connection portion may be connected to the light control device/control circuit. Furthermore, in some cases, the second electrode 716B may be directly connected to the light control device/control circuit, or the second connection portion that comes in contact with a part of the second transparent electrode 712B may be provided, and the second connection portion may be connected to the light control device/control circuit. A projection image of the first electrode 716A on the first substrate 711A and a projection image of the second electrode 716B on the first substrate 711A do not overlap with each other. Then, a projection image of the virtual image formation region (second deflection means 140 or 340) on the first substrate 711A is positioned between the projection image of the first electrode 716A on the first substrate 711A and the projection image of the second electrode 716B on the first substrate 711A.

The light control device 700 includes an optical shutter in which a color change of a substance generated by an oxidation-reduction reaction of an electrochromic material is applied. Specifically, the light control layer contains the electrochromic material. More specifically, the light control layer has a layered structure of a $WO_3$ layer 713/$Ta_2O_5$ layer 714/$Ir_xSn_{1-x}O$ layer 715 from a first transparent electrode side. The $WO_3$ layer 713 is reductive chromogenic. Furthermore, the $Ta_2O_5$ layer 714 constitutes a solid electrolyte, and the $Ir_xSn_{1-x}O$ layer 715 is oxidative chromogenic. Between the first substrate 711A, and the first transparent electrode 712A and the first electrode 716A, a protective layer 717A is formed including a SiN layer, a $SiO_2$ layer, an $Al_2O_3$ layer, a $TiO_2$ layer, or a layered film thereof. By forming the protective layer 717A, the light control device can be provided with ion blocking property that blocks movement of ions, water resistance, moisture resistance, and scratch resistance. A ground layer 717B is formed between the first substrate 711A and the second transparent electrode 712B. Furthermore, the first substrate 711A and the second substrate 711B are sealed at the outer edge portion by a sealing member 717C containing a UV-curable resin such as a UV-curable epoxy resin, or an epoxy resin curable by UV light and heat, and a thermosetting resin. The first substrate 711A and the second substrate 711B each contain a polyethylene naphthalate (PEN) resin, a polyether sulfone (PES) resin, a cycloolefin polymer (COP), a colorless and transparent polyimide resin, a TAC film, and a highly transparent self-adhesive acrylic film, but these are not limitations. The first transparent electrode 712A and the second transparent electrode 712B containing ITO are not patterned, and are so-called solid electrodes. Furthermore, the first electrode 716A and the second electrode 716B patterned in a thin line shape each contain a metal material such as nickel, copper, titanium, or an Al/Ni layered structure. The light control device 700 itself can be manufactured by a known method.

In the $Ir_xSn_{1-x}O$ layer 715, Ir and $H_2O$ react with each other and exist as iridium hydroxide $Ir(OH)_n$. When a negative potential is applied to the first electrode 716A, and a positive potential is applied to the second electrode 716B, movement of proton $H^+$ from the $Ir_xSn_{1-x}O$ layer 715 to the $Ta_2O_5$ layer 714 and electron emission to the second transparent electrode 712B occur, and the following oxidation reaction proceeds and the $Ir_xSn_{1-x}O$ layer 715 is colored.

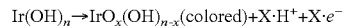

On the other hand, proton $H^+$ in the $Ta_2O_5$ layer 714 moves into the $WO_3$ layer 713, electrons are injected from the first transparent electrode 712A into the $WO_3$ layer 713, and in the $WO_3$ layer 713, the following reduction reaction proceeds and the $WO_3$ layer 713 is colored.

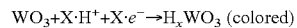

Conversely, when a positive potential is applied to the first electrode 716A and a negative potential is applied to the second electrode 716B, the reduction reaction proceeds in the opposite direction to the above in the $Ir_xSn_{1-x}O$ layer 715 and the color disappears, and in the $WO_3$ layer 713, the oxidation reaction proceeds in the opposite direction to the above, and the color disappears. Note that, the $Ta_2O_5$ layer 714 contains $H_2O$ and is ionized by applying a voltage to the first electrode 716A and the second electrode 716B, and contains proton $H^+$ and $OH^-$ ions, which contributes coloring reaction and decolorizing reaction.

In the display device of Example 8, planar shapes are rectangular of the virtual image formation region 140 or 340 in the optical device and the virtual image formation region facing region 701 in the light control device 700. Furthermore, the outer shape of the light control device 700 is a quadrangle in which four sides include line segments, and the vertexes of the quadrangle are rounded. However, the planar shape of the virtual image formation region 140 or 340 in the optical device and the outer shape of the light control device are not limited to these. The upper side and the lower side of the virtual image formation region facing region 701 extend in the horizontal direction (X-axis direction), and the inside side and the outside side of the virtual image formation region facing region 701 extend in the vertical direction (Y-axis direction).

In the display device of Example 8, a relatively higher voltage is applied to the second electrode 716B than to the first electrode 716A during operation of the light control device. Furthermore, the light shielding ratio of the light control device decreases from the upper region and the outer region of the virtual image formation region facing region 701 toward the central part of the virtual image formation region facing region 701.

The display device of Example 8 includes a light control device, so that a high contrast can be given to the virtual image observed by the observer, and also, the observer using the display device can reliably recognize the external environment through the virtual image formation region facing region. In addition, the light shielding ratio of the light control device decreases from a first predetermined region (for example, upper region and outer region) of the virtual image formation region facing region toward a second predetermined region (for example, central part) of the virtual image formation region facing region. Here, in a case where it is preferable to widen the virtual image formation region facing region 701 and to form a virtual image in a region outside the virtual image formation region facing region 701, high contrast can be given to the virtual image. In addition, the observer can reliably view the foot and the center of the body, and can act safely in a real environment.

By the way, when a voltage is applied between the first electrode and the second electrode, a potential difference is generated between the first transparent electrode and the second transparent electrode. Here, the potential difference generated between the first transparent electrode and the second transparent electrode decreases as the distance from the first electrode is increased, due to the potential gradient generated in the transparent electrode. Furthermore, a slight leakage current occurs between the first transparent electrode and the second transparent electrode. The phenomenon in which a leakage current occurs is remarkable in a case where the light control layer contains an electrochromic material. Then, from these results, only by optimizing the position/part where the first electrode is provided and the position/part where the second electrode is provided, specifically, for example, by arranging the first electrode and the second electrode so that the projection image of the first electrode on the first substrate and the projection image of the second electrode on the first substrate do not overlap with each other, the light shielding ratio of the light control device changes to decrease from the upper region and the outer region of the virtual image formation region facing region toward the central part of the virtual image formation region facing region. In other words, despite the extremely simple configuration and structure, the light shielding ratio of the light control device can be reliably changed from the upper region and the outer region of the virtual image formation region facing region toward the central part of the virtual image formation region facing region. In other words, the light control device is in a state of having a gradation of color. However, the arrangement state of the first electrode and the second electrode is not limited to the arrangement described above, and may be changed as appropriate depending on what color the light control device should have. For example, the light shielding ratio of the light control device can be changed from the inner region of the virtual image formation region facing region to the outer region of the virtual image formation region facing region. Furthermore, depending on the shapes and structures of the frame and the rim, a portion occurs having a large curvature (small curvature radius) in the frame and the rim. Then, the electric field formed by the first electrode and the second electrode tends to concentrate on this portion. Therefore, in some cases, without forming the first electrode or the second electrode in such a portion having a large curvature generated in the frame and the rim, the first electrode and the second electrode may be segmented, and the first electrode and the second electrode segmented may be connected by the first connection portion and the second connection portion.

In some cases, a mode may be adopted in which the first transparent electrode and/or the second transparent electrode is divided into a plurality of blocks, and a light shielding ratio in each block is controlled, whereby the light shielding ratio of the light control device is controlled from the first predetermined region of the virtual image formation region facing region toward the second predetermined region of the virtual image formation region facing region. Alternatively, a mode may be adopted in which the first transparent electrode or the second transparent electrode is formed as a strip-like electrode or a mesh-like electrode, or a stripe-like auxiliary electrode or a mesh-like auxiliary electrode is formed on the first transparent electrode or the second transparent electrode, whereby light shielding ratios in a plurality of regions of the light control device are independently controlled, and the light shielding ratio of the light control device is controlled from the first predetermined region of the virtual image formation region facing region toward the second predetermined region of the virtual image formation region facing region. Alternatively, for example, the first electrode 716A of FIG. 11A is left as it is, and the second electrode 716B is provided to overlap with the first electrode 716A. A mode may be adopted in which, with this configuration, the light shielding ratio is increased of the upper region and the outer region of the virtual image formation region facing region, and the light shielding ratio is decreased of the central part of the virtual image formation region facing region. In some cases, the light control device may be constituted from, for example, a liquid crystal display device driven on the basis of an active matrix system or a simple matrix system, and the light shielding ratio of the light control device is controlled from the first predetermined region of the virtual image formation region facing region toward the second predetermined region of the virtual image formation region facing region.

Furthermore, although the light control layer includes a layered structure of inorganic electrochromic material layers such as $WO_3$ layer/$Ta_2O_5$ layer/$Ir_xSn_{1-x}O$ layer; however, alternatively, the light control layer can also include a layered structure of inorganic electrochromic material layers such as $WO_3$ layer/$Ta_2O_5$ layer/$IrO_x$ layer, or alternatively, a $MoO_3$ layer or a $V_2O_5$ layer can be used instead of the $WO_3$ layer, and a $ZrO_2$ layer or a zirconium phosphate layer can be used instead of the $IrO_x$ layer, or alternatively, prussian blue complex/nickel-substituted prussian blue complex or the like can also be used. As an organic electrochromic material, for example, electrochromic materials can also be used disclosed in Japanese Patent Application Laid-Open Nos. 2014-111710 and 2014-159385. Furthermore, the light control layer can also include an electrophoretic dispersion liquid, and a mode can be made in which the light control device is an optical shutter by an electrodeposition method (electrodeposition, electric field deposition) in which an electrodeposition/dissociation phenomenon that is generated by a reversible oxidation-reduction reaction of metal (for example, silver particles) is applied, in other words, the light control layer includes an electrolyte containing metal ions. In a case where the light control layer includes an electrolyte layer containing metal ions, the metal ions contain silver ions, and the electrolyte preferably contains at least one salt selected from the group consisting of LiX, NaX, and KX (where X is a fluorine atom, chlorine atom, bromine atom or iodine atom). Alternatively, as the light control device, in some cases, it is also possible to use a liquid crystal shutter, or an optical shutter whose transmittance is controlled by an electrowetting phenomenon. Furthermore, the color of the light to be colored by the light control device can also be a fixed color such as black, and a mode can be made in which the light passing through the light control device is colored to a desired color by the light control device, and also the color of the light to be colored by the light control device is variable. Specifically, for example, it is sufficient that a light control device that colors the light red, a light control device that colors the light green, and a light control device that colors the light blue are layered.

Example 9

Figure 14A:
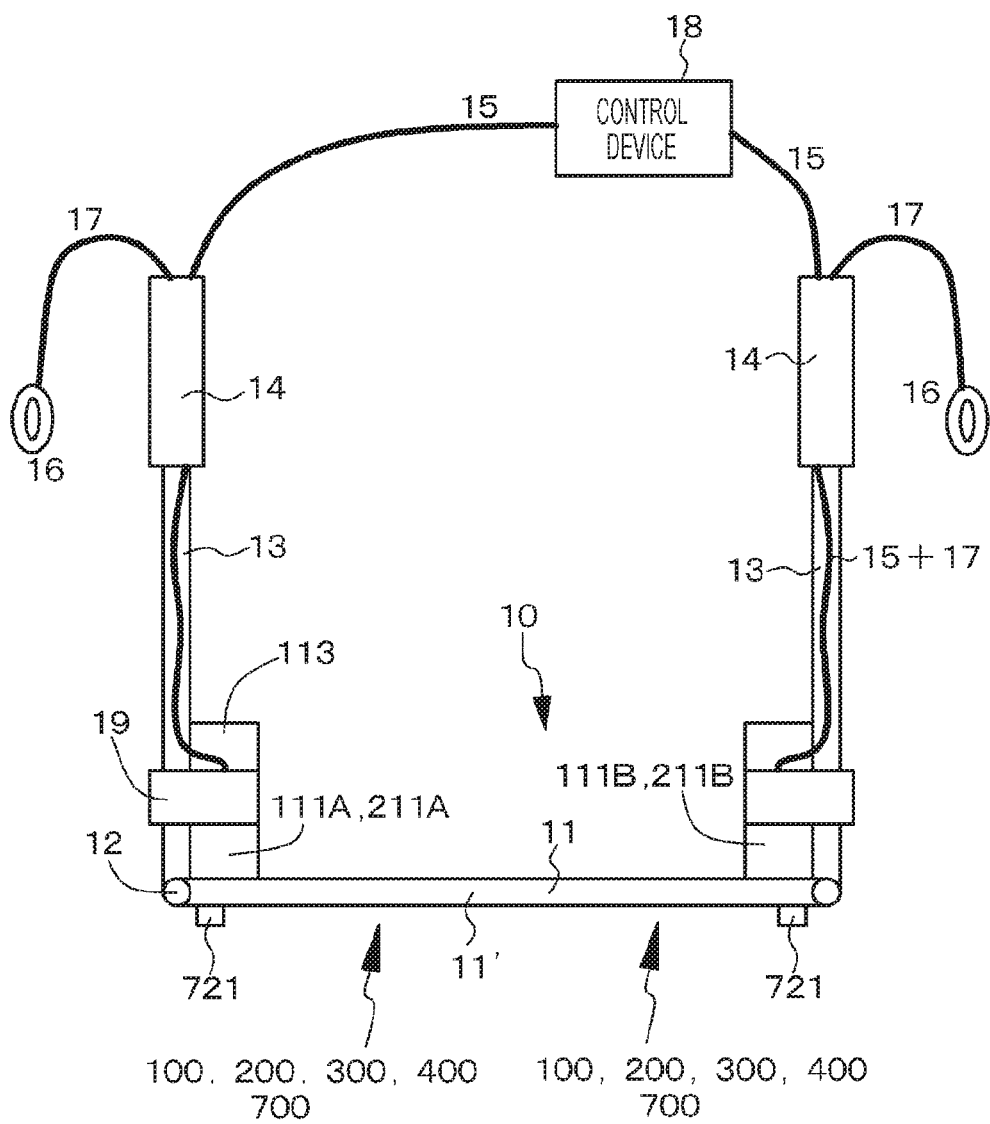
FIGS. 14A and 14B respectively are a schematic diagram of a display device of Example 9 as viewed from above, and a schematic diagram of a circuit that controls an illuminance sensor.
Figure 14B:
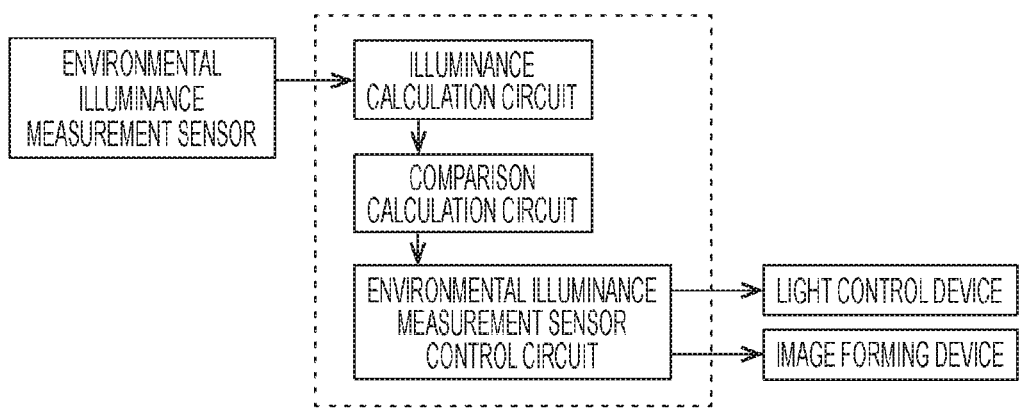

Example 9 is a modification of Example 8. FIG. 14A illustrates a schematic diagram of a display device of Example 9 as viewed from above. Furthermore, FIG. 14B illustrates a schematic diagram of a circuit that controls an illuminance sensor.

The display device of Example 9 further includes an illuminance sensor (environmental illuminance measurement sensor) 721 that measures the illuminance of the environment in which the display device is placed, and the light shielding ratio of the light control device 700 is controlled on the basis of the measurement result of the illuminance sensor (environmental illuminance measurement sensor) 721. At the same time or independently, the brightness of the image formed by the image forming devices 111 or 211 is controlled on the basis of the measurement result of the illuminance sensor (environmental illuminance measurement sensor) 721. The environmental illuminance measurement sensor 721 having a known configuration and structure only needs to be arranged at the outer end of the light control device 700, for example. The environmental illuminance measurement sensor 721 is connected to the control device 18 via a connector and a wiring line (not illustrated). The control device 18 includes a circuit that controls the environmental illuminance measurement sensor 721. The circuit that controls the environmental illuminance measurement sensor 721 includes: an illuminance calculation circuit that receives a measured value from the environmental illuminance measurement sensor 721 and obtains illuminance; a comparison calculation circuit that compares a value of the illuminance obtained by the illuminance calculation circuit with a standard value; and an environmental illuminance measurement sensor control circuit that controls the light control device 700 and/or the image forming device 111 or 211 on the basis of a value obtained by the comparison calculation circuit, and these circuits can include known circuits. In the control of the light control device 700, the light shielding ratio of the light control device 700 is controlled, and on the other hand, in the control of the image forming device 111 or 211, the brightness of the image formed by the image forming device 111 or 211 is controlled. Note that, the control of the light shielding ratio in the light control device 700 and the control of the brightness of the image in the image forming device 111 or 211 may be independently performed or may be performed with a correlation.

For example, when the measurement result of the illuminance sensor (environmental illuminance measurement sensor) 721 becomes greater than or equal to a predetermined value (first illuminance measured value), the light shielding ratio of the light control device 700 is set to greater than or equal to a predetermined value (first light shielding ratio). On the other hand, when the measurement result of the illuminance sensor (environmental illuminance measurement sensor) 721 becomes less than or equal to a predetermined value (second illuminance measured value), the light shielding ratio of the light control device 700 is set to less than or equal to a predetermined value (second light shielding ratio). Here, examples of the first illuminance measured value can include 10 lux, examples of the first light shielding ratio can include any value of 99% to 70%, examples of the second illuminance measured value can include 0.01 lux, and examples of the second light shielding ratio can include any value of 49% to 1%.

Note that, the illuminance sensor (environmental illuminance measurement sensor) 721 in Example 9 can be applied to the display device described in Example 10. Furthermore, in a case where the display device includes an imaging device, the illuminance sensor (environmental illuminance measurement sensor) 721 can also be constituted from a light receiving element for exposure measurement provided in the imaging device.

In the display device of Example 9 or Example 10 described below, the light shielding ratio of the light control device is controlled on the basis of the measurement result of the illuminance sensor (environmental illuminance measurement sensor), and the brightness of the image formed by the image forming device is controlled on the basis of the measurement result of the illuminance sensor (environment illuminance measurement sensor), and the light shielding ratio of the light control device is controlled on the basis of the measurement result of the second illuminance sensor (transmitted light illuminance measurement sensor), and the brightness of the image formed by the image forming device is controlled on the basis of the measurement result of the second illuminance sensor (transmitted light illuminance measurement sensor), so that it is possible not only to give high contrast to the virtual image observed by the observer, but also to optimize an observation state of the virtual image depending on the illuminance of the ambient environment in which the display device is placed.

Example 10

Figure 15A:
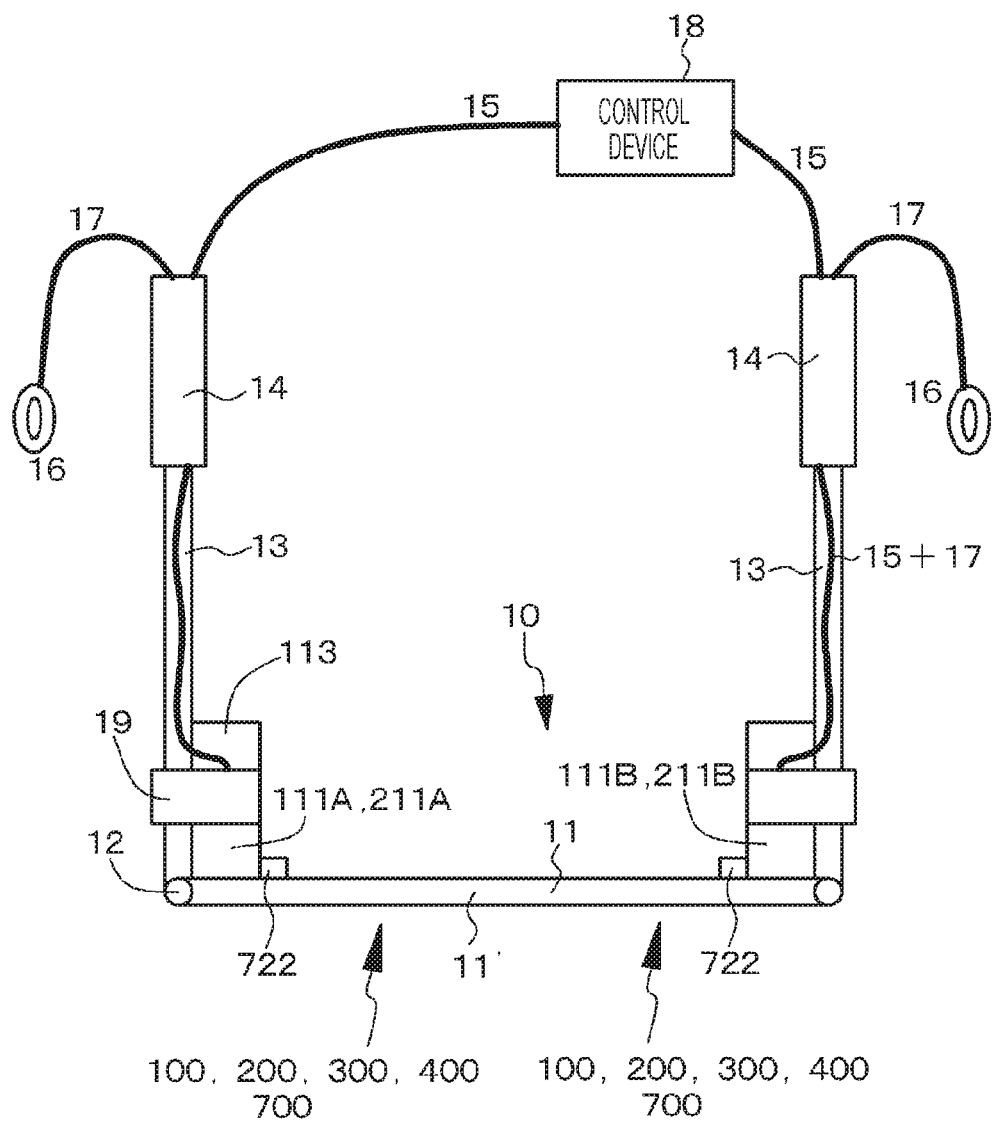
FIGS. 15A and 15B respectively are a schematic diagram of a display device of Example 10 as viewed from above, and a schematic diagram of a circuit that controls an illuminance sensor.
Figure 15B:
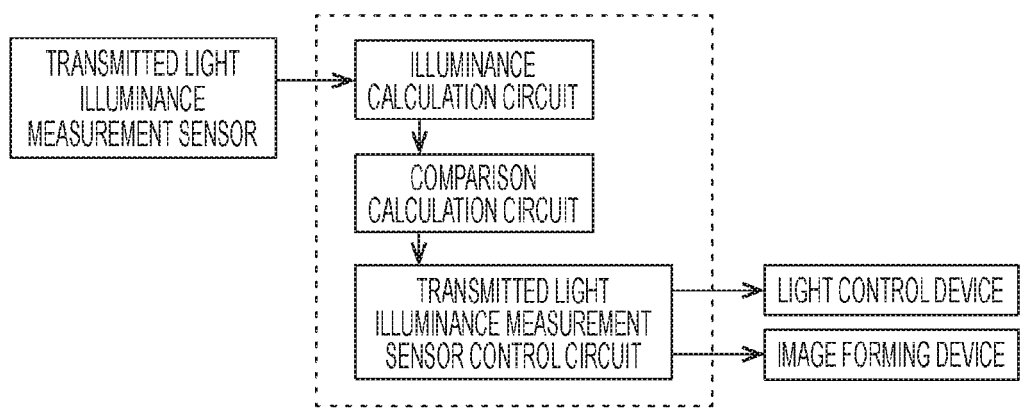

Example 10 is also a modification of Example 8. FIG. 15A illustrates a schematic diagram of a display device of Example 10 as viewed from above. Furthermore, FIG. 15B illustrates a schematic diagram of a circuit that controls the second illuminance sensor.

The display device of Example 10 further includes a second illuminance sensor (transmitted light illuminance measurement sensor) 722 that measures the illuminance based on the light transmitted from the external environment through the light control device, in other words, measures whether ambient light is transmitted through the light control device, is adjusted to a desired illuminance, and is incident, and the light shielding ratio of the light control device 700 is controlled on the basis of the measurement result of the second illuminance sensor (transmitted light illuminance measurement sensor) 722. At the same time or independently, furthermore, the brightness of the image formed by the image forming devices 111 or 211 is controlled on the basis of the measurement result of the second illuminance sensor (transmitted light illuminance measurement sensor) 722. The transmitted light illuminance measurement sensor 722 having a known configuration and structure is arranged closer to the observer than the optical device 120 or 320. Specifically, the transmitted light illuminance measurement sensor 722 only needs to be arranged on the inner side surface of the housings 113 or 213, for example. The transmitted light illuminance measurement sensor 722 is connected to the control device 18 via a connector and a wiring line (not illustrated). The control device 18 includes a circuit that controls the transmitted light illuminance measurement sensor 722. The circuit that controls the transmitted light illuminance measurement sensor 722 includes: an illuminance calculation circuit that receives a measured value from the transmitted light illuminance measurement sensor 722 and obtains illuminance; a comparison calculation circuit that compares a value of the illuminance obtained by the illuminance calculation circuit with a standard value; and a transmitted light illuminance measurement sensor control circuit that controls the light control device 700 and/or the image forming device 111 or 211 on the basis of a value obtained by the comparison calculation circuit, and these circuits can include known circuits. In the control of the light control device 700, the light shielding ratio of the light control device 700 is controlled, and on the other hand, in the control of the image forming device 111 or 211, the brightness of the image formed by the image forming device 111 or 211 is controlled. Note that, the control of the light shielding ratio in the light control device 700 and the control of the brightness of the image in the image forming device 111 or 211 may be independently performed or may be performed with a correlation. Moreover, in a case where the measurement result of the transmitted light illuminance measurement sensor 722 cannot be controlled to a desired illuminance in view of the illuminance of the environmental illuminance measurement sensor 721, in other words, in a case where the measurement result of the transmitted light illuminance measurement sensor 722 is not a desired illuminance, or in a case where more subtle illuminance adjustment is further desired, it is sufficient to adjust the light shielding ratio of the light control device while monitoring the value of the transmitted light illuminance measurement sensor 722. At least two second illuminance sensors (transmitted light illuminance measurement sensors) may be arranged, and measurement of illuminance based on light passing through a portion having a high light shielding ratio, and measurement of illuminance based on light passing through a low light shielding ratio may be performed.

The second illuminance sensor (transmitted light illuminance measurement sensor) 722 in Example 10 may be combined with the illuminance sensor (environmental illuminance measurement sensor) 721 in Example 9, and in this case, various tests may be performed, and the control of the light shielding ratio in the light control device 700 and the control of the brightness of the image in the image forming device 111 or 211 may be performed independently or may be performed with a correlation. In each of the light control device for the right eye and the light control device for the left eye, by adjusting voltages applied to the first electrode and the second electrode, equalization can be achieved of the light shielding ratio in the light control device for the right eye and the light shielding ratio in the light control device for the left eye. The potential difference between the first electrode and the second electrode may be controlled, or the voltage applied to the first electrode and the voltage applied to the second electrode may be controlled independently. The light shielding ratio in the light control device for the right eye and the light shielding ratio in the light control device for the left eye can be controlled, for example, on the basis of the measurement result of the second illuminance sensor (transmitted light illuminance measurement sensor) 722, or alternatively, the observer observes the brightness of the light passing through the light control device for the right eye and the optical device, and the brightness of the light passing through the light control device for the left eye and the optical device, and the observer can perform control and adjustment manually by operating a switch, a buttons, a dial, a slider, a knob, or the like.

Although the present disclosure has been described above on the basis of preferable Examples, the present disclosure is not limited to these Examples. The configurations and structures of the display device (head mounted display), the image display device, and the optical device described in Examples are merely exemplifications, and can be changed as appropriate. In Examples, the substrate constituting the light guide plate contains a resin material, but alternatively, it is also possible to use a glass substrate in which the surface polishing process of the substrate is simplified compared to the precision quality, specifically, a glass substrate (optical glass substrate) having Rq of about 5 nm of standard quality. By simplifying the surface polishing process as described above, it is possible to inexpensively provide an optical device having contrast and resolution as high as those in the conventional device, and a display device including such an optical device.

Furthermore, for example, a surface relief type hologram (see US2004/0062505A1) may be arranged on the light guide plate, or a surface relief type diffraction grating disclosed in U.S. Pat. No. 9,513,480B2 (US2016/0231568A1) may be used as a diffraction grating. In the optical device of the first structure, as described later, the diffraction grating may include a transmission diffraction grating, or alternatively, a mode can be made in which one of the first deflection means and the second deflection means includes a reflective diffraction grating, and the other includes a transmissive diffraction grating. Alternatively, the diffraction grating may be a reflective blazed diffraction grating, or the hologram diffraction grating may include a polymer dispersed liquid crystal (PDLC) mixture disclosed in Japanese Patent Application Laid-Open No. 2014-132328.

Furthermore, the display device of the present disclosure can also be used as a stereoscopic display device. In this case, as necessary, a polarizing plate or a polarizing film only needs to be detachably attached to the optical device, or the polarizing plate or the polarizing film only needs to be bonded to the optical device.

In Examples, it has been described that the image forming device 111 or 211 displays an image of single color (for example, green), but the image forming device 111 or 211 can also display a color image, and in this case, the light source only needs to include, for example, light sources respectively emitting red, green, and blue light beams. More specifically, for example, it is sufficient that white light is obtained by performing mixing and brightness uniformization, with a light pipe, of red light, green light and blue light respectively emitted from the red light emitting element, the green light emitting element, and the blue light emitting element.

Figure 16:
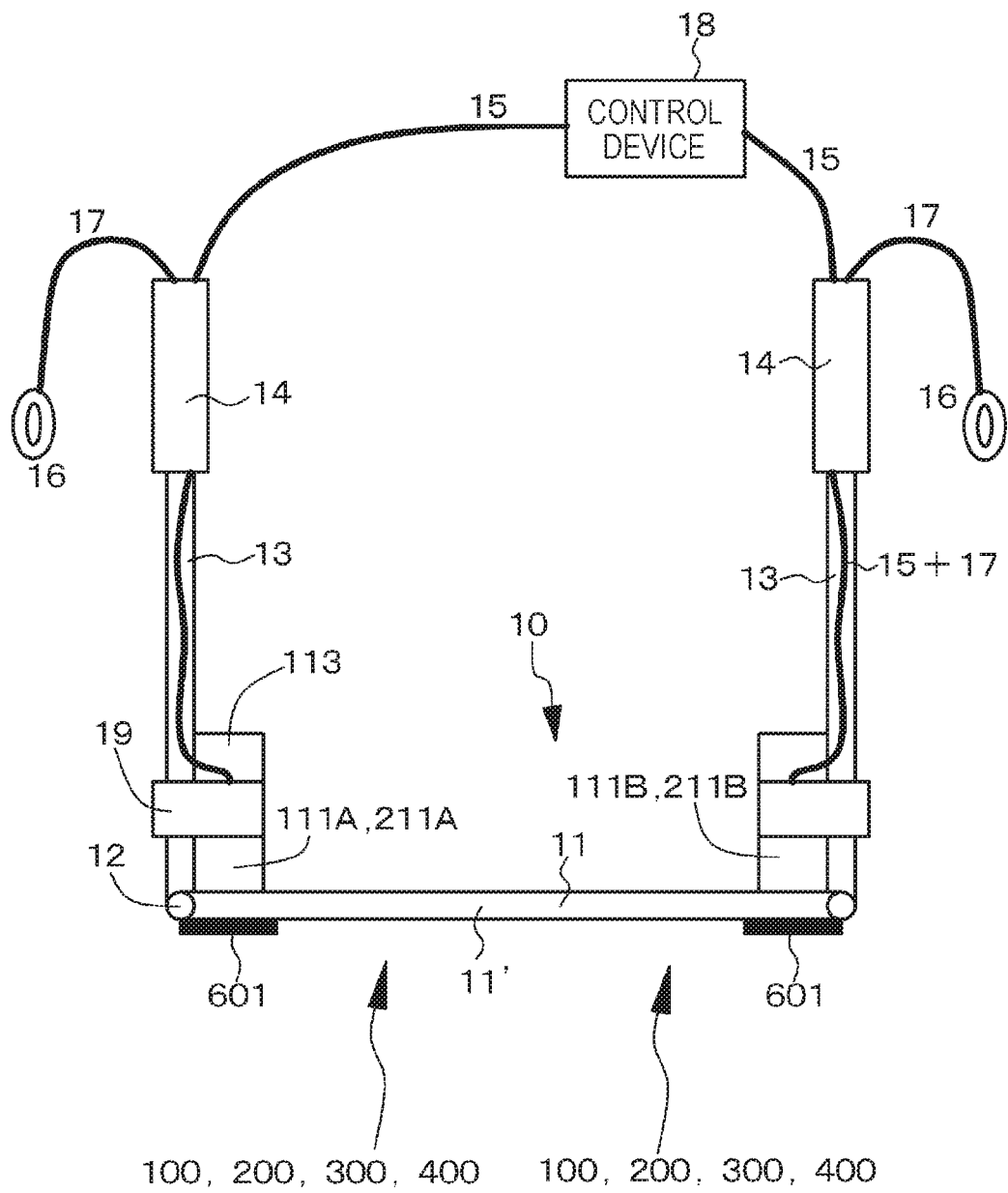
FIG. 16 is a schematic diagram of a modification of the display device of Example 1 as viewed from above.
Figure 17:
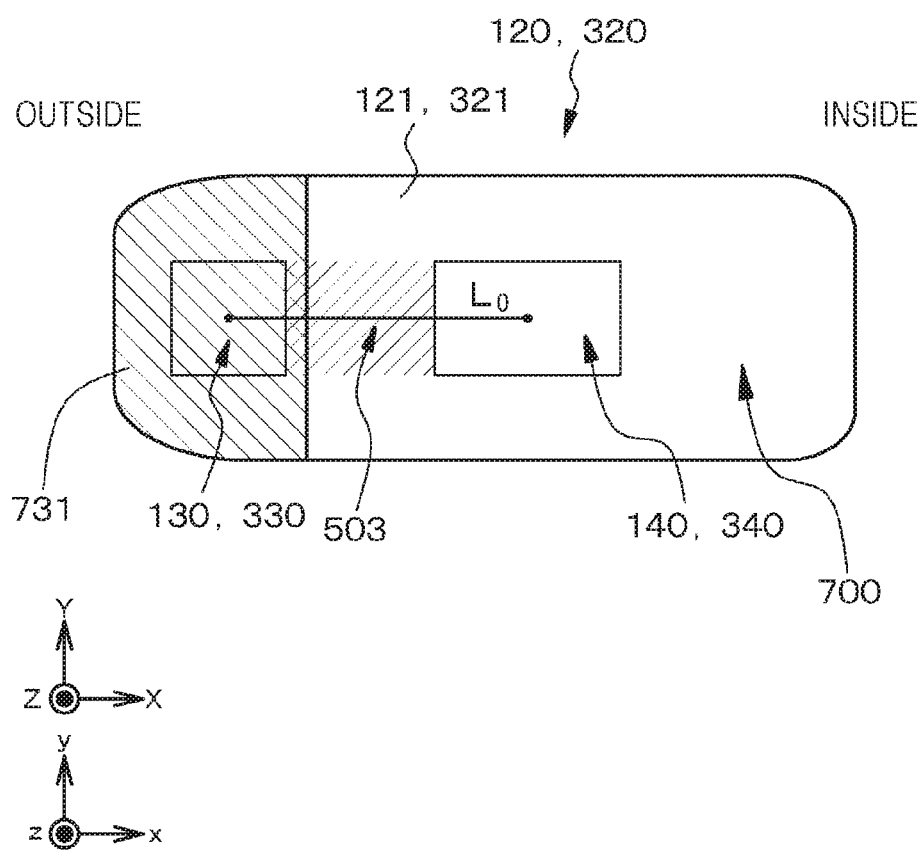
FIG. 17 is a schematic front view of an optical device and a light control device in another modification of the display device of Example 1 illustrated in FIG. 16.

Furthermore, the image display device described in Examples 1 to 10 can be modified as described below. In other words, as illustrated in a schematic diagram as viewed from above in FIG. 16, and in a schematic front view of the optical device and the light control device in FIG. 17, on the outer surface of the light control device 700 facing the first deflection means 330, a light shielding member 601 is formed to prevent that light leaks out of the light guide plate 321 and the light utilization efficiency is lowered.

The optical device of the first structure described in Examples 1 to 4 can be modified as described below. In other words, as illustrated in a conceptual diagram of an optical device in a modification of the display device of Example 1 in FIG. 18, the optical device may include a first reflective volume hologram diffraction grating 351, a second reflective volume hologram diffraction grating 352, and a third reflective volume hologram diffraction grating 353. In the first reflective volume hologram diffraction grating 351, the interference fringes of the diffraction grating member extend generally parallel to the Y-axis. In the second reflective volume hologram diffraction grating 352, the interference fringes of the diffraction grating member extend in an oblique direction. In the third reflective volume hologram diffraction grating 353, the interference fringes of the diffraction grating member extend generally parallel to the X-axis. A light beam emitted from the image forming device 111 or 211 is diffracted in the X-axis direction by the first reflective volume hologram diffraction grating 351, is propagated through the light guide plate 321, and is incident on the second reflective volume hologram diffraction grating 352. Then, the light beam is diffracted obliquely downward by the second reflective volume hologram diffraction grating 352, and is incident on the third reflective volume hologram diffraction grating 352. Then, the light beam is diffracted in the Z-axis direction by the third reflective volume hologram diffraction grating 353, and is incident on the pupil of the observer. Then, a line segment connecting the incident point and the emission point includes two line segments $L_{0-A}$ and $L_{0-B}$. The light guide region includes two regions of

Figure 18:
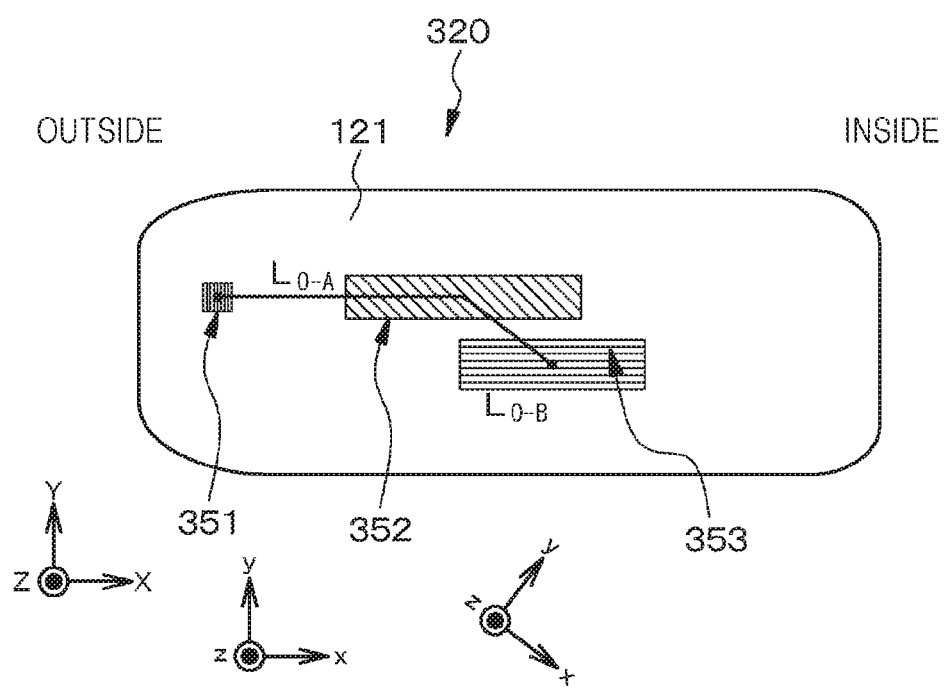
FIG. 18 is a conceptual diagram of an optical device in yet another modification of the display device of Example 1.

[A] a region of the substrate 500 facing a region sandwiched by the right end in FIG. 18 of the first reflective volume hologram diffraction grating 351 and the left end in FIG. 18 of the second reflective volume hologram diffraction grating 352, and

[B] a region of the substrate 500 facing a region sandwiched by the lower end in FIG. 18 of the second reflective volume hologram diffraction grating 352 and the upper end in FIG. 18 of the third reflective volume hologram diffraction grating 353. Furthermore, the entire light guide region includes the two regions of the substrate 500 described above, and

[C] a region of the substrate 500 facing the first reflective volume hologram diffraction grating 351,

[D] a region of the substrate 500 facing the second reflective volume hologram diffraction grating 352, and

[E] a region of the substrate 500 facing the third reflective volume hologram diffraction grating 353.

Figure 19A:
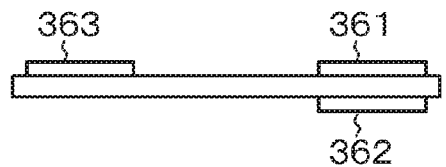
FIGS. 19A, 19B, 19C, 19D, 19E, and 19F are each a conceptual diagram of an optical device in yet another modification of the display device of Example 1.
Figure 19B:
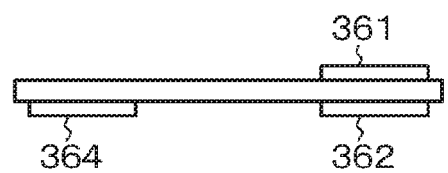
Figure 19C:
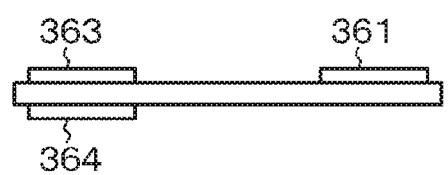
Figure 19D:
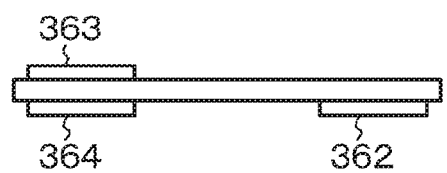
Figure 19E:
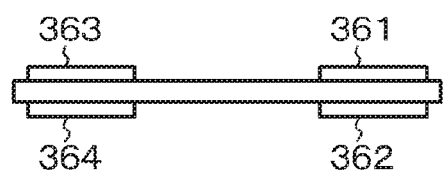
Figure 19F:
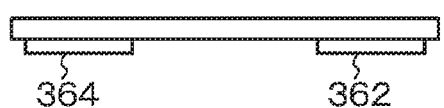

Alternatively, the optical device of the first structure described in Examples 1 to 4 can be modified as described below. In other words, as illustrated in a conceptual diagram of an optical device in a modification of the display device of Example 1 in FIGS. 19A and 19B, two reflective diffraction gratings 361 and 362 can be used as the hologram diffraction grating on the light incident side, and a reflective diffraction grating 363 (see FIG. 19A) or a reflective diffraction grating 364 (see FIG. 19B) can be used as the hologram diffraction grating on the light emission side. Alternatively, as illustrated in a conceptual diagram of an optical device in a modification of the display device of Example 1 in FIGS. 19C and 19D, the reflective diffraction grating 361 (see FIG. 19C) or the reflective diffraction grating 362 (see FIG. 19D) can be used as the hologram diffraction grating on the light incident side, and the two reflective diffraction gratings 363 and 364 can be used as the hologram diffraction grating on the light emission side. Alternatively, as illustrated in a conceptual diagram of an optical device in a modification of the display device of Example 1 in FIG. 19E, the two reflective diffraction gratings 361 and 362 can be used as the hologram diffraction grating on the light incident side, and the two reflective diffraction gratings 363 and 364 can be used as the hologram diffraction grating on the light emission side. Alternatively, as illustrated in a conceptual diagram of an optical device in a modification of the display device of Example 1 in FIG. 19F, a transmissive diffraction grating 362 can be used as the hologram diffraction grating on the light incident side, and a transmissive diffraction grating 364 can be used as the hologram diffraction grating on the light emission side.

Note that, the present disclosure can also adopt the following configurations.

[A01] <<Optical device>>

An optical device including:

a light guide plate including a first surface and a second surface facing the first surface, in which light incident from an image forming device is propagated by total reflection inside and then emitted toward an observer;

a first deflection means arranged on at least one of the first surface or the second surface of the light guide plate, the first deflection means deflecting the light incident on the light guide plate to cause the light incident on the light guide plate to be totally reflected inside the light guide plate; and a second deflection means arranged on at least one of the first surface or the second surface, the second deflection means deflecting the light propagated by total reflection inside the light guide plate to cause the light propagated by total reflection inside the light guide plate to be emitted from the light guide plate, in which the light guide plate includes a substrate including a first surface and a second surface facing the first surface, a first planarizing film formed on the first surface of the substrate, the first planarizing film containing an organic material, and a second planarizing film formed on the second surface of the substrate, the second planarizing film containing an organic material.

[A02] The optical device according to [A01], in which the substrate contains a resin material.

[A03] The optical device according to [A01] or [A02], in which a main component of the substrate is a cycloolefin polymer.

[A04] The optical device according to any one of [A01] to [A03], in which a value of Rq of an outer surface of a portion of the first planarizing film included in a region of the light guide plate sandwiched by orthogonal projection images on the substrate of the first deflection means and the second deflection means is less than or equal to 3 nm, and a value of Rq of an outer surface of a portion of the second planarizing film included in the region of the light guide plate sandwiched by the orthogonal projection images on the substrate of the first deflection means and the second deflection means is less than or equal to 3 nm.

[A05] The optical device according to any one of [A01] to [A04], in which a thickness of a portion of the first planarizing film included in a region of the light guide plate sandwiched by orthogonal projection images on the substrate of the first deflection means and the second deflection means is greater than or equal to $5 \times 10^{-8}$ m, preferably greater than or equal to $1.7 \times 10^{-7}$ m, and a thickness of a portion of the second planarizing film included in the region of the light guide plate sandwiched by the orthogonal projection images on the substrate of the first deflection means and the second deflection means is greater than or equal to $5 \times 10^{-8}$ m, preferably greater than or equal to $1.7 \times 10^{-7}$ m.

[A06] The optical device according to [A05], in which the thickness of the portion of the first planarizing film included in the region of the light guide plate sandwiched by the orthogonal projection images on the substrate of the first deflection means and the second deflection means is less than or equal to 3×10−6 m, and the thickness of the portion of the second planarizing film included in the region of the light guide plate sandwiched by the orthogonal projection images on the substrate of the first deflection means and the second deflection means is less than or equal to 3×10−6 m.

[A07] The optical device according to any one of [A01] to [A06], in which a parallelism of an outer surface of a portion of the second planarizing film included in a region of the light guide plate sandwiched by orthogonal projection images on the substrate of the first deflection means and the second deflection means with respect to an outer surface of a portion of the first planarizing film included in the region of the light guide plate sandwiched by the orthogonal projection images on the substrate of the first deflection means and the second deflection means is less than or equal to 2/60 degrees, preferably less than or equal to 1/60 degrees.

[A08] The optical device according to any one of [A01] to [A07], in which the first planarizing film and the second planarizing film each contain an identical material and have an identical thickness.

[A09] The optical device according to any one of [A01] to {A08], in which the first planarizing film and the second planarizing film each contain a material whose main component is an organic material containing an acrylic material.

[A10] The optical device according to any one of [A01] to [A09], in which the first deflection means and the second deflection means each include a hologram diffraction grating.

[A11] The optical device according to [A10], in which the hologram diffraction grating contains an acrylic material and a urethane-based material.

[A12] The optical device according to [A10], in which the hologram diffraction grating, the first planarizing film, and the second planarizing film each contain an acrylic material.

[A13] The optical device according to any one of [A01] to [A12], in which a thickness of the substrate is 0.4 mm to 10 mm.

[A14] The optical device according to any one of [A01] to [A13], in which it is satisfied that $|n1-n0|/n0 \leq 0.03$ $|n2-n0|/n0 \leq 0.03$, where n1 is a refractive index of a material constituting the first planarizing film, n2 is a refractive index of a material constituting the second planarizing film, and n0 is a refractive index of a material constituting the substrate.

[A15] The optical device according to any one of [A01] to [A14], in which it is satisfied that n1≥1.48, n2≥1.48, and n0≥1.48, where n1 is a substrate refractive index of a material constituting the first planarizing film substrate, n2 is a substrate refractive index of a material constituting the second planarizing film substrate, and n0 is a refractive index of a material constituting the substrate.

[A16] The optical device according to any one of [A01] to [A15], in which a light transmittance of a material constituting the substrate with respect to the light incident on the light guide plate is greater than or equal to 14% when a thickness of the material constituting the substrate is 60 mm, a light transmittance of a material constituting the first planarizing film with respect to the light incident on the light guide plate is greater than or equal to 14% when a thickness of the material constituting the first planarizing film is 60 mm, and a light transmittance of a material constituting the second planarizing film with respect to the light incident on the light guide plate is greater than or equal to 14% when a thickness of the material constituting the second planarizing film is 60 mm.

[A17] The optical device according to any one of [A01] to [A16], in which a first adhesive layer is formed between the first deflection means and the first planarizing film, and a second adhesive layer is formed between the second deflection means and the second planarizing film.

[A18] The optical device according to any one of [A01] to [A17], in which a thickness of the first planarizing film is n1·λ0/4, or a thickness of the second planarizing film is n2·λ0/4, or the thickness of the first planarizing film is n1·λ0/4, and the thickness of the second planarizing film is n2·λ0/4, where λ0 is a wavelength of the light incident on the light guide plate, n0 is a refractive index of the substrate, n1 is a refractive index of the first planarizing film, where n1<n0, and n2 is a refractive index of the second planarizing film, where n2<n0.

[A19] The optical device according to any one of [A01] to [A18], in which the first deflection means and the second deflection means are arranged on a second surface side of the substrate, and an anti-reflection layer having a refractive index n3, where n3<n1, and a thickness of n3·λ0/4 is formed on an outer surface of the first planarizing film, where n1 is a refractive index of a material constituting the first planarizing film, and λ0 is a wavelength of the light incident on the light guide plate.

[A20] The optical device according to [A19], in which a total thickness of the first planarizing film and the anti-reflection layer is equal to the thickness of the second planarizing film.

[B01] <<Display device: First aspect>>

A display device including:

a frame to be mounted on a head of an observer; and an image display device attached to the frame, in which the image display device includes an image forming device and an optical device, and the optical device includes:

a light guide plate including a first surface and a second surface facing the first surface, in which light incident from the image forming device is propagated by total reflection inside and then emitted toward an observer;

a first deflection means arranged on at least one of the first surface or the second surface of the light guide plate, the first deflection means deflecting the light incident on the light guide plate to cause the light incident on the light guide plate to be totally reflected inside the light guide plate; and a second deflection means arranged on at least one of the first surface or the second surface, the second deflection means deflecting the light propagated by total reflection inside the light guide plate to cause the light propagated by total reflection inside the light guide plate to be emitted from the light guide plate, in which the light guide plate includes a substrate including a first surface and a second surface facing the first surface, a first planarizing film formed on the first surface of the substrate, the first planarizing film containing an organic material, and a second planarizing film formed on the second surface of the substrate, the second planarizing film containing an organic material.

[B02] <<Display device: Second aspect>>

A display device including:
a frame to be mounted on a head of an observer; and
an image display device attached to the frame, in which
the image display device includes an image forming device, and an optical device according to any one of [A01] to [A20].

[C01] The display device according to [B01] or [B02], further including
a light control device that adjusts the amount of external light incident from the outside, in which
the optical device overlaps with at least a portion of the light control device.

[C02] The display device according to [C01], in which
the light control device includes:
a first substrate;
a second substrate facing the first substrate;
a first transparent electrode provided on a facing surface of the first substrate facing the second substrate;
a second transparent electrode provided on a facing surface of the second substrate facing the first substrate; and
a light control layer sandwiched between the first transparent electrode and the second transparent electrode.

[C03] The display device according to [C02], in which the light control layer contains an electrochromic material.

[C04] The display device according to [C03], in which the light control layer has a layered structure of a WO3 layer, a Ta2O5 layer, and an IrXSn1-XO layer from a first transparent electrode side.

[C05] The display device according to any one of [C01] to [C04], in which the optical device is attached to the light control device.

[C06] The display device according to any one of [C01] to [C05], in which
the frame includes: a front portion arranged in front of the observer; two temple portions respectively attached rotatably to both ends of the front portion via hinges; and a nose pad, and
the light control device is arranged at the front portion.

[C07] The display device according to [C06], in which
the front portion includes a rim, and
the light control device is fitted to the rim.

REFERENCE SIGNS LIST

10 Frame
11 Front portion
11' Rim
12 Hinge
13 Temple portion
14 End cover portion
15 Wiring line (signal line, power supply line, or the like)
16 Headphone portion
17 Headphone portion wiring line
18 Control device (control circuit control means)
19 Attachment member
21 Pupil
100, 200, 300, 400 Image display device
111, 111A, 111B, 211, 211A, 211B Image forming device
112 Optical system (collimating optical system)
113, 213 Housing
120, 320 Optical device
121, 321 Light guide plate
122, 322 First surface of light guide plate
123, 323 Second surface of light guide plate
324, 325 Portion of light guide plate
130 First deflection means (first diffraction grating member)
140 Second deflection means (second diffraction grating member virtual image formation region)
330 First deflection means
340 Second deflection means (virtual image formation region)
351 First reflective volume hologram diffraction grating
352 Second reflective volume hologram diffraction grating
353 Third reflective volume hologram diffraction grating
361, 363 Reflective diffraction grating
362, 364 Transmissive diffraction grating
150 Reflective spatial light modulation device
150' Organic EL display device
151 Liquid crystal display device (LCD)
152 Polarization beam splitter (PBS)
153 Light source
251 Light source
252 Collimating optical system
253 Scanning means
254 Optical system (relay optical system)
255 Total reflection mirror
500 Substrate
501 First surface of substrate
502 Second surface of substrate
503 light guide region
504 Entire light guide region
511 First planarizing film
512 Second planarizing film
521, 522 Adhesive layer
531 Anti-reflection layer
601 Light shielding member
700 Light control device
701 Virtual image formation region facing region
711A First substrate
711B Second substrate
712A First transparent electrode
712B Second transparent electrode
713 WO$_3$ layer
714 Ta$_2$O$_5$ layer
715 Ir$_x$Sn$_{1-x}$O layer
716A First electrode
716B Second electrode
717A Protective layer
717B Ground layer
717C Sealing member
717D Adhesive
721 Illuminance sensor (environmental illuminance measurement sensor)
722 Second illuminance sensor (transmitted light illuminance measurement sensor)

The invention claimed is:
1. An optical device, comprising:
a light guide plate including:
a substrate that includes:
a first surface; and
a second surface facing the first surface;
a first planarizing film on the first surface of the substrate, wherein the first planarizing film includes an organic material; and
a second planarizing film on the second surface of the substrate, wherein the second planarizing film includes the organic material, wherein the light guide plate is configured to:
    propagate light incident from an image forming device by total reflection; and
    emit the propagated light toward an observer;
a first deflector on the second planarizing film, wherein the first deflector is configured to deflect the light incident on the light guide plate to cause the light incident on the light guide plate to totally reflect inside the light guide plate;
a first adhesive layer between the first deflector and the second planarizing film;
a second deflector on the second planarizing film, wherein the second deflector is configured to deflect the light propagated by total reflection inside the light guide plate to cause the light propagated by total reflection inside the light guide plate to emit from the light guide plate; and
a second adhesive layer between the second deflector and the second planarizing film.

2. The optical device according to claim 1, wherein the substrate comprises a resin material.

3. The optical device according to claim 1, wherein a main component of the substrate is a cycloolefin polymer.

4. The optical device according to claim 1, wherein
a value of Rq of an outer surface of a portion of the first planarizing film, included in a region of the light guide plate that is sandwiched by a first orthogonal projection image of the first deflector on the substrate and a second orthogonal projection image of the second deflector on the substrate, is less than or equal to 3 nm, and
a value of Rq of an outer surface of a portion of the second planarizing film, included in the region of the light guide plate that is sandwiched by the first orthogonal projection image of the first deflector on the substrate and the second orthogonal projection image of the second deflector on the substrate, is less than or equal to 3 nm.

5. The optical device according to claim 1, wherein
a thickness of a portion of the first planarizing film, included in a region of the light guide plate that is sandwiched by a first orthogonal projection image of the first deflector on the substrate and a second orthogonal projection image of the second deflector on the substrate, is greater than or equal to $5 \times 10^{-8}$ m, and
a thickness of a portion of the second planarizing film, included in the region of the light guide plate that is sandwiched by the first orthogonal projection image of the first deflector on the substrate and the second orthogonal projection image of the second deflector on the substrate, is greater than or equal to $5 \times 10^{-8}$ m.

6. The optical device according to claim 5, wherein
the thickness of the portion of the first planarizing film, included in the region of the light guide plate that is sandwiched by the first orthogonal projection image of the first deflector on the substrate and the second orthogonal projection image of the second deflector on the substrate, is less than or equal to $3 \times 10^{-6}$ m, and
the thickness of the portion of the second planarizing film, included in the region of the light guide plate that is sandwiched by the first orthogonal projection image of the first deflector on the substrate and the second orthogonal projection image of the second deflector on the substrate, is less than or equal to $3 \times 10^{-6}$ m.

7. The optical device according to claim 1, wherein
a parallelism of an outer surface of a portion of the second planarizing film, included in a region of the light guide plate that is sandwiched by a first orthogonal projection image of the first deflector on the substrate and a second orthogonal projection image of the second deflector on the substrate, with respect to an outer surface of a portion of the first planarizing film, included in the region of the light guide plate that is sandwiched by the first orthogonal projection image of the first deflector on the substrate and the second orthogonal projection image of the second deflector on the substrate, is less than or equal to 2/60 degrees.

8. The optical device according to claim 1, wherein
each of the first planarizing film and the second planarizing film includes an identical material and have an identical thickness.

9. The optical device according to claim 1, wherein
each of the first planarizing film and the second planarizing film includes a material in which a main component is an organic material, and
the organic material includes an acrylic material.

10. The optical device according to claim 1, wherein
each of the first deflector and the second deflector includes a hologram diffraction grating.

11. The optical device according to claim 10, wherein
the hologram diffraction grating includes an acrylic material and a urethane-based material.

12. The optical device according to claim 10, wherein
each of the hologram diffraction grating, the first planarizing film, and the second planarizing film includes an acrylic material.

13. The optical device according to claim 1, wherein a thickness of the substrate is 0.4 mm to 10 mm.

14. The optical device according to claim 1, wherein
an Expression 1, $|n_1 - n_0|/n_0 \leq 0.03$, is satisfied, and
an Expression 2, $|n_2 - n_0|/n_0 \leq 0.03$, is satisfied, wherein
    $n_1$ is a refractive index of a material constituting the first planarizing film,
    $n_2$ is a refractive index of a material constituting the second planarizing film, and
    $n_0$ is a refractive index of a material constituting the substrate.

15. The optical device according to claim 1, wherein
an Expression 1, $n_1 \geq 1.48$, is satisfied,
an Expression 2, $n_2 \geq 1.48$, is satisfied, and
an Expression 3, $n_0 \geq 1.48$, is satisfied, wherein
    $n_1$ is a substrate refractive index of a material constituting the first planarizing film substrate,
    $n_2$ is a substrate refractive index of a material constituting the second planarizing film substrate, and
    $n_0$ is a refractive index of a material constituting the substrate.

16. The optical device according to claim 1, wherein
a light transmittance of a material constituting the substrate with respect to the light incident on the light guide plate is greater than or equal to 14% when a thickness of the material constituting the substrate is 60 mm,
a light transmittance of a material constituting the first planarizing film with respect to the light incident on the light guide plate is greater than or equal to 14% when a thickness of the material constituting the first planarizing film is 60 mm, and
a light transmittance of a material constituting the second planarizing film with respect to the light incident on the light guide plate is greater than or equal to 14% when a thickness of the material constituting the second planarizing film is 60 mm.

17. The optical device according to claim 1, wherein one of
a thickness of the first planarizing film is $n_1 \cdot \lambda_0/4$,
a thickness of the second planarizing film is $n_2 \cdot \lambda_0/4$, or
the thickness of the first planarizing film is $n_1 \cdot \lambda_0/4$ and the thickness of the second planarizing film is $n_2 \cdot \lambda_0/4$, wherein
$\lambda_0$ is a wavelength of the light incident on the light guide plate,
$n_0$ is a refractive index of the substrate,
$n_1$ is a refractive index of the first planarizing film, where $n_1 < n_0$, and
$n_2$ is a refractive index of the second planarizing film, where $n_2 < n_0$.

18. The optical device according to claim 1, further comprising
an anti-reflection layer, wherein
the anti-reflection layer having a refractive index $n_3$, where $n_3 < n_1$, and a thickness $n_3 \cdot \lambda_0/4$ is on an outer surface of the first planarizing film,
$n_1$ is a refractive index of a material constituting the first planarizing film, and
$\lambda_0$ is a wavelength of the light incident on the light guide plate.

19. A display device, comprising:
a head mountable frame; and
an image display device attached to the head mountable frame, wherein
the image display device includes:
an image forming device; and
an optical device including:
a light guide plate that includes:
a substrate that includes:
a first surface; and
a second surface facing the first surface;
a first planarizing film on the first surface of the substrate, wherein the first planarizing film includes an organic material; and
a second planarizing film on the second surface of the substrate, wherein the second planarizing film includes the organic material, wherein
the light guide plate is configured to:
propagate light incident from the image forming device by total reflection; and
emit the propagated light toward an observer;
a first deflector on the second planarizing film, wherein
the first deflector is configured to deflect the light incident on the light guide plate to cause the light incident on the light guide plate to totally reflect inside the light guide plate;
a first adhesive layer between the first deflector and the second planarizing film;
a second deflector on the second planarizing film, wherein
the second deflector is configured to deflect the light propagated by total reflection inside the light guide plate to cause the light propagated by total reflection inside the light guide plate to emit from the light guide plate; and
a second adhesive layer between the second deflector and the second planarizing film.

* * * * *